United States Patent
Peleg et al.

(10) Patent No.: US 12,491,968 B2
(45) Date of Patent: *Dec. 9, 2025

(54) SYSTEM AND METHOD FOR LAUNCH AND RECOVERY OF A MARINE VESSEL

(71) Applicant: SEALARTEC LTD., Beitar-Illit (IL)

(72) Inventors: Amitay Peleg, Haifa (IL); Alon Cohen, Haifa (IL)

(73) Assignee: SEALARTEC LTD., Beitar-Illit (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,629

(22) Filed: Mar. 15, 2024

(65) Prior Publication Data

US 2024/0217626 A1 Jul. 4, 2024

Related U.S. Application Data

(60) Continuation of application No. 18/306,675, filed on Apr. 25, 2023, now abandoned, which is a
(Continued)

(30) Foreign Application Priority Data

Oct. 22, 2015 (IL) .......................... 242226

(51) Int. Cl.
  *B63B 21/64* (2006.01)
  *B63B 21/04* (2006.01)
  (Continued)

(52) U.S. Cl.
  CPC .............. *B63B 21/64* (2013.01); *B63B 21/04* (2013.01); *B63B 21/58* (2013.01); *B63B 27/16* (2013.01);
  (Continued)

(58) Field of Classification Search
  CPC ......... B63B 21/00; B63B 21/04; B63B 21/08; B63B 21/58; B63B 21/20; B63B 21/203;
  (Continued)

(56) References Cited

U.S. PATENT DOCUMENTS 2,447,945 A * 8/1948 Knowler ............... B64C 35/005
                                                           114/230.3
3,166,038 A * 1/1965 Brittain ................... B63B 21/04
                                                           114/294
(Continued)

FOREIGN PATENT DOCUMENTS

WO  2001074655 A1  10/2001
WO  2007033384 A2  3/2007

OTHER PUBLICATIONS

Written Opinion filed in corresponding SG Application No. 11201803361X, dated Jun. 17, 2019, 7 pages.
(Continued)

*Primary Examiner* — Daniel V Venne
(74) *Attorney, Agent, or Firm* — Vorys, Sater, Seymour and Pease, LLP; Anthony P. Venturino; Maryellen Feehery Hank

(57) ABSTRACT

The present invention provides a capturing mechanism and method for the recovery of at least one vessel to at least one marine platform; the at least one vessel having at least one engagement device either permanently or at least partially reversibly connectable to the same; the capturing mechanism including: a. at least one tensioned capturing line connected to the at least one marine platform; and b, at least one line maneuvering mechanism configured to displace the at least one tensioned capturing line in at least one direction selected from a group of up, down, left, right, forward, backward, playable into the at least one marine plat form,
(Continued)

playable out of said at least one marine platform, playable into and out of the water and any combination thereof.

6 Claims, 26 Drawing Sheets

Related U.S. Application Data continuation of application No. 17/496,506, filed on Oct. 7, 2021, now Pat. No. 11,667,355, which is a division of application No. 15/769,974, filed as application No. PCT/IL2016/051128 on Oct. 19, 2016, now Pat. No. 11,192,614.

(60) Provisional application No. 62/293,361, filed on Feb. 10, 2016.

(51) Int. Cl.
*B63B 21/58* (2006.01)
*B63B 27/16* (2006.01)
*B63B 27/36* (2006.01)
*B63C 7/16* (2006.01)
*B66C 13/02* (2006.01)

(52) U.S. Cl.
CPC ............... *B63B 27/36* (2013.01); *B63C 7/16* (2013.01); *B66C 13/02* (2013.01); *B63B 2027/165* (2013.01)

(58) Field of Classification Search
CPC ......... B63B 21/56; B63B 21/60; B63B 21/64; B63B 27/00; B63B 27/04; B63B 27/08; B63B 27/10; B63B 27/12; B63B 27/16; B63B 2027/165; B63B 27/19; B63B 27/28; B63B 27/30; B63B 27/32; B63B 27/36; B63C 7/16; B63C 13/02
USPC ......... 114/44, 199, 200, 204, 205, 213, 215, 114/216, 217, 230.1, 230.15, 2, 30.17, 114/230.2, 230.21, 230.25, 230.26, 114/230.28, 230.29, 23, 0.3, 242, 248, 114/249, 250, 251, 252, 253, 256, 258, 114/259, 264, 67, 268, 343, 362, 364, 114/365, 368, 375, 377, 378, 381, 382
See application file for complete search history.

(56) References Cited

U.S. PATENT DOCUMENTS

| 3,613,629 | A | * | 10/1971 | Rhyne | ..................... B63B 21/66 |
| | | | | | 114/245 |
| 4,201,410 | A | * | 5/1980 | Crawford | .................. B66C 1/34 |
| | | | | | 294/82.33 |
| 4,516,517 | A | * | 5/1985 | Ayers | ...................... B63B 27/36 |
| | | | | | 114/244 |
| 4,714,288 | A | * | 12/1987 | Tietze | ..................... B63B 21/60 |
| | | | | | 294/82.27 |
| 5,123,374 | A | * | 6/1992 | McMillan | ............... B63B 21/60 |
| | | | | | 114/230.3 |
| 5,378,851 | A | * | 1/1995 | Brooke | ................... B63B 21/66 |
| | | | | | 114/259 |
| 6,662,741 | B1 | * | 12/2003 | Van Der Laan | ........ B63B 21/56 |
| | | | | | 114/254 |
| 7,975,638 | B1 | | 7/2011 | Harris et al. | |
| 9,032,893 | B1 | | 5/2015 | Caccamo | |
| 2006/0191457 | A1 | | 8/2006 | Murphy | |
| 2012/0227654 | A1 | | 9/2012 | Urciuoli | |

OTHER PUBLICATIONS

Search Report filed in corresponding SG Application No. 11201803361X, dated May 30, 2019, 3 pages.
Communication pursuant to Article 94(3) EPC, dated Jul. 5, 2019, 8 pages, filed in corresponding EP Application No. 16808818.5, filing date Oct. 19, 2016.
Communication pursuant to Article 94(3) EPC, dated Dec. 21, 2020, 5 pages, filed in corresponding EP Application No. 16808818.5, filing date Oct. 19, 2016.
Communication pursuant to Article 94(3) EPC, dated Nov. 8, 2021, 8 pages, filed in corresponding EP Application No. 16808818.5, filing date Oct. 19, 2016.

* cited by examiner

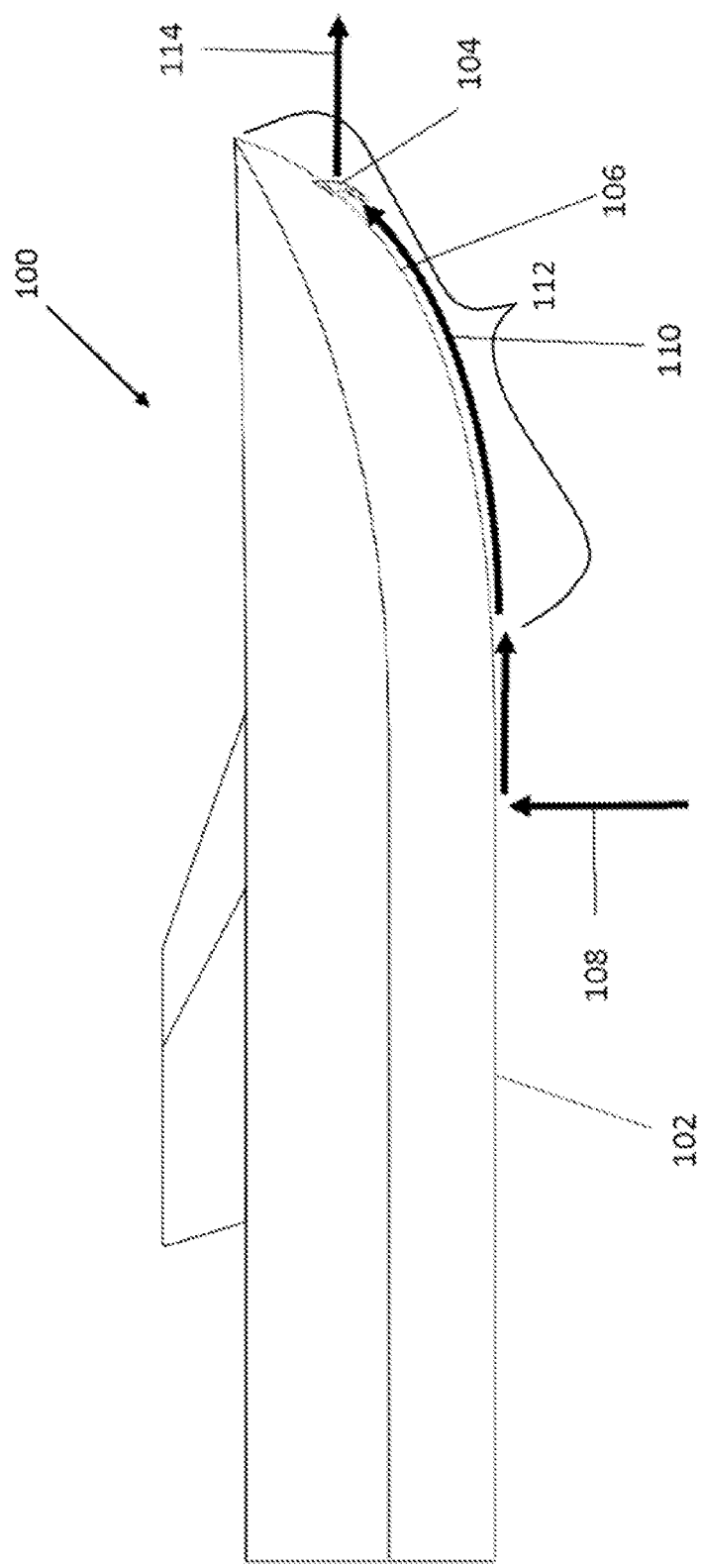

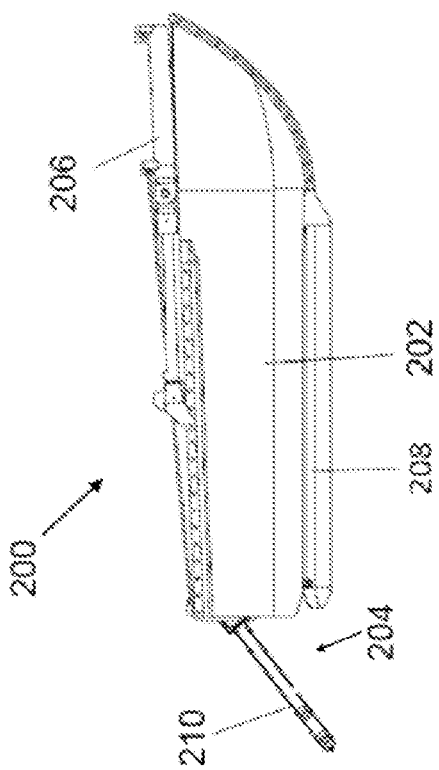
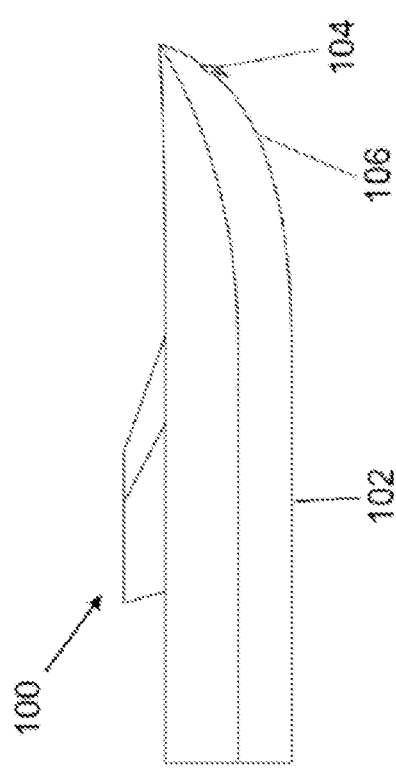
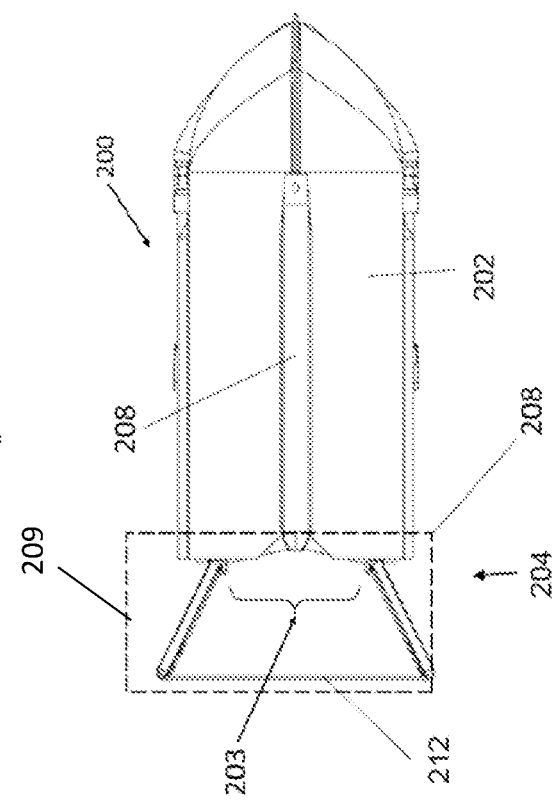
Fig. 4A
Fig. 4B
Fig. 3A
Fig. 3B

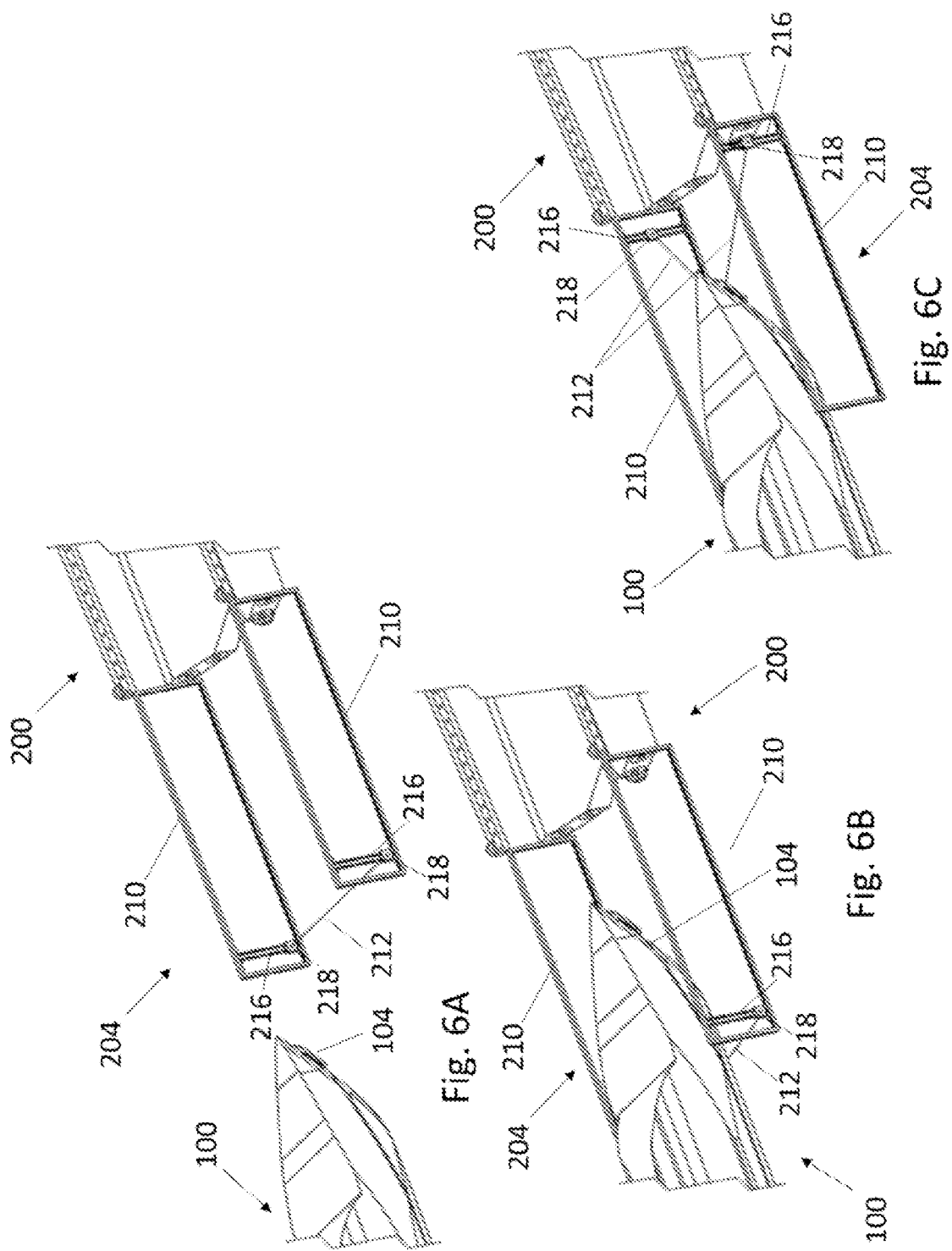

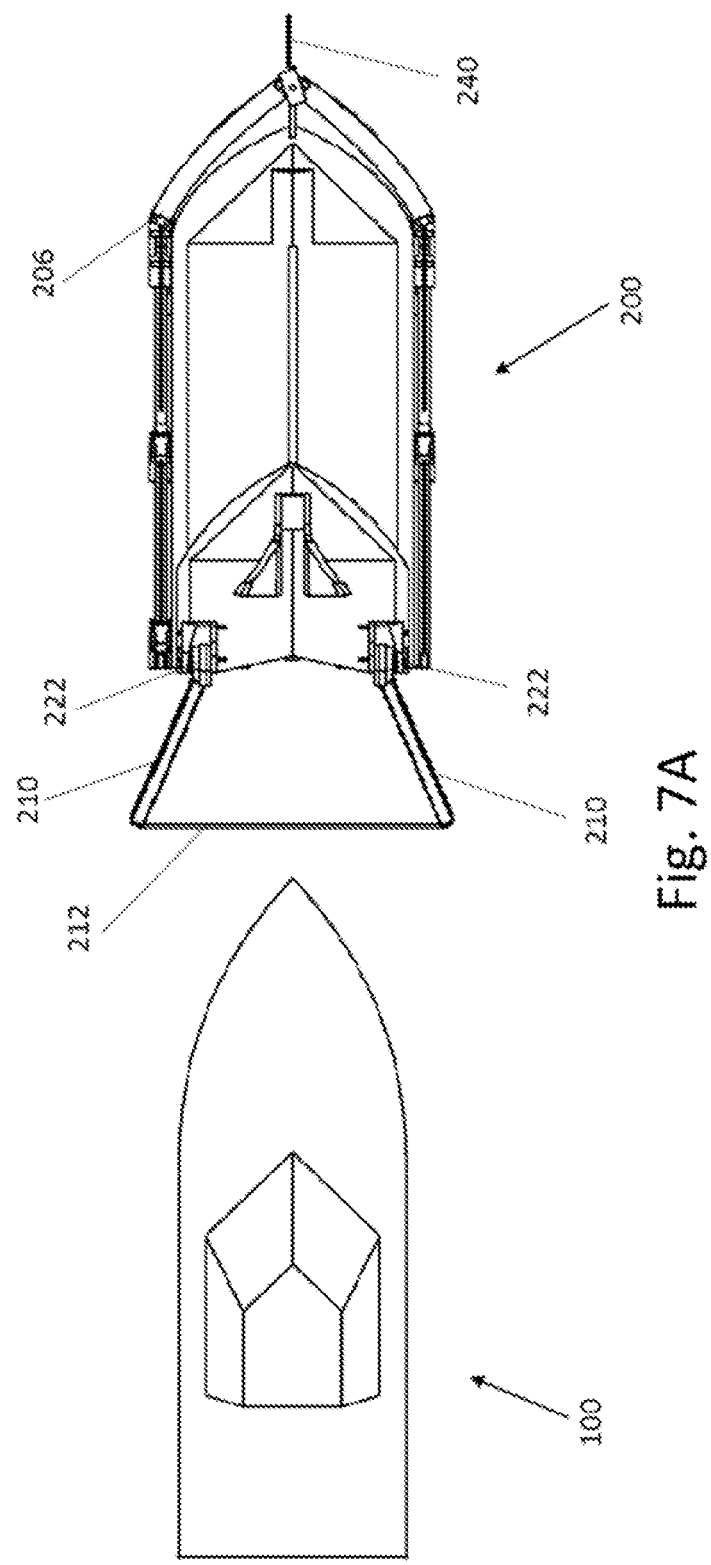

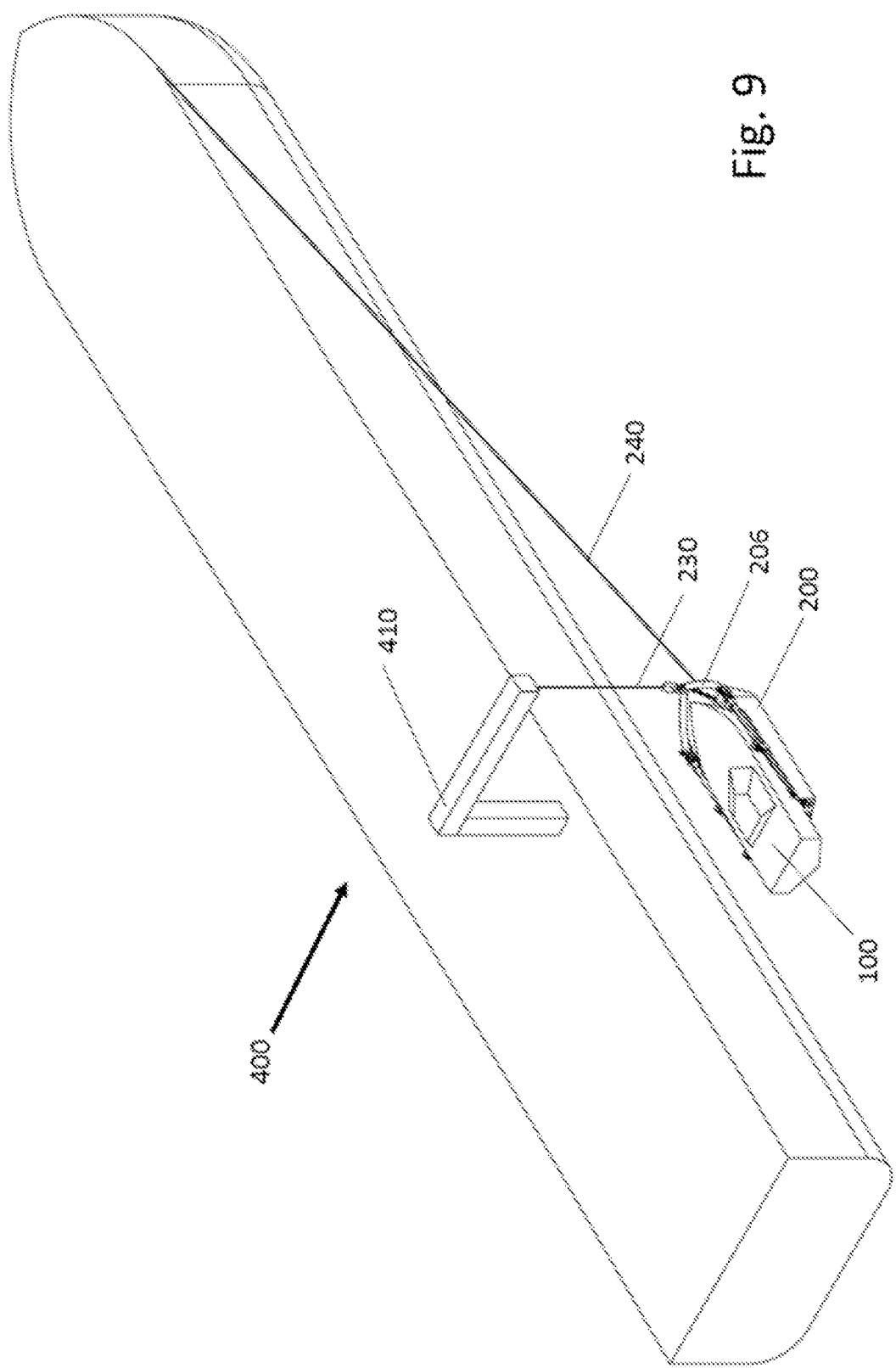

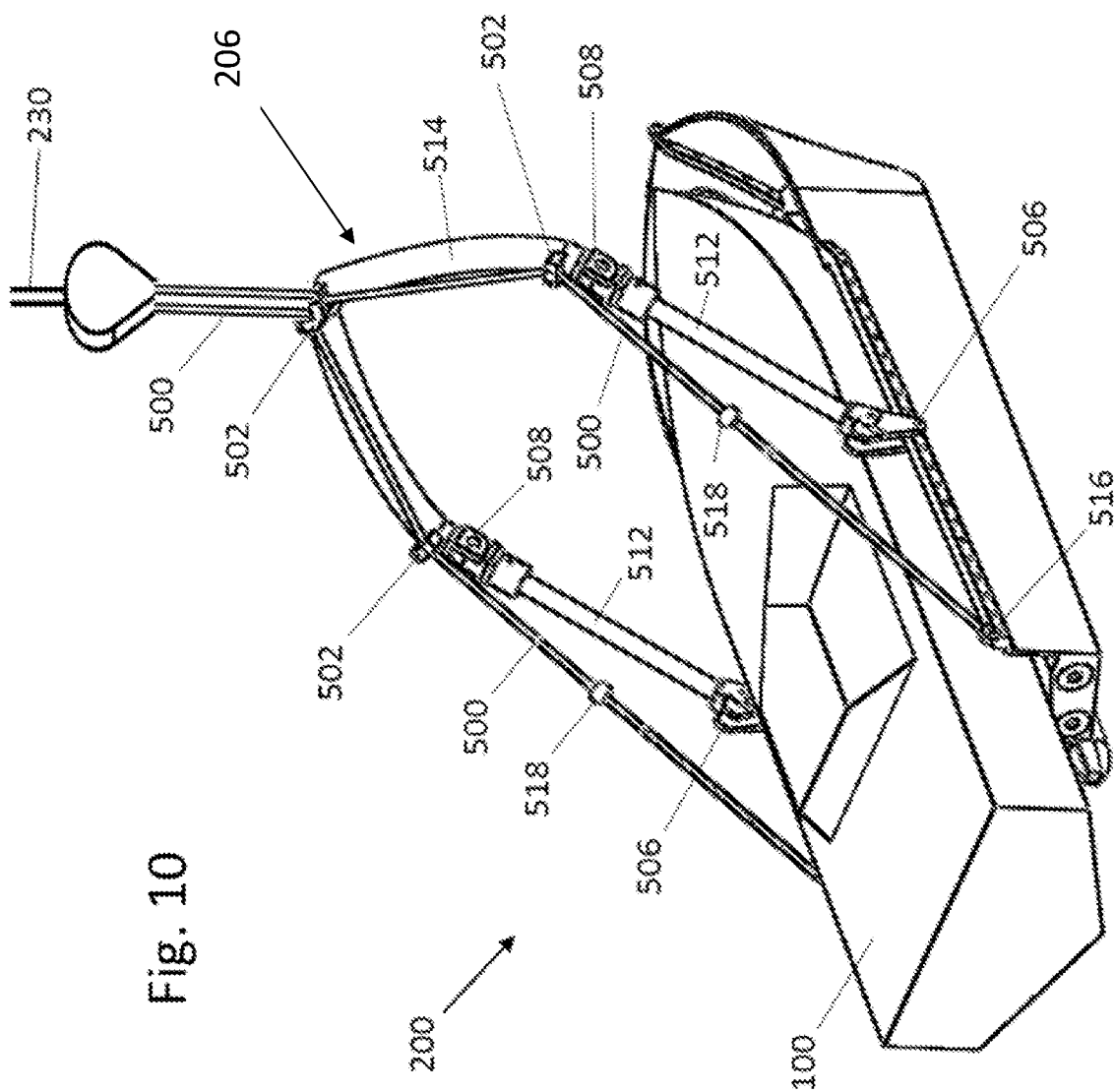

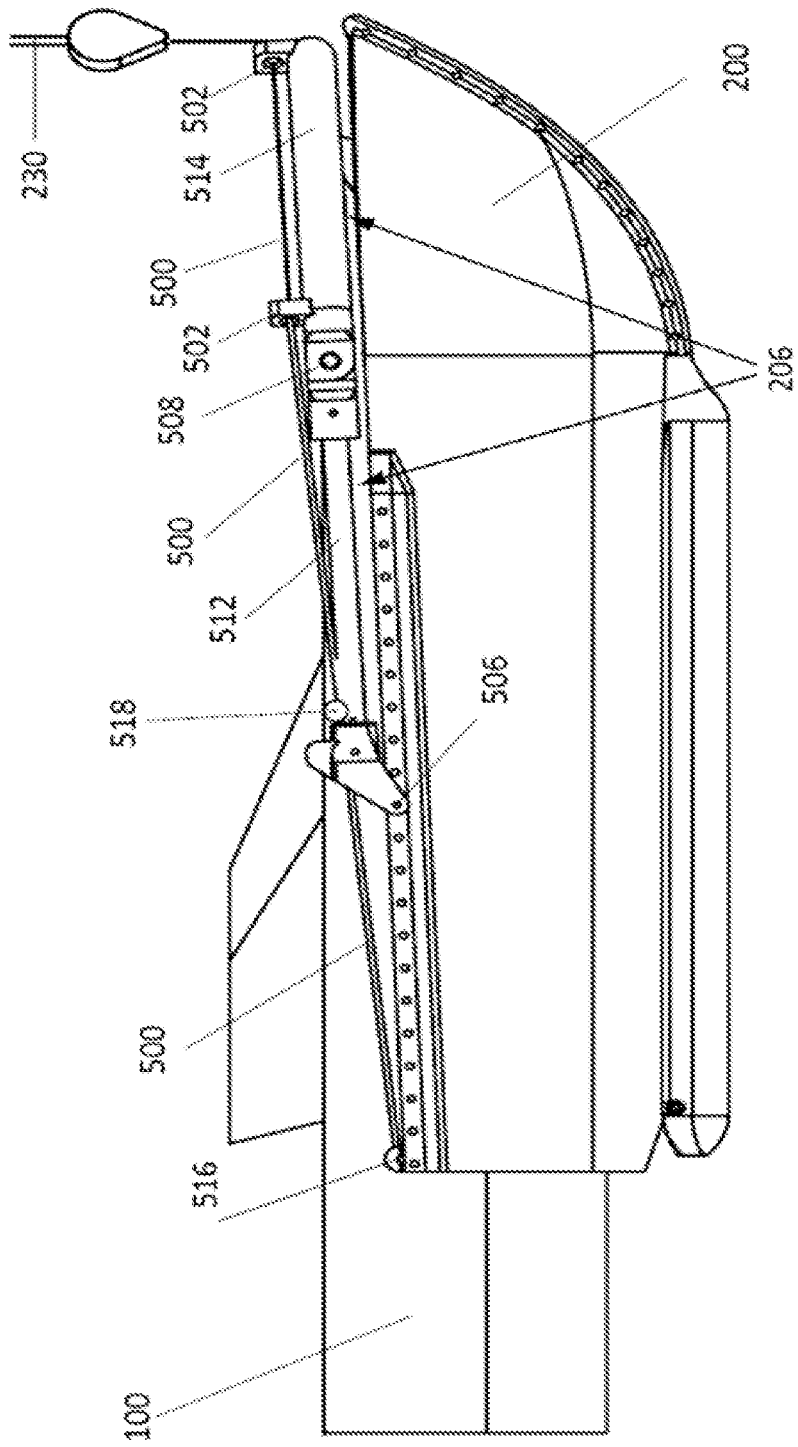

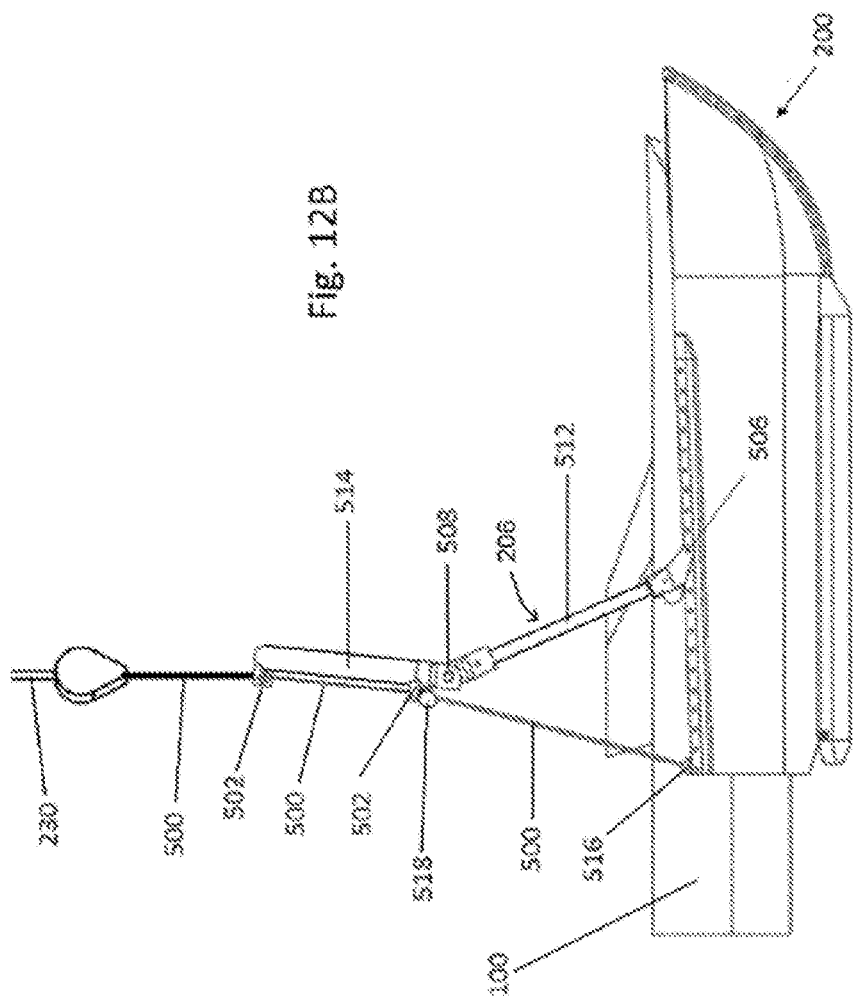

SYSTEM AND METHOD FOR LAUNCH AND RECOVERY OF A MARINE VESSEL

CROSS REFERENCE TO RELATED APPLICATIONS

The present application is a continuation of U.S. patent application Ser. No. 18/306,675, filed on Apr. 25, 2023, incorporated herein by reference, which is a continuation of U.S. patent application Ser. No. 17/496,506, filed on Oct. 7, 2021, now patented as U.S. Pat. No. 11,667,355, having an issue date of Jun. 6, 2023, incorporated herein by reference, which is a divisional of U.S. patent application Ser. No. 15/769,974, having a 35 USC § 371(c)(1),(2) date of Apr. 20, 2018, now patented as U.S. Pat. No. 11,192,614 having an issue date of Dec. 7, 2021, incorporated herein by reference, which is a U.S. National Stage of Patent Cooperation Treaty Application No. PCT/IL2016/051128, filed Oct. 19, 2016, which published as WO 2017/068578 A1 on Apr. 27, 2017, incorporated herein by reference, which claims the benefit of Israeli patent application No. 242226, filed Oct. 22, 2015, incorporated herein by reference, and claims the benefit of U.S. provisional patent application No. 62/293,361, filed Feb. 10, 2016, incorporated herein by reference.

FIELD OF THE INVENTION

The present invention relates to marine vessels. More specifically, the present invention relates to systems and methods for launch and recovery of a marine vessel at sea.

BACKGROUND OF THE INVENTION

Launch and recovery of a small vessel at sea is an intricate task requiring highly skilled personnel. It should be noted that recovering a vessel at sea is substantially more difficult than launching it to sea. Therefore, hereinbelow, for the most part, recovery of a vessel will be described, although the launch and recovery system of the present invention can be used for both launch and for recovery.

Typically, recovering a small vessel at sea onto a larger marine platform, such as large ship or a stationary marine platform (such as, but not limited to, an oil rig), requires the performance of a manual maneuver by the small vessel to bring it close to a lifting structure (e.g., a crane or a davit) and engaging the small vessel with the lifting structure. The lifting structure is then used to lift the vessel onto the larger marine platform. The large marine platform can be stationary during this maneuver or it can be moving. The large marine platform can be stationary, such as a dock, nominally stationary, such as an oil rig, or moving, such as a large ship, The waves can cause relative motion between the small vessel and the larger ship or the marine platform which is practically impossible to predict in real time. In addition, especially when the large ship or the marine platform is under way (in motion), severe instabilities can occur. These have caused many accidents during launch and recovery operations.

Some recovery methods involve using a receptacle (e.g. a cradle) onto which the vessel is hauled or otherwise brought to, which is then lifted onto the larger vessel or marine platform. The maneuver is usually carried out by the recovered vessel, in order to reduce the risk of bumping between the vessel and the receptacle. Nevertheless, the maneuver may be carried out under difficult conditions of rough sea and high wind, which make the maneuver extremely difficult to complete.

There are some known receptacle devices for performing launch and recovery at sea.

For example, in European Patent Application No. EP 2218671, there was disclosed a device for transferring objects from a first location at sea to a second location, in particular the crew of an offshore platform. The device comprises at least one lifting means and a transport means, with the proviso that the transport means comprises floating means and can be self-propelled, and the transport means comprises coupling means for coupling to the lifting means. Objects can be transferred in safe and efficient manner using the device.

In U.S. Pat. No. 4,697,533 (Bordreuil et al.) there was disclosed a device for hoisting a boat on board a ship, even when the latter is moving, in which a ramp is provided coupled to the rear of the ship for pivoting about a transverse horizontal axis related to the ship, the ramp being adapted for supporting and smoothly guiding the boat between the water and the reception zone provided on board the ship and being for this purpose formed by an array of cables stretched over a V shaped cradle.

U.S. Patent Application Publication No. 2010/018449 (Luccioni et al.) disclosed an installation and methods for recovering and/or launching a surface marine vehicle or an underwater vehicle, in particular an AUV, from a recovery base. The installation comprises a floating cage defining a housing in which at least a portion of the vehicle can penetrate, first puller means mounted on the cage and capable of pulling the vehicle into the housing, via a first flexible connection, typically a cable, and second puller means for mounting on the recovery base and capable of pulling the cage via a second flexible connection distinct from the first.

U.S. Pat. No. 7,581,507 (Kern) disclosed an embodiment of a launch/recovery device for both surface and underwater vehicles includes a plurality of driven wet-traction members arranged to form a low drag (e.g., water flow-through) ramp design. The wet-traction members provide traction even when wet between the water vehicle and the launch/recovery device. As a result of utilizing driven wet-traction members, the use of conventional hoists, special capture devices such as hooks and tow lines, and personnel located within the water to attach the capture devices to the water vehicle is eliminated. The wet-traction members provide both strength and flexibility to the launch/recovery device. That is, while the wet-traction members are strong enough to support the weight of the water vehicle, they are at the same time flexible enough to deflect a distance (e.g., about 6 to 15 inches) to accommodate a soft landing of the water vehicle on the ramp, while providing recovery forces and motion.

German Patent Application Publication No. DE102012112333 disclosed a system having a multi-arm construction in which arm elements are articulated and connected, and a swimming apparatus e.g. autonomous underwater craft, for transportation between a joggle region and a bordering device or surrounding water. The multi-arm construction is swingable supported by an articulation unit. A float floats on water around a pivotal axis of the multi-arm construction between suspension position and rescue position. A retainer is arranged for settling the swimming apparatus on or for receiving the swimming apparatus by the joggle region.

U.S. Pat. No. 6,152,065 (Groenstrand) discloses a dock for launch and recovery of a lifeboat, rescue boat or like small boat on a vessel, a floating platform or a fixed installation. The boat is normally stored on the dock. The dock is provided with buoyant elements fixed to a frame. The boat is supported in a cradle within the frame. On launching and recovery of the boat, the dock is lowered to a floating position on the surface of the water. In order to fix the boat to the dock, a locking device is provided. By modifying the configuration and size of the buoyant elements, the dock is given rolling and pitching periods which coincide as closely as possible with those of the boat. The dock and the boat will thereby behave in approximately the same manner in the water, which makes it relatively simple to run the boat into the dock even in a very heavy sea. When the boat has been introduced into the dock, it is in contact with the dock at least two points, and the boat and the dock are then fixed to one another by a locking device to form a cohesive unit.

However, in U.S. Pat. No. 6,152,065, the boat pushes itself into the cradle and capturing of the bow of the boat occurs when the boat's bow has reached the front of the cradle.

European Patent Application No. EP 2643204 discloses a launch and recovery apparatus for launching a boat into water from a supporting structure such as a ship comprises a cradle shaped to receive and support a boat and having a cradle axis, the cradle being moveable relative to the supporting structure between a first stowed position to a second ramp position at which the boat is typically in the water, and wherein the attitude of the axis of the cradle with respect to the water is steeper that when the boat is in the stowed positions. A movement mechanism is configured to move the cradle between the first stowed position and the second ramp position, typically having a linkage mechanism guiding the movement of the cradle into the water, which can be provided in a collapsing parallelogram arrangement which controls the change in attitude of the axis of the cradle as the cradle moves between the stowed and ramp positions.

However, European Patent Application No. EP 2643204 does not have an external capture system. Furthermore, it comprises a fixed lifting frame, so that there exists the possibility of masts, antennas, etc of the recovered boat to foul on the lifting frame during recovery.

U.S. Pat. No. 7,506,606 (Murphy et al.) discloses a marine handling craft and system intended for use in deploying, inspecting and receiving vessels and payloads to and from locations on, under, over or near water and wet soils in potentially turbulent aquatic or atmospheric conditions. The marine handling craft may operate as a robot, or deployed from a crane or boom on a mother ship or other platform or helicopter so that it can transport and mate and dock at various locations, such as supply ships or autonomous marine vessels, at a stand off distance to limit potential harm to valuable assets. A sliding fastener and track are included on the marine handling craft so that it can be tethered and lifted by a single line or cable, and so can be manipulated by a single crane or helicopter. The utility of the handling craft is not limited to the transport of payloads and it may function as a stand-alone vessel for various remote sensing purposes. Smart communication between the marine handling craft and other vessels or other nodes in a distributed computer network facilitates simultaneous, hierarchical and multi-tasking control of the craft and permits verification and inspection of payloads, which might otherwise cause damage when proximate to more valuable assets.

Many launch and recovery devices are configured to trap the bow of the vessel. Some known bow trapping arrangements are mentioned hereinafter.

In Japanese Patent Application Publication JP2008037251 there was disclosed an attachment device of a towing rope configured to freely move a mounting hook fixed to the towing rope that is mounted to an underwater robot. The mounting hook is mounted to a rudder post or a shoepiece forming a stern structure of a non-controllable ship.

U.S. Pat. No. 6,178,914 (Axelsson) disclosed a method which can launch and take aboard a floating device a ship under way. The floating device is arranged in and connected to a cradle which is floating as such and open at the back. The cradle hangs in a flexible carrying means and is launched using a hoisting means arranged at the ship. The bow portion of the cradle is guided using a flexible separate towing means in such a manner that the cradle, when it floats on the water, will be directed in the ship's general travelling direction. When the floating device is not connected to the cradle it is able freely to move into the cradle and out therefrom through its stern portion. The invention also relates to a means for launching and, respectively, taking aboard a floating device. The means comprises an essentially U-shaped cradle which is floating as such and having a space which is open in a direction away from the ship, the space being adapted for receiving the floating device. The invention further relates to appropriate locking and steering means for the cradle.

In U.S. Patent Application Publication No. 2014/0116312 (Kalwa et al.) there was disclosed a system and a method for recovering a submarine vehicle. The submarine vehicle is pulled by a rope and hauled by means of the rope and a recovery ramp from the body of water on board a ship or onto land. The system comprises the recovery ramp and a wave equalization ramp. The wave compensation ramp can be rotated relative to the recovery ramp about a swivel axis S and is supported by a floating body. The watercraft is picked up by means of the recovery ramp. The wave compensation ramp is hauled together with the picked-up submarine vehicle by means of the recovery ramp. The invention permits the recovery of a submarine vehicle, even in moderate or heavy seas, with less risk of damage to the submarine vehicle.

In U.S. Pat. No. 4,242,978 (Fuller) there was disclosed a hook assembly for retrieving the chain bridle component of a broken marine barge towing line. The assembly comprises a sinking hook dimensioned to receive the bridle, a float connected to the hook for maintaining it a predetermined distance below the surface of the water, and a hook towing line connected to the hook for deploying it into position for intercepting and engaging the bridle. Hook positioning means locates the hook in bridle-engaging position.

An alternative launch and recovery arrangement involves a crane or davit for lowering the vessel to sea level or raising the vessel off the surface of the sea and onto a marine platform, with the crane or davit hooking the vessel from the top. For example, U.S. Pat. No. 4,406,244 (Buchan et al.) discloses a launching and recovery apparatus for a lifeboat, rescue launch or like small boat fitted to a ship, floating or fixed marine platform or other vessel which is controlled by a single fall comprising a launching and recovery cradle from which a boat can hang freely on a releaseable support. During its travel between a fully hoisted and a partly lowered position the boat and cradle are supported on trackways extending inwardly and upwardly from the deck of the vessel by roller assemblies at the base of the cradle which run on the respective trackways. The cradle has a symmetrical upwardly convergent frame whose apex is arranged for connection of the single fall wire by which the cradle is held in a stable attitude during launching and recovery with the boat suspended freely from the cradle on a single releasable support. A single sheave located above the cradle symmetrically between the trackways takes up or pays out the fall wire, to raise or lower the cradle. The boat is suspended from a position well above its center of gravity which assists stability in roll and pitch and the arrangement is of simplified construction and uses less moving parts than previous designs of cradle launched boats.

Another alternative for launch and recovery at sea uses a towed platform. For example, U.S. Pat. No. 7,156,036 (Seiple) discloses a launch and recovery system that provides a dive wing and drogue assembly towed behind a ship by cables. The dive wing imparts a downward thrust to the drogue, so that the drogue is towed underwater, placing tension on the cables. The cables become stiff due to the speed of the ship and the weight and depth of the dive wing and drogue assembly, so that the cables take on the character of rails. The boat or watercraft to be launched is placed on a sling carriage that is slidably mounted on the cables, so that the sling slides down the cables, launching the watercraft in the stable wake of the ship. The watercraft is recovered by tying a winch cable or line to the watercraft, winching the watercraft back onto the sling, and winching the sling back onto the fantail of the ship.

Known also is a bow capturing device, such as the one described in U.S. Patent Application Publication No. 2012/0227655 (Urciuoli). Disclosed is an engagement apparatus for use in the deployment and recovery of a marine craft from a mother ship comprises a receptacle provided on one of the marine craft and the mother ship and an engagement probe provided on the other of the marine craft and the mother ship. The receptacle has a number of spaced channels which receive the engagement probe, engagement between the probe and the channels facilitating alignment between the marine craft and the mother ship. A locking device is also provided to secure the probe to the receptacle to secure the marine craft to the mother ship for recovery. The locking device may be activated by full engagement between the probe and the receptacle.

Therefore, there is a long-felt and unmet need for a device and system which allow automatic, safe and consistent recovery of a small vessel onto a large ship or platform, and launch of a small vessel from a large ship or platform, whether the large ship or platform is stationary or under way, such that the launch or recovery can be carried out whatever the state of the waves.

SUMMARY OF THE INVENTION

Therefore, there is a long-felt and unmet need for a device and system which allow It is one object of the present invention to provide a capturing mechanism for the recovery of at least one vessel to at least one marine platform; said at least one vessel having at least one engagement device either permanently or at least partially reversibly connectable to the same; said capturing mechanism comprising:
  a. at least one tensioned capturing line connected to said at least one marine platform; and
  b. at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof;

wherein said capturing mechanism is configured to blindly sweep said at least one tensioned capturing line along a substantial portion of a keel-stem line of said at least one vessel toward said engagement device, until at least partial contact is made between said at least one tensioned capturing line and said engagement device, said at least one tensioned capturing line is capturable by said engagement device upon said at least partial contact between the same and said at least one tensioned capturing line.

It is another object of the present invention to provide the capturing mechanism as disclosed above, wherein at least one of the following is true:
  a. capturing of said at least one tensioned capturing line by said engagement device is at least partially reversible;
  b. said at least one line maneuvering mechanism comprises at least two line arms, said line arms characterized by having a distal end and a proximal end; said at least one tensioned capturing line is connected to said distal portion of said line arms; said proximal end is connected to said at least one marine platform;
  c. each of said at least two line arms is further characterized by at least one anchoring holder for said at least one tensioned capturing line, said at least one anchoring holder being either movable along said at least one line arm or at a fixed position along said at least one line arm;
  d. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;
  e. said at least one marine platform is at least one cradle;
  f. said at least one marine platform is open at a stern thereof;
  g. shape of said at least one said marine platform either allows water to pass through it or does not allow water to pass through it;
  h. at least a portion of said at least one captured vessel is haulable onto at least a portion of said at least one marine platform;
  i. said at least one marine platform has a deployable lifting structure:
  j. said at least one marine platform is liftable, by means of at least one lifting mechanism, onto at least a portion of at least one second marine platform, either such that said at least one marine platform is not supporting any vessel or such that said at least one marine platform is at least partially supporting said at least one vessel; and
  k. said at least one marine platform is connectable to at least a portion of said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and
l. any combination thereof.

It is another object of the present invention to provide the capturing mechanism as disclosed above, wherein said at least one marine platform additionally comprises at least one movable support stage; at least one of the following being true:
a. at least a portion of said at least one captured vessel is mounted onto at least a portion of said at least one movable support stage;
b. at least a portion of said at least one movable support stage is haulable onto at least a portion of said at least one marine platform;
c. at least one said movable support stage comprises at least one fin and said at least one marine platform comprises at least one groove with which said at least one fin is movable; and
d. any combination thereof.

It is another object of the present invention to provide the capturing mechanism as disclosed above, wherein said engagement device is selected from a group consisting of:
a. a rearward-facing hook;
b. a magnetic catch; further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;
c. a rearward-facing slot in a stem or keel of said at least one vessel; further wherein said at least one tensioned capturing line is characterized by at least one guide configured to catch in said slot and induce said at least one tensioned capturing line to enter said slot;
d. a rearward-facing latch; said rearward-facing latch is configured to be openable under pressure from outside the same and automatically closeable; pressure from inside the same physically preventing opening of said latch, such that escape of said at least one tensioned capturing line from said rearward-facing latch is obviated;
e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and
f. any combination thereof.

It is another object of the present invention to provide the capturing mechanism as disclosed above, wherein a member of a group consisting of: said at least one marine platform, said capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:
a. identification that said at least one vessel is in a trapping zone, said trapping zone being a region such that, said at least one engagement device being in said trapping zone, movement of said at least one tensioned capturing line towards the keel or stem and then sweeping of said at least one tensioned capturing line while in contact with said keel of or stem of said vessel towards said engagement device eventuates in contact between said at least one tensioned capturing line and said engagement device;
b. entry of said at least one engagement device of said at least one vessel into said trapping zone of said capturing mechanism;
c. at least partial contact between said at least one tensioned capturing line and said at least one keel or stem line of a vessel;
d. lack of contact between said at least one tensioned capturing line and said at least one keel or stem line of a vessel;
e. completion of capturing of said engagement device;
f. completion of hauling of said at least one captured vessel;
g. at least one change in position of at least one portion of said capturing mechanism; and
h. any combination thereof.

It is another object of the present invention to provide the capturing mechanism as disclosed above, wherein said at least one marine platform additionally comprises at least one actuatable deployable lifting structure connected to said at least one marine platform; said at least one deployable lifting structure is connected at its bottom end to said at least one marine platform and at its top end to a lifting device (such as a crane); further wherein said at least one deployable lifting structure is characterized by at least two configurations; a stowed configuration which is substantially horizontal with regards to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration; wherein actuation of said deployable lifting structure between stowed and erect configuration can be done during a launch and recovery procedure; at least one of the following being true:
a. said at least one deployable lifting structure is formed so as to substantially conform to the outer sides and front contour of said at least one marine platform when in said stowed configuration;
b. said at least one deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;
c. said at least one deployable lifting structure further comprises at least one guide mechanism, said guide mechanism selected from a group consisting of: a coupler and an interior of said deployable lifting structure; said at least one frame line passing through said at least one guide mechanism so said at least one frame line is pullable at said top end of it, such that when said top end of said at least one frame line is pulled, said at least one deployable lifting structure is configured to be raised from said stowed configuration to said erect configuration;

d. said at least one deployable lifting structure additionally comprises at least two limiters configured to limit a maximum angle of said at least one deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and e. any combination thereof.

It is another object of the present invention to provide the capturing mechanism as disclosed above, additionally comprising a set of instructions configured to be executed on a processor which, when executed, at least partially automatically control said recovery of said at least one vessel onto said at least one marine platform, said instructions comprising:

a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;

b. instructions which, when executed, are configured to play out at least one tensioned capturing line; thereby said trapping zone is defined;

c. instructions which, when executed, are configured to raise said at least one tensioned capturing line upward, when at least a portion of said at least one vessel is identified as being in said trapping zone;

d. instructions which, when executed, are configured to identify, from a signal from said at least one sensor, contact between said at least one tensioned capturing line and said at least one vessel;

e. instructions which, when executed, are configured to keep at least partial contact between said at least one tensioned capturing line and a keel or stem of said at least one vessel;

f. instructions which, when executed, are configured to play in said at least one tensioned capturing line in a sea while maintaining at least partial contact between said at least one tensioned capturing line and said keel or stem, so as to cause said at least one tensioned capturing line to contact at least one engagement device, said contact inducing capture of said at least one tensioned capturing line by said engagement device; and g. instructions which, when executed, are configured to haul said at least one captured vessel to said at least one marine platform.

It is another object of the present invention to provide the capturing mechanism as disclosed above, additionally comprising at least one of the following:

a. instructions which, when executed, are configured to lift said at least one marine platform, by means of a lifting mechanism, onto at least one second marine platform;

b. instructions which, when executed, are configured to reduce thrust of said at least one vessel after said at least one tensioned capturing line has been captured by said engagement device; and c. any combination thereof.

It is another object of the present invention to provide a method for recovering at least one vessel to at least one marine platform, said at least one vessel having at least one engagement device either permanently or at least partially reversibly connectable to the same, comprising steps of:

a. connecting at least one tensioned capturing line to said at least one marine platform;

b. providing at least one line maneuvering mechanism configured to displace said at least one tensioned capturing line in at least one direction selected from a group consisting of: up, down, left, right, forward, backward. playable into said at least one marine platform, playable out of said at least one marine platform, playable into and out of the water and any combination thereof; placing the tensioned capturing line outside the platform at a depth extending from sea surface to a depth greater than a depth of a keel of said at least one vessel;

c. maneuvering a bow of said at least one vessel into a trapping zone of said at least one marine platform, said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;

d. raising said at least one tensioned capturing line upward when said at least one vessel is in said trapping zone; and keeping at least partial contact between said at least one tensioned capturing line and said keel or stem; and e. playing in said at least one tensioned capturing line, while blindly sweeping said at least one tensioned capturing line along a substantial portion of a keel-stem line of said at least one vessel toward said engagement device and while maintaining at least partial contact between said at least one tensioned capturing line and said keel or stem, so as to cause said at least one tensioned capturing line to contact at least one engagement device, said contact inducing capture of said at least one tensioned capturing line by said at least one engagement device.

It is another object of the present invention to provide the method as disclosed above, additionally comprising at least one of the following steps:

a. at least partially reversibly capturing said at least one tensioned capturing line by said engagement device;

b. providing said at least one line maneuvering mechanism with at least two line arms, said line arms characterized by having a distal end and a proximal end; connecting said at least one tensioned capturing line to said distal portion of said at least two line arms; and connecting said proximal end to said at least one marine platform;

c. providing each of said at least two line arms with at least one anchoring holder for said at least one tensioned capturing line, said anchoring holder being either movable along said line arm or in a fixed position in said line arm, and, said anchoring holder being movable along said line arm, moving said at least one anchoring holder along said at least one line arm;

d. allowing development of a 'V'-shape in at least a portion of said at least one tensioned capturing line after capture of said at least one tensioned capturing line by said engagement device, by means of a member of a group consisting of: playing out at least a portion of said at least one tensioned capturing line, allowing at least two of said anchoring holders to approach each other, providing elasticity to said at least one tensioned capturing line and any combination thereof;
e. providing said at least one marine platform as at least one cradle;
f. providing said at least one marine platform open at a stern thereof;
g. providing said at least one marine platform with shape of said at least one said marine platform either allows water to pass through it or does not allow water to pass through it;
h. hauling said at least one said captured vessel at least partly onto at least a portion of said at least one marine platform and any combination thereof.
i. providing said at least one marine platform with a deployable lifting structure:
j. lifting, by means of at least one lifting mechanism, said at least one marine platform onto at least one second marine platform, either such that said at least one marine platform is not supporting any vessel or such that said at least one marine platform is at least partially supporting said at least one vessel;
k. connecting said at least one marine platform to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and any combination thereof; and
l. any combination thereof.

It is another object of the present invention to provide the method as disclosed above, additionally comprising step of providing at least one movable support stage for said at least one marine platform; additionally comprising at least one of the following steps:
a. mounting at least a portion of said at least one captured vessel onto at least a portion of at least one said movable support stage;
b. hauling at least a portion of said at least one movable support stage onto at least a portion of said at least one marine platform;
c. providing at least one said movable support stage with at least one fin and providing said at least one marine platform with at least one groove with which said at least one fin is movable; and
d. any combination thereof.

It is another object of the present invention to provide the method as disclosed above, additionally comprising selecting said at least one engagement device from at least one member of a group consisting of:
a. a rearward-facing hook;
b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;
c. a rearward-facing slot in a stem or keel of said at least one vessel, further wherein said at least one tensioned capturing line is characterized by at least one guide configured to catch in said slot and induce said at least one tensioned capturing line to enter said slot;
d. a rearward-facing latch; further wherein said rearward-facing latch is configured to be openable under pressure from outside the same and automatically closeable; pressure from inside the same physically preventing opening of said latch, such that escape of said at least one tensioned capturing line from said rearward-facing latch is obviated;
e. a rearward-facing shackle, further wherein said rearward-facing shackle is configured to be openable under pressure from outside the same and automatically closeable; pressure from inside the same physically preventing opening of said shackle, such that escape of said at least one tensioned capturing line from said rearward-facing shackle is obviated; and
f. any combination thereof.

It is another object of the present invention to provide the method as disclosed above, additionally comprising steps of: providing a member of a group consisting of said at least one marine platform, at least one capturing mechanism and any combination thereof with at least one sensor; and selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; and detecting, via said at least one sensor, at least one member selected from a group consisting of:
a. identification that said at least one vessel is in said trapping zone;
b. entry of said at least one engagement device of said at least one vessel into said trapping zone of said at least one capturing mechanism;
c. at least partial contact between said at least one tensioned capturing line and said at least one keel or stem line of a vessel;
d. lack of contact between said at least one tensioned capturing line and said at least one keel or stem line of a vessel;
e. completion of capturing of said engagement device;
f. completion of hauling of said at least one captured vessel;
g. at least one change in position of at least one portion of said at least one capturing mechanism;
h. and any combination thereof.

It is another object of the present invention to provide the method as disclosed above, additionally comprising steps of:
a. providing, for said at least one marine platform, at least one actuatable deployable lifting structure;
b. connecting said at least one deployable lifting structure at its bottom end to said at least one marine platform and at its top end to a lifting device (such as a crane);
c. reversibly transitioning said at least one deployable lifting structure between a stowed configuration and an erect configuration; said stowed configuration being substantially horizontal with regard to sides of said at least one marine platform such that allows safe hauling of a vessel onto said marine platform with no elements of said stowed lifting structure above said hauled vessel (clear sky); said erect configuration being substantially erect such that a center of gravity of said at least one marine platform, with or without a vessel on board, is substantially under the top end of said deployable lifting structure in its erect configuration; wherein actuation of deployable lifting structure between stowed and erect configuration can be done during a launch and recovery procedure.

It is another object of the present invention to provide the method as disclosed above, additionally comprising at least one of the following steps:
  a. forming said at least one deployable lifting structure so as to substantially conform to the outer sides and front contour of said at least one marine platform when in said stowed configuration;
  b. providing said at least one deployable lifting structure with at least two substantially opposite frame bars, said frame bars characterized by a distal end and a proximal end, providing a connection between said distal ends of said frame bars, and hingedly connecting said proximal end of said frame bars to substantially opposite side positions of said at least one marine platform;
  c. providing said at least one deployable lifting structure with at least one guide mechanism, said guide mechanism selected from a group consisting of: a coupler and an interior of said deployable lifting structure; passing said at least one frame line through said at least one guide mechanism;
  d. providing said at least one deployable lifting structure with at least two limiters configured to limit a maximum angle of said at least one deployable lifting structure with respect to said at least one marine platform, said at least two limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof;
  e. pulling said at least one frame line at said top end of said at least one deployable lifting structure, thereby reversibly transitioning said at least one deployable lifting structure from said stowed configuration to said erect configuration;
  f. lifting said at least one marine platform onto at least one second marine platform by pulling on said at least one frame line at said top end of said deployable lifting structure; and
  g. any combination thereof.

It is another object of the present invention to provide the method as disclosed above, additionally comprising at least partially automatically controlling recovery of said at least one vessel onto said at least one marine platform, comprising steps of:
  a. providing a set of instructions, comprising:
    i. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
    ii. instructions which, when executed, are configured to play out at least one tensioned capturing line; thereby said trapping zone is defined;
    iii. instructions which, when executed, are configured to raise said at least one tensioned capturing line upward, when at least a portion of said at least one vessel is identified as being in said trapping zone;
    iv. instructions which, when executed, are configured to identify, from a signal from said at least one sensor, contact between said at least one tensioned capturing line and said at least one vessel;
    v. instructions which, when executed, are configured to keep at least partial contact between said at least one tensioned capturing line and a keel or stem of said at least one vessel;
    vi. instructions which, when executed, are configured to play in said at least one tensioned capturing line in a sea, thereby blindly sweeping said at least one tensioned capturing line along a substantial portion of a keel-stem line of said vessel, while maintaining at least partial contact between said at least one tensioned capturing line and said keel or stem, so as to cause said at least one tensioned capturing line to contact at least one engagement device, said contact inducing capture of said at least one tensioned capturing line by said engagement device; and
    vii. instructions which, when executed, are configured to haul said at least one captured vessel to said at least one marine platform; and
  b. executing said instructions.

It is another object of the present invention to provide the method as disclosed above, additionally comprising at least one of the following steps:
  a. providing instructions which, when executed, are configured to reduce thrust of said at least one vessel after said at least one tensioned capturing line has been captured by said engagement device;
  b. providing instructions which, when executed, are configured to lift said at least one marine platform, by means of a lifting mechanism, onto at least one second marine platform; and
  c. any combination thereof.

It is another object of the present invention to provide an actuatable deployable lifting structure connected at its bottom end to at least one marine platform and at its top end to a lifting device (such as a crane); wherein said deployable lifting structure is characterized by at least two configurations; a stowed configuration which is substantially horizontal with regard to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration: actuation of deployable lifting structure between stowed and erect configuration can be done during a launch and recovery procedure;

It is another object of the present invention to provide the actuatable deployable lifting structure as disclosed above, wherein at least one of the following is true:
  a. said deployable lifting structure is formed so as to substantially conform to the outer sides and front contour of said at least one marine platform when in said stowed configuration;

b. said deployable lifting structure comprises at least one frame line connected at its bottom end to said at least one marine platform:

c. said deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;

d. said deployable lifting structure further comprises at least one guide mechanism, said guide mechanism selected from a group consisting of: a coupler and an interior of said deployable lifting structure, said at least one frame line passing through said at least one guide mechanism so that said at least one frame line is pullable at said top end of said deployable lifting structure, said pull on said frame line at said top end of said deployable lifting structure configured to raise said deployable lifting structure from said stowed configuration to said erect configuration;

e. said deployable lifting structure additionally comprises at least two limiters configured to limit a maximum angle of said deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and f. any combination thereof.

It is another object of the present invention to provide the actuatable deployable lifting structure as disclosed above, wherein said at least one marine platform additionally comprises at least one capturing mechanism for recovery of at least one vessel to said at least one marine platform, said at least one capturing mechanism comprising: (a) at least one tensioned capturing line connected to said at least one marine platform; and (b) at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof; said at least one tensioned capturing line is capturable by said engagement device upon at least partial contact between the same and said at least one tensioned capturing line.

It is another object of the present invention to provide the actuatable deployable lifting structure as disclosed above, wherein said at least one vessel has at least one engagement device either permanently or at least partially reversibly connectable to the same; said engagement device comprises at least one member of a group consisting of:

a. a rearward-facing hook;

b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable; pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the actuatable deployable lifting structure as disclosed above, wherein at least one of the following is true:

a. capturing of said at least one tensioned capturing line by said engagement device is at least partially reversible;

b. said at least one line maneuvering mechanism comprises at least two line arms, each of said at least two line arms characterized by having a distal portion and a proximal portion; said at least one tensioned capturing line is connected to said distal portion of each of said at least two line arms; said proximal portion is connected to said at least one marine platform;

c. each of said at least two line arms is further characterized by at least one anchoring holder for said at least one tensioned capturing line, said at least one anchoring holder being either movable along at least one of said at least two line arms or at a fixed position along said at least one of said at least two line arms;

d. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;

e. said at least one said marine platform is at least one cradle;

f. said at least one marine platform is open at a stern thereof;

g. shape of said at least one said marine platform either allows water to pass through it or does not allow water to pass through it;

h. at least a portion of said at least one captured vessel is haulable onto at least a portion of said at least one marine platform;

i. said at least one marine platform has a deployable lifting structure:

j. said at least one marine platform is liftable, by means of at least one lifting mechanism, onto at least one second marine platform, either such that said at least one marine platform is not supporting any vessel or such that said at least one marine platform is at least partially supporting said at least one vessel; and k. said at least one marine platform is connectable to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and l. any combination thereof.

It is another object of the present invention to provide the actuatable deployable lifting structure as disclosed above, wherein said at least one marine platform additionally comprises at least one movable support stage; at least one of the following being true:

a. at least a portion of said at least one captured vessel is mounted onto at least a portion of said at least one movable support stage;

b. at least a portion of said at least one movable support stage is haulable onto at least a portion said at least one marine platform;

c. at least one said movable support stage comprises at least one fin and said at least one marine platform comprises at least one groove with which said at least one fin is movable; and d. any combination thereof.

It is another object of the present invention to provide the actuatable deployable lifting structure as disclosed above, wherein a member of a group consisting of: said at least one marine platform, said at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:

a. identification that said at least one vessel is in a trapping zone, said trapping zone being a region such that, said at least one engagement device being in said trapping zone, movement of said at least one tensioned capturing line towards a keel or stem and then towards said engagement device eventuates in contact between said at least one tensioned capturing line and said engagement device;

b. entry of said at least one engagement device of said at least one vessel into said trapping zone of said at least one capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said at least one capturing mechanism; and h. any combination thereof.

It is another object of the present invention to provide the actuatable deployable lifting structure as disclosed above, additionally comprising a set of instructions configured to be executed on a processor which, when executed, at least partially automatically control said recovery of said at least one vessel onto said at least one marine platform, said instructions comprising:

a. instructions which, when executed, are configured to control said at least one vessel maneuvering mechanism of said at least one vessel; said at least one vessel maneuvering mechanism is selected from a group consisting of: an engine of said at least one vessel, steering of said at least one vessel and any combination thereof;

b. instructions which, when executed, are configured perform at least one of a group consisting of: play out at least one tensioned capturing line, maneuver at least one of said at least two line arms and any combination thereof; thereby said trapping zone is defined;

c. instructions which, when executed, are configured to raise said at least one tensioned capturing line upward, when said at least one vessel is identified as being in said trapping zone;

d. instructions which, when executed, are configured to keep at least partial contact between said at least one tensioned capturing line and a keel or stem of said at least one vessel;

e. instructions which, when executed, are configured to identify, from a signal from said at least one sensor, contact between said at least one tensioned capturing line and said at least one vessel;

f. instructions which, when executed, are configured to play in said at least one tensioned capturing line in a sea thereby blindly sweeping said at least one tensioned capturing line along a keel-stem line while maintaining at least partial contact between said at least one tensioned capturing line and said keel or stem, so as to cause said at least one tensioned capturing line to contact at least one engagement device, said contact inducing capture of said at least one tensioned capturing line by said engagement device; and g. instructions which, when executed, are configured to haul said at least one captured vessel to said at least one marine platform.

It is another object of the present invention to provide the actuatable deployable lifting structure as disclosed above, additionally comprising at least one of the following:

a. instructions which, when executed, are configured to reduce thrust of said at least one vessel after said at least one tensioned capturing line has been captured by said engagement device;

b. instructions which, when executed, are configured to lift said at least one marine platform, by means of a lifting mechanism, onto said at least one marine platform; and c. any combination thereof.

It is another object of the present invention to provide a method of deploying a deployable lifting structure, comprising steps of:

a. providing said deployable lifting structure comprising at least one frame line;

b. hingedly connecting said deployable lifting structure to at least one marine platform;

c. connecting said at least one frame line at its bottom end to said at least one marine platform; passing said at least one frame line through at least one guide mechanism in said frame, said guide mechanism selected from a group consisting of: a coupler and an interior of said deployable lifting structure;

d. pulling said at least one frame line at said top end of said at least one deployable lifting structure, thereby reversibly transitioning said at least one deployable lifting structure from said stowed configuration to said erect configuration;

wherein said stowed configuration is characterized by said deployable lifting structure being substantially horizontal with regard to sides of said at least one marine platform such that allows safe hauling of a vessel onto said marine platform with no elements of said stowed lifting structure above said hauled vessel (clear sky); such that allows safe hauling of a vessel onto said marine platform with no elements of said stowed lifting structure above said hauled vessel (clear sky);

further wherein said erect configuration is characterized by said deployable lifting structure being substantially erect such that a center of gravity of said at least one marine platform, with or without at least one vessel on board, is substantially under a top end of said deployable lifting structure in its erect configuration.

It is another object of the present invention to provide the method as disclosed above, additionally comprising at least one of the following steps:

a. forming said deployable lifting structure so as to substantially conform to the outer sides and front contour of said at least one marine platform when in said stowed configuration;

b. providing said deployable lifting structure with at least two substantially opposite frame bars, said frame bars characterized by a distal end and a proximal end, providing a connection between said distal ends of said frame bars, and hingedly connecting said proximal end of said at least two frame bars to substantially opposite side positions of said at least one marine platform;

c. providing said deployable lifting structure with at least one guide mechanism; passing said at least one frame line through said at least one guide mechanism, said guide mechanism selected from a group consisting of: a coupler and an interior of said deployable lifting structure;

d. providing said deployable lifting structure with at least two limiters configured to limit a maximum angle of said deployable lifting structure with respect to said at least one marine platform, said limiters configured such that a center of gravity of said at least one marine platform, with or without said at least one vessel on board, substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof;

e. pulling said at least one frame line at said top end of said deployable lifting structure, thereby reversibly transitioning said deployable lifting structure, via said pull on said frame line, from said stowed configuration to said erect configuration;

f. lifting said at least one marine platform onto at least one second marine platform by pulling on said at least one frame line at said top end of said deployable lifting structure; and g. any combination thereof.

It is another object of the present invention to provide the method as disclosed above, additionally comprising step of providing said at least one vessel with at least one engagement device either permanently or at least partially reversibly connectable to the same; and selecting said at least one engagement device from at least one member of a group consisting of:

a. a rearward-facing hook;

b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable, pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the method as disclosed above, additionally comprising step of providing at least one capturing mechanism for recovery of said at least one vessel to said at least one marine platform, said at least one capturing mechanism in mechanical communication with said at least one marine platform, said at least one capturing mechanism comprising (a) said at least one tensioned capturing line; and (b) at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof; said at least one tensioned capturing line is capturable by said engagement device upon at least partial contact between the same and said at least one tensioned capturing line.

It is another object of the present invention to provide the method as disclosed above, additionally comprising at least one of the following steps:

a. at least partially reversibly capturing said at least one tensioned capturing line by said engagement device;

b. providing said at least one line maneuvering mechanism with at least two line arms, each of said at least two line arms characterized by having a distal portion and a proximal portion;

connecting said at least one tensioned capturing line to said distal portion of each of said at least two line arms; and connecting said proximal portions to said at least one marine platform;

c. providing each of said at least two line arms with at least one anchoring holder for said at least one tensioned capturing line, said anchoring holder being either movable along said line arm or in a fixed position in said line arm, and, said anchoring holder being movable along said line arm, moving said at least one anchoring holder along said at least one line arm;

d. allowing development of a 'V'-shape in at least a portion of said at least one tensioned capturing line after capture of said at least one tensioned capturing line by said engagement device, by means of a member of a group consisting of: playing out a portion of said at least one tensioned capturing line, allowing at least two of said anchoring holders to approach each other, providing elasticity to said at least one tensioned capturing line and any combination thereof;

e. providing said at least one marine platform as at least one cradle;

f. providing said at least one marine platform open at a stern thereof;

g. providing said at least one marine platform with shape of said at least one said marine platform either allows water to pass through it or does not allow water to pass through it;

h. hauling said at least one vessel at least partly onto at least a portion of said at least one marine platform;

i. lifting, by means of at least one lifting mechanism, said at least one marine platform onto said at least one second marine platform, either such that said at least one marine platform is not supporting any vessel or such that said at least one marine platform is at least partially supporting said at least one vessel;

j. connecting said at least one marine platform to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and any combination thereof; and k. any combination thereof.

It is another object of the present invention to provide the method as disclosed above, additionally comprising step of providing at least one movable support stage for said at least one marine platform; and additionally comprising at least one of the following steps:

a. mounting at least a portion of said at least one captured vessel onto at least a portion of at least one said movable support stage;

b. hauling at least a portion of said at least one movable support stage onto at least a portion of said at least one marine platform;

c. providing at least one said movable support stage with at least one fin and said at least one marine platform with at least one groove with which said at least one fin is movable; and d. any combination thereof.

It is another object of the present invention to provide the method as disclosed above, additionally comprising steps of: providing a member of a group consisting of: said at least one marine platform, said at least one capturing mechanism and any combination thereof with at least one sensor; selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; and detecting, via said at least one sensor, at least one member selected from a group consisting of:

a. Identification that said at least one vessel is in a trapping zone, said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;

b. entry of said at least one engagement device of said at least one vessel into said trapping zone of said at least one capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said at least one capturing mechanism;

h. and any combination thereof.

It is another object of the present invention to provide the method as disclosed above, additionally comprising at least partially automatically controlling recovery of said at least one vessel onto said at least one marine platform, comprising steps of:

a. providing a set of instructions, comprising:
  i. instructions which, when executed, are configured to control said at least one vessel maneuvering mechanism of said at least one vessel; said at least one vessel maneuvering mechanism is selected from a group consisting of: an engine of said at least one vessel, steering of said at least one vessel and any combination thereof;
  ii. instructions which, when executed, are configured to play out at least one tensioned capturing line; thereby said trapping zone is defined;
  iii. instructions which, when executed, are configured to raise said at least one tensioned capturing line upward, when at least a portion of said at least one vessel is identified as being in said trapping zone;
  iv. instructions which, when executed, are configured to identify, from a signal from said at least one sensor, contact between said at least one tensioned capturing line and said at least one vessel;

v. instructions which, when executed, are configured to keep at least partial contact between said at least one tensioned capturing line and a keel or stem of said at least one vessel;

vi. instructions which, when executed, are configured to play in said at least one tensioned capturing line in a sea, thereby blindly sweeping said at least one tensioned capturing line along a substantial portion of a keel-stem line while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and vii. instructions which, when executed, are configured to haul said at least one captured vessel to said at least one marine platform; and b. executing said instructions.

It is another object of the present invention to provide the method as disclosed above, additionally comprising at least one of the following steps:

a. providing instructions which, when executed, are configured to reduce thrust of said at least one vessel after said at least one tensioned capturing line has been captured by said engagement device;

b. providing instructions which, when executed, are configured to lift said at least one marine platform, by means of a lifting mechanism, onto said at least one second marine platform; and c. any combination thereof.

It is another object of the present invention to provide an engagement device either permanently or at least partially reversibly connectable to at least one vessel, configured to automatically capture a dynamically moving at least one tensioned capturing line said dynamically moving at least one tensioned capturing line being blindly sweepable along a substantial portion of a keel-stem line of said at least one vessel.

It is another object of the present invention to provide the engagement device as disclosed above, wherein said engagement device is connectable to said at least one vessel at a location selected from a group consisting of a keel of said at least one vessel, a prow of said at least one vessel, a stem of said at least one vessel, a bottom of said at least one vessel, a stern of said at least one vessel, and any combination thereof; said engagement device comprising at least one member of a group consisting of:

a. a rearward-facing hook;

b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable, pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the engagement device as disclosed above, additionally comprising at least one capturing mechanism characterized by:

a. said at least one tensioned capturing line, connected to at least one marine platform; and b. at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof;

said at least one tensioned capturing line being capturable by said engagement device upon at least partial contact between the same and said at least one tensioned capturing line.

It is another object of the present invention to provide the engagement device as disclosed above, wherein a member of a group consisting of: said at least one marine platform, said at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:

a. identification that said at least one vessel is in said trapping zone;

b. entry of said at least one engagement device of said at least one vessel into said trapping zone of said at least one capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said at least one capturing mechanism; and h. any combination thereof.

It is another object of the present invention to provide the engagement device as disclosed above, wherein at least one of the following is true:

a. said at least one line maneuvering mechanism comprises at least two line arms, each of said line arms characterized by having a distal portion and a proximal portion; said at least one tensioned capturing line is connected to each of said distal portions of said at least two line arms; said proximal ends are connected to said at least one marine platform;

b. each of said at least two line arms is further characterized by at least one anchoring holder for said at least one tensioned capturing line, said at least one anchoring holder being either movable along said at least one of said at least two line arms or at a fixed position along said at least one of said at least two line arms;

c. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;

d. said at least one marine platform is at least one cradle;

e. said at least one marine platform is open at a stern thereof;

f. shape of said at least one said marine platform either allows water to pass through it or does not allow water to pass through it;

g. at least a portion of said at least one captured vessel is haulable onto said at least one marine platform;

h. said at least one marine platform is liftable, by means of at least one lifting mechanism, onto at least one second marine platform, either such that said at least one marine platform is not supporting any vessel or such that said at least one marine platform is at least partially supporting said at least one vessel; and i. said at least one marine platform is connectable to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and j. any combination thereof.

It is another object of the present invention to provide the engagement device as disclosed above, wherein said at least one marine platform a additionally comprises at least one movable support stage; at least one of the following being true:

a. at least a portion of said at least one captured vessel is mounted onto at least a portion of said at least one movable support stage;

b. at least a portion of said at least one movable support stage is haulable onto at least a portion said at least one marine platform;

c. at least one said movable support stage comprises at least one fin and said at least one marine platform comprises at least one groove with which said at least one fin is movable; and d. any combination thereof.

It is another object of the present invention to provide the engagement device as disclosed above, wherein said at least one marine platform additionally comprises at least one actuatable deployable lifting structure connected to said at least one marine platform; said at least one deployable lifting structure is connected at its bottom end to said at least one marine platform and at its top end to a lifting device (such as a crane); said at least one deployable lifting structure is characterized by at least two configurations; a stowed configuration which is substantially horizontal with regards to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration; actuation of deployable lifting structure between stowed and erect configuration can be done during a launch and recovery procedure:

a. said at least one deployable lifting structure is formed so as to substantially conform to the outer sides and front contour of said at least one marine platform when in said stowed configuration;

b. Said deployable lifting structure comprises at least one frame line connected at its bottom end to said at least one marine platform:

c. said at least one deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;

d. said at least one deployable lifting structure further comprises at least one guide mechanism, said guide mechanism selected from a group consisting of: a coupler and an interior of said deployable lifting structure; said at least one frame line passing through said at least one guide mechanism so said at least one frame line is pullable at said top end of said at least one deployable lifting structure, said pull on said top end of said at least one deployable lifting structure configured to raise said at least one deployable lifting structure from said stowed configuration to said erect configuration;

e. said at least one deployable lifting structure additionally comprises at least two limiters configured to limit a maximum angle of said at least one deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and f. any combination thereof.

It is another object of the present invention to provide the engagement device as disclosed above, additionally comprising a set of instructions configured to be executed on a processor which, when executed, at least partially automatically control said recovery of said at least one vessel onto said at least one marine platform, said instructions comprising:

a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
b. instructions which, when executed, are configured to play out at least one tensioned capturing line; thereby said trapping zone is defined;
c. instructions which, when executed, are configured to raise said at least one tensioned capturing line upward, when at least a portion of said at least one vessel is identified as being in said trapping zone;
d. instructions which, when executed, are configured to identify, from a signal from said at least one sensor, contact between said at least one tensioned capturing line and said at least one vessel;
e. instructions which, when executed, are configured to keep at least partial contact between said at least one tensioned capturing line and a keel or stem of said at least one vessel;
f. instructions which, when executed, are configured to play in said at least one tensioned capturing line in a sea, thereby blindly sweeping said at least one tensioned capturing line along a keel-stem line, while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and
g. instructions which, when executed, are configured to haul said at least one captured vessel to said at least one marine platform.

It is another object of the present invention to provide the engagement device as disclosed above, additionally comprising at least one of the following:
a. instructions which, when executed, are configured to reduce thrust of said at least one vessel after said at least one tensioned capturing line has been captured by said engagement device;
b. instructions which, when executed, are configured to lift said at least one marine platform, by means of a lifting mechanism, onto at least one second marine platform; and
c. any combination thereof.

It is another object of the present invention to provide a set of instructions configured to be executed on a processor which, when executed, at least partially automatically controls recovery of at least one vessel onto at least one marine platform, said instructions comprising:
a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
b. instructions which, when executed, are configured to play out at least one tensioned capturing line; thereby a trapping zone is defined; said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;
c. instructions which, when executed, are configured to raise said at least one tensioned capturing line upward, when said at least one vessel is identified as being in said trapping zone;
d. instructions which, when executed, are configured to identify, from a signal from said at least one sensor, contact between said at least one tensioned capturing line and said at least one vessel;
e. instructions which, when executed, are configured to keep at least partial contact between said at least one tensioned capturing line and a keel or stem of said at least one vessel;
f. instructions which, when executed, are configured to play in said at least one tensioned capturing line in a sea, thereby blindly sweeping said at least one tensioned capturing line along a keel-stem line, while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and
g. instructions which, when executed, are configured to haul said at least one captured vessel to said at least one marine platform.

It is another object of the present invention to provide the set of instructions as disclosed above, additionally comprising at least one of the following:
a. instructions which, when executed, are configured to reduce thrust of said at least one vessel after said at least one tensioned capturing line has been captured by said engagement device;
b. instructions which, when executed, are configured to lift said at least one marine platform, by means of a lifting mechanism, onto at least one second marine platform; and
c. any combination thereof.

It is another object of the present invention to provide the set of instructions as disclosed above, wherein a member of a group consisting of: said at least one marine platform, at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is in communication with said processor; said at least one sensor is configured to detect and to communicate with said processor at least one member selected from a group consisting of:
a. identification that said at least one vessel is in said trapping zone;
b. entry of said at least one engagement device of said at least one vessel into said trapping zone of said at least one capturing mechanism;
c. at least partial contact between said at least one tensioned capturing line and said at least one keel or stem line of a vessel;
d. lack of contact between said at least one tensioned capturing line and said at least one keel or stem line of a vessel;
e. completion of capturing of said engagement device;
f. completion of hauling of said at least one captured vessel;

g. at least one change in position of at least one portion of said at least one capturing mechanism; and h. any combination thereof.

It is another object of the present invention to provide a method of at least partially automatically controlling recovery of at least one vessel onto at least one marine platform, comprising steps of:

a. providing a set of instructions, comprising:
  i. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
  ii. instructions which, when executed, are configured to play out at least one tensioned capturing line; thereby a trapping zone is defined, said trapping zone being a region such that, said at least one engagement device being in said trapping zone, movement of said at least one tensioned capturing line towards the keel or stem and then sweeping of said at least one tensioned capturing line while in contact with said keel or stem of vessel towards said engagement device eventuates in contact between said at least one tensioned capturing line and said engagement device; and to keep in contact between said at least one tensioned capturing line and a keel or stem of said at least one vessel;
  iii. instructions which, when executed, are configured to raise said at least one tensioned capturing line upward, when said at least one vessel is identified as being in said trapping zone;
  iv. instructions which, when executed, are configured to identify, from a signal from said at least one sensor, contact between said at least one tensioned capturing line and said at least one vessel;
  v. instructions which, when executed, are configured to keep at least partial contact between said at least one tensioned capturing line and a keel or stem of said at least one vessel;
  vi. instructions which, when executed, are configured to play in said at least one tensioned capturing line in a sea, thereby blindly sweeping said at least one tensioned capturing line along a keel-stem line, while maintaining at least partial contact between said at least one tensioned capturing line and said keel or stem, so as to cause said at least one tensioned capturing line to contact at least one engagement device, said contact inducing capture of said at least one tensioned capturing line by said engagement device; and
  vii. instructions which, when executed, are configured to haul said at least one captured vessel to said at least one marine platform; and b. executing said instructions.

It is another object of the present invention to provide the method as disclosed above, additionally comprising steps of:

a. providing instructions which, when executed, are configured to reduce thrust of said at least one vessel after said at least one tensioned capturing line has been captured by said engagement device;

b. providing instructions which, when executed, are configured to lift said at least one marine platform, by means of a lifting mechanism, onto at least one second marine platform; and c. any combination thereof.

It is another object of the present invention to provide the method as disclosed above, additionally comprising steps of: providing a member of a group consisting of: said at least one marine platform, at least one capturing mechanism and any combination thereof with at least one sensor; selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; placing said at least one sensor is in communication with said processor; detecting, via said at least one sensor, at least one member selected from a group consisting of:

a. identification that said at least one vessel is in said trapping zone;

b. entry of said at least one engagement device of said at least one vessel into said trapping zone of said at least one capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said at least one capturing mechanism; and h. any combination thereof; and i. communicating at least one signal detected by said at least one sensor to said processor.

It is one object of the present invention to provide a capturing mechanism for the recovery of at least one vessel to at least one marine platform; said at least one vessel having at least one engagement device either permanently or at least partially reversibly connectable to the same; said capturing mechanism comprising:

a. at least one tensioned capturing line connected to said at least one marine platform; and b. at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof;

wherein said capturing mechanism is configured to blindly sweep said at least one tensioned capturing line along a substantial portion of a keel-stem line of said at least one vessel toward said engagement device, until at least partial contact is made between said at least one tensioned capturing line and said engagement device, said at least one tensioned capturing line is capturable by said engagement device upon said at least partial contact between the same and said at least one tensioned capturing line.

It is another object of the present invention to provide the capturing mechanism as disclosed above, wherein at least one of the following is true:

a. capturing of said at least one tensioned capturing line by said engagement device is at least partially reversible;

b. said at least one line maneuvering mechanism comprises at least two line arms, said line arms characterized by having a distal end and a proximal end; said at least one tensioned capturing line is connected to said distal portion of said line arms; said proximal end is connected to said at least one marine platform;

c. each of said at least two line arms is further characterized by at least one anchoring holder for said at least one tensioned capturing line, said at least one anchoring holder being either movable along said at least one line arm or at a fixed position along said at least one line arm;

d. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;

e. said at least one marine platform is at least one cradle;

f. said at least one marine platform is open at a stern thereof;

g. shape of said at least one said marine platform either allows water to pass through it or does not allow water to pass through it;

h. at least a portion of said at least one captured vessel is haulable onto at least a portion of said at least one marine platform;

i. said at least one marine platform has a deployable lifting structure:

j. said at least one marine platform is liftable, by means of at least one lifting mechanism, onto at least a portion of at least one second marine platform, either such that said at least one marine platform is not supporting any vessel or such that said at least one marine platform is at least partially supporting said at least one vessel; and k. said at least one marine platform is connectable to at least a portion of said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and l. any combination thereof.

It is another object of the present invention to provide the capturing mechanism as disclosed above, wherein said at least one marine platform additionally comprises at least one movable support stage; at least one of the following being true:

a. at least a portion of said at least one captured vessel is mounted onto at least a portion of said at least one movable support stage;

b. at least a portion of said at least one movable support stage is haulable onto at least a portion of said at least one marine platform;

c. at least one said movable support stage comprises at least one fin and said at least one marine platform comprises at least one groove with which said at least one fin is movable; and d. any combination thereof.

It is another object of the present invention to provide the capturing mechanism as disclosed above, wherein said engagement device is selected from a group consisting of:

a. a rearward-facing hook;

b. a magnetic catch; further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel; further wherein said at least one tensioned capturing line is characterized by at least one guide configured to catch in said slot and induce said at least one tensioned capturing line to enter said slot;

d. a rearward-facing latch; said rearward-facing latch is configured to be openable under pressure from outside the same and automatically closeable; pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the capturing mechanism as disclosed above, wherein a member of a group consisting of: said at least one marine platform, said capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:

a. identification that said at least one vessel is in a trapping zone, said trapping zone being a region such that, said at least one engagement device being in said trapping zone, movement of said at least one tensioned capturing line towards the keel or stem and then sweeping of said at least one tensioned capturing line while in contact with said keel of or stem of said vessel towards said engagement device eventuates in contact between said at least one tensioned capturing line and said engagement device;

b. entry of said at least one engagement device of said at least one vessel into said trapping zone of said capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said capturing mechanism; and h. any combination thereof.

It is another object of the present invention to provide the capturing mechanism as disclosed above, wherein said at least one marine platform additionally comprises at least one actuatable deployable lifting structure connected to said at least one marine platform; said at least one deployable lifting structure is connected at its bottom end to said at least one marine platform and at its top end to a lifting device (such as a crane); further wherein said at least one deployable lifting structure is characterized by at least two configurations; a stowed configuration which is substantially horizontal with regards to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration; wherein actuation of said deployable lifting structure between stowed and erect configuration can be done during a launch and recovery procedure; at least one of the following being true:
  a. said at least one deployable lifting structure is formed so as to substantially conform to the outer sides and front contour of said at least one marine platform when in said stowed configuration;
  b. said at least one deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;
  c. said at least one deployable lifting structure further comprises at least one guide mechanism, said guide mechanism selected from a group consisting of: a coupler and an interior of said deployable lifting structure; said at least one frame line passing through said at least one guide mechanism so said at least one frame line is pullable at said top end of it, such that when said top end of said at least one frame line is pulled, said at least one deployable lifting structure is configured to be raised from said stowed configuration to said erect configuration;
  d. said at least one deployable lifting structure additionally comprises at least two limiters configured to limit a maximum angle of said at least one deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and
  e. any combination thereof.

It is another object of the present invention to provide the capturing mechanism as disclosed above, additionally comprising a set of instructions configured to be executed on a processor which, when executed, at least partially automatically control said recovery of said at least one vessel onto said at least one marine platform, said instructions comprising:
  a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
  b. instructions which, when executed, are configured to play out at least one tensioned capturing line; thereby said trapping zone is defined;
  c. instructions which, when executed, are configured to raise said at least one tensioned capturing line upward, when at least a portion of said at least one vessel is identified as being in said trapping zone;
  d. instructions which, when executed, are configured to identify, from a signal from said at least one sensor, contact between said at least one tensioned capturing line and said at least one vessel;
  e. instructions which, when executed, are configured to keep at least partial contact between said at least one tensioned capturing line and a keel or stem of said at least one vessel;
  f. instructions which, when executed, are configured to play in said at least one tensioned capturing line in a sea while maintaining at least partial contact between said at least one tensioned capturing line and said keel or stem, so as to cause said at least one tensioned capturing line to contact at least one engagement device, said contact inducing capture of said at least one tensioned capturing line by said engagement device; and
  g. instructions which, when executed, are configured to haul said at least one captured vessel to said at least one marine platform.

It is another object of the present invention to provide the capturing mechanism as disclosed above, additionally comprising at least one of the following:
  a. instructions which, when executed, are configured to lift said at least one marine platform, by means of a lifting mechanism, onto at least one second marine platform;
  b. instructions which, when executed, are configured to reduce thrust of said at least one vessel after said at least one tensioned capturing line has been captured by said engagement device; and
  c. any combination thereof.

It is another object of the present invention to provide a method for recovering at least one vessel to at least one marine platform, said at least one vessel having at least one engagement device either permanently or at least partially reversibly connectable to the same, comprising steps of:
  a. connecting at least one tensioned capturing line to said at least one marine platform;
  b. providing at least one line maneuvering mechanism configured to displace said at least one tensioned capturing line in at least one direction selected from a group consisting of: up, down, left, right, forward, backward. playable into said at least one marine platform, playable out of said at least one marine platform, playable into and out of the water and any combination thereof; placing the tensioned capturing line outside the platform at a depth extending from sea surface to a depth greater than a depth of a keel of said at least one vessel;
  c. maneuvering a bow of said at least one vessel into a trapping zone of said at least one marine platform, said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;

d. raising said at least one tensioned capturing line upward when said at least one vessel is in said trapping zone; and keeping at least partial contact between said at least one tensioned capturing line and said keel or stem; and e. playing in said at least one tensioned capturing line, while blindly sweeping said at least one tensioned capturing line along a substantial portion of a keel-stem line of said at least one vessel toward said engagement device and while maintaining at least partial contact between said at least one tensioned capturing line and said keel or stem, so as to cause said at least one tensioned capturing line to contact at least one engagement device, said contact inducing capture of said at least one tensioned capturing line by said at least one engagement device.

It is another object of the present invention to provide the method as disclosed above, additionally comprising at least one of the following steps:

a. at least partially reversibly capturing said at least one tensioned capturing line by said engagement device;

b. providing said at least one line maneuvering mechanism with at least two line arms, said line arms characterized by having a distal end and a proximal end; connecting said at least one tensioned capturing line to said distal portion of said at least two line arms; and connecting said proximal end to said at least one marine platform;

c. providing each of said at least two line arms with at least one anchoring holder for said at least one tensioned capturing line, said anchoring holder being either movable along said line arm or in a fixed position in said line arm, and, said anchoring holder being movable along said line arm, moving said at least one anchoring holder along said at least one line arm;

d. allowing development of a 'V'-shape in at least a portion of said at least one tensioned capturing line after capture of said at least one tensioned capturing line by said engagement device, by means of a member of a group consisting of: playing out at least a portion of said at least one tensioned capturing line, allowing at least two of said anchoring holders to approach each other, providing elasticity to said at least one tensioned capturing line and any combination thereof;

e. providing said at least one marine platform as at least one cradle;

f. providing said at least one marine platform open at a stern thereof;

g. providing said at least one marine platform with shape of said at least one said marine platform either allows water to pass through it or does not allow water to pass through it;

h. hauling said at least one said captured vessel at least partly onto at least a portion of said at least one marine platform and any combination thereof.

i. providing said at least one marine platform with a deployable lifting structure:

j. lifting, by means of at least one lifting mechanism, said at least one marine platform onto at least one second marine platform, either such that said at least one marine platform is not supporting any vessel or such that said at least one marine platform is at least partially supporting said at least one vessel;

k. connecting said at least one marine platform to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and any combination thereof; and l. any combination thereof.

It is another object of the present invention to provide the method as disclosed above, additionally comprising step of providing at least one movable support stage for said at least one marine platform; additionally comprising at least one of the following steps:

a. mounting at least a portion of said at least one captured vessel onto at least a portion of at least one said movable support stage;

b. hauling at least a portion of said at least one movable support stage onto at least a portion of said at least one marine platform;

c. providing at least one said movable support stage with at least one fin and providing said at least one marine platform with at least one groove with which said at least one fin is movable; and d. any combination thereof.

It is another object of the present invention to provide the method as disclosed above, additionally comprising selecting said at least one engagement device from at least one member of a group consisting of:

a. a rearward-facing hook;

b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable; pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable; pressure from inside the same physically preventing opening of said shackle, such that escape of said at least one tensioned capturing line from said rearward-facing shackle is obviated; and f. any combination thereof.

It is another object of the present invention to provide the method as disclosed above, additionally comprising steps of: providing a member of a group consisting of said at least one marine platform, at least one capturing mechanism and any combination thereof with at least one sensor; and selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; and detecting, via said at least one sensor, at least one member selected from a group consisting of:

a. identification that said at least one vessel is in said trapping zone;

b. entry of said at least one engagement device of said at least one vessel into said trapping zone of said at least one capturing mechanism;

c. at least partial contact between said at least one tensioned capturing line and said at least one keel or stem line of a vessel;

d. lack of contact between said at least one tensioned capturing line and said at least one keel or stem line of a vessel;

e. completion of capturing of said engagement device;

f. completion of hauling of said at least one captured vessel;

g. at least one change in position of at least one portion of said at least one capturing mechanism;

h. and any combination thereof.

It is another object of the present invention to provide the method as disclosed above, additionally comprising steps of:

a. providing, for said at least one marine platform, at least one actuatable deployable lifting structure;

b. connecting said at least one deployable lifting structure at its bottom end to said at least one marine platform and at its top end to a lifting device (such as a crane);

c. reversibly transitioning said at least one deployable lifting structure between a stowed configuration and an erect configuration; said stowed configuration being substantially horizontal with regard to sides of said at least one marine platform such that allows safe hauling of a vessel onto said marine platform with no elements of said stowed lifting structure above said hauled vessel (clear sky); said erect configuration being substantially erect such that a center of gravity of said at least one marine platform, with or without a vessel on board, is substantially under the top end of said deployable lifting structure in its erect configuration; wherein actuation of deployable lifting structure between stowed and erect configuration can be done during a launch and recovery procedure.

It is another object of the present invention to provide the method as disclosed above, additionally comprising at least one of the following steps:

a. forming said at least one deployable lifting structure so as to substantially conform to the outer sides and front contour of said at least one marine platform when in said stowed configuration;

b. providing said at least one deployable lifting structure with at least two substantially opposite frame bars, said frame bars characterized by a distal end and a proximal end, providing a connection between said distal ends of said frame bars, and hingedly connecting said proximal end of said frame bars to substantially opposite side positions of said at least one marine platform;

c. providing said at least one deployable lifting structure with at least one guide mechanism, said guide mechanism selected from a group consisting of: a coupler and an interior of said deployable lifting structure; passing said at least one frame line through said at least one guide mechanism;

d. providing said at least one deployable lifting structure with at least two limiters configured to limit a maximum angle of said at least one deployable lifting structure with respect to said at least one marine platform, said at least two limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof;

e. pulling said at least one frame line at said top end of said at least one deployable lifting structure, thereby reversibly transitioning said at least one deployable lifting structure from said stowed configuration to said erect configuration;

f. lifting said at least one marine platform onto at least one second marine platform by pulling on said at least one frame line at said top end of said deployable lifting structure; and g. any combination thereof.

It is another object of the present invention to provide the method as disclosed above, additionally comprising at least partially automatically controlling recovery of said at least one vessel onto said at least one marine platform, comprising steps of:

a. providing a set of instructions, comprising:

i. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;

ii. instructions which, when executed, are configured to play out at least one tensioned capturing line; thereby said trapping zone is defined;

iii. instructions which, when executed, are configured to raise said at least one tensioned capturing line upward, when at least a portion of said at least one vessel is identified as being in said trapping zone;

iv. instructions which, when executed, are configured to identify, from a signal from said at least one sensor, contact between said at least one tensioned capturing line and said at least one vessel;

v. instructions which, when executed, are configured to keep at least partial contact between said at least one tensioned capturing line and a keel or stem of said at least one vessel;

vi. instructions which, when executed, are configured to play in said at least one tensioned capturing line in a sea, thereby blindly sweeping said at least one tensioned capturing line along a substantial portion of a keel-stem line of said vessel, while maintaining at least partial contact between said at least one tensioned capturing line and said keel or stem, so as to cause said at least one tensioned capturing line to contact at least one engagement device, said contact inducing capture of said at least one tensioned capturing line by said engagement device; and vii. instructions which, when executed, are configured to haul said at least one captured vessel to said at least one marine platform; and b. executing said instructions.

It is another object of the present invention to provide the method as disclosed above, additionally comprising at least one of the following steps:

a. providing instructions which, when executed, are configured to reduce thrust of said at least one vessel after said at least one tensioned capturing line has been captured by said engagement device;

b. providing instructions which, when executed, are configured to lift said at least one marine platform, by means of a lifting mechanism, onto at least one second marine platform; and c. any combination thereof.

It is another object of the present invention to provide an actuatable deployable lifting structure connected at its bottom end to at least one marine platform and at its top end to a lifting device (such as a crane); wherein said deployable lifting structure is characterized by at least two configurations; a stowed configuration which is substantially horizontal with regard to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration: actuation of deployable lifting structure between stowed and erect configuration can be done during a launch and recovery procedure;

It is another object of the present invention to provide the actuatable deployable lifting structure as disclosed above, wherein at least one of the following is true:

a. said deployable lifting structure is formed so as to substantially conform to the outer sides and front contour of said at least one marine platform when in said stowed configuration;

b. said deployable lifting structure comprises at least one frame line connected at its bottom end to said at least one marine platform:

c. said deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;

d. said deployable lifting structure further comprises at least one guide mechanism, said guide mechanism selected from a group consisting of: a coupler and an interior of said deployable lifting structure, said at least one frame line passing through said at least one guide mechanism so that said at least one frame line is pullable at said top end of said deployable lifting structure, said pull on said frame line at said top end of said deployable lifting structure configured to raise said deployable lifting structure from said stowed configuration to said erect configuration;

e. said deployable lifting structure additionally comprises at least two limiters configured to limit a maximum angle of said deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and f. any combination thereof.

It is another object of the present invention to provide the actuatable deployable lifting structure as disclosed above, wherein said at least one marine platform additionally comprises at least one capturing mechanism for recovery of at least one vessel to said at least one marine platform, said at least one capturing mechanism comprising: (a) at least one tensioned capturing line connected to said at least one marine platform; and (b) at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof; said at least one tensioned capturing line is capturable by said engagement device upon at least partial contact between the same and said at least one tensioned capturing line.

It is another object of the present invention to provide the actuatable deployable lifting structure as disclosed above, wherein said at least one vessel has at least one engagement device either permanently or at least partially reversibly connectable to the same; said engagement device comprises at least one member of a group consisting of:

a. a rearward-facing hook;

b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;

c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable; pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the actuatable deployable lifting structure as disclosed above, wherein at least one of the following is true:
a. capturing of said at least one tensioned capturing line by said engagement device is at least partially reversible;
b. said at least one line maneuvering mechanism comprises at least two line arms, each of said at least two line arms characterized by having a distal portion and a proximal portion; said at least one tensioned capturing line is connected to said distal portion of each of said at least two line arms; said proximal portion is connected to said at least one marine platform;
c. each of said at least two line arms is further characterized by at least one anchoring holder for said at least one tensioned capturing line, said at least one anchoring holder being either movable along at least one of said at least two line arms or at a fixed position along said at least one of said at least two line arms;
d. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;
e. said at least one said marine platform is at least one cradle;
f. said at least one marine platform is open at a stern thereof;
g. shape of said at least one said marine platform either allows water to pass through it or does not allow water to pass through it;
h. at least a portion of said at least one captured vessel is haulable onto at least a portion of said at least one marine platform;
i. said at least one marine platform has a deployable lifting structure:
j. said at least one marine platform is liftable, by means of at least one lifting mechanism, onto at least one second marine platform, either such that said at least one marine platform is not supporting any vessel or such that said at least one marine platform is at least partially supporting said at least one vessel; and
k. said at least one marine platform is connectable to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and
l. any combination thereof.

It is another object of the present invention to provide the actuatable deployable lifting structure as disclosed above, wherein said at least one marine platform additionally comprises at least one movable support stage; at least one of the following being true:
a. at least a portion of said at least one captured vessel is mounted onto at least a portion of said at least one movable support stage;
b. at least a portion of said at least one movable support stage is haulable onto at least a portion said at least one marine platform;
c. at least one said movable support stage comprises at least one fin and said at least one marine platform comprises at least one groove with which said at least one fin is movable; and
d. any combination thereof.

It is another object of the present invention to provide the actuatable deployable lifting structure as disclosed above, wherein a member of a group consisting of: said at least one marine platform, said at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:
a. identification that said at least one vessel is in a trapping zone, said trapping zone being a region such that, said at least one engagement device being in said trapping zone, movement of said at least one tensioned capturing line towards a keel or stem and then towards said engagement device eventuates in contact between said at least one tensioned capturing line and said engagement device;
b. entry of said at least one engagement device of said at least one vessel into said trapping zone of said at least one capturing mechanism;
c. at least partial contact between said at least one tensioned capturing line and said at least one keel or stem line of a vessel;
d. lack of contact between said at least one tensioned capturing line and said at least one keel or stem line of a vessel;
e. completion of capturing of said engagement device;
f. completion of hauling of said at least one captured vessel;
g. at least one change in position of at least one portion of said at least one capturing mechanism; and
h. any combination thereof.

It is another object of the present invention to provide the actuatable deployable lifting structure as disclosed above, additionally comprising a set of instructions configured to be executed on a processor which, when executed, at least partially automatically control said recovery of said at least one vessel onto said at least one marine platform, said instructions comprising:
a. instructions which, when executed, are configured to control said at least one vessel maneuvering mechanism of said at least one vessel; said at least one vessel maneuvering mechanism is selected from a group consisting of: an engine of said at least one vessel, steering of said at least one vessel and any combination thereof;
b. instructions which, when executed, are configured perform at least one of a group consisting of: play out at least one tensioned capturing line, maneuver at least one of said at least two line arms and any combination thereof; thereby said trapping zone is defined;

c. instructions which, when executed, are configured to raise said at least one tensioned capturing line upward, when said at least one vessel is identified as being in said trapping zone;
d. instructions which, when executed, are configured to keep at least partial contact between said at least one tensioned capturing line and a keel or stem of said at least one vessel;
e. instructions which, when executed, are configured to identify, from a signal from said at least one sensor, contact between said at least one tensioned capturing line and said at least one vessel;
f. instructions which, when executed, are configured to play in said at least one tensioned capturing line in a sea thereby blindly sweeping said at least one tensioned capturing line along a keel-stem line while maintaining at least partial contact between said at least one tensioned capturing line and said keel or stem, so as to cause said at least one tensioned capturing line to contact at least one engagement device, said contact inducing capture of said at least one tensioned capturing line by said engagement device; and
g. instructions which, when executed, are configured to haul said at least one captured vessel to said at least one marine platform.

It is another object of the present invention to provide the actuatable deployable lifting structure as disclosed above, additionally comprising at least one of the following:
a. instructions which, when executed, are configured to reduce thrust of said at least one vessel after said at least one tensioned capturing line has been captured by said engagement device;
b. instructions which, when executed, are configured to lift said at least one marine platform, by means of a lifting mechanism, onto said at least one marine platform; and
c. any combination thereof.

It is another object of the present invention to provide a method of deploying a deployable lifting structure, comprising steps of:
a. providing said deployable lifting structure comprising at least one frame line;
b. hingedly connecting said deployable lifting structure to at least one marine platform;
c. connecting said at least one frame line at its bottom end to said at least one marine platform;
passing said at least one frame line through at least one guide mechanism in said frame, said guide mechanism selected from a group consisting of: a coupler and an interior of said deployable lifting structure;
d. pulling said at least one frame line at said top end of said at least one deployable lifting structure, thereby reversibly transitioning said at least one deployable lifting structure from said stowed configuration to said erect configuration;
wherein said stowed configuration is characterized by said deployable lifting structure being substantially horizontal with regard to sides of said at least one marine platform such that allows safe hauling of a vessel onto said marine platform with no elements of said stowed lifting structure above said hauled vessel (clear sky); such that allows safe hauling of a vessel onto said marine platform with no elements of said stowed lifting structure above said hauled vessel (clear sky);
further wherein said erect configuration is characterized by said deployable lifting structure being substantially erect such that a center of gravity of said at least one marine platform, with or without at least one vessel on board, is substantially under a top end of said deployable lifting structure in its erect configuration.

It is another object of the present invention to provide the method as disclosed above, additionally comprising at least one of the following steps:
a. forming said deployable lifting structure so as to substantially conform to the outer sides and front contour of said at least one marine platform when in said stowed configuration;
b. providing said deployable lifting structure with at least two substantially opposite frame bars, said frame bars characterized by a distal end and a proximal end, providing a connection between said distal ends of said frame bars, and hingedly connecting said proximal end of said at least two frame bars to substantially opposite side positions of said at least one marine platform;
c. providing said deployable lifting structure with at least one guide mechanism; passing said at least one frame line through said at least one guide mechanism, said guide mechanism selected from a group consisting of: a coupler and an interior of said deployable lifting structure;
d. providing said deployable lifting structure with at least two limiters configured to limit a maximum angle of said deployable lifting structure with respect to said at least one marine platform, said limiters configured such that a center of gravity of said at least one marine platform, with or without said at least one vessel on board, substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof;
e. pulling said at least one frame line at said top end of said deployable lifting structure, thereby reversibly transitioning said deployable lifting structure, via said pull on said frame line, from said stowed configuration to said erect configuration;
f. lifting said at least one marine platform onto at least one second marine platform by pulling on said at least one frame line at said top end of said deployable lifting structure; and
g. any combination thereof.

It is another object of the present invention to provide the method as disclosed above, additionally comprising step of providing said at least one vessel with at least one engagement device either permanently or at least partially reversibly connectable to the same; and selecting said at least one engagement device from at least one member of a group consisting of:
a. a rearward-facing hook;
b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;
c. a rearward-facing slot in a stem or keel of said at least one vessel, further wherein said at least one tensioned capturing line is characterized by at least one guide configured to catch in said slot and induce said at least one tensioned capturing line to enter said slot;

d. a rearward-facing latch; further wherein said rearward-facing latch is configured to be openable under pressure from outside the same and automatically closeable, pressure from inside the same physically preventing opening of said latch, such that escape of said at least one tensioned capturing line from said rearward-facing latch is obviated;

e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and f. any combination thereof.

It is another object of the present invention to provide the method as disclosed above, additionally comprising step of providing at least one capturing mechanism for recovery of said at least one vessel to said at least one marine platform, said at least one capturing mechanism in mechanical communication with said at least one marine platform, said at least one capturing mechanism comprising (a) said at least one tensioned capturing line; and (b) at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof; said at least one tensioned capturing line is capturable by said engagement device upon at least partial contact between the same and said at least one tensioned capturing line.

It is another object of the present invention to provide the method as disclosed above, additionally comprising at least one of the following steps:

a. at least partially reversibly capturing said at least one tensioned capturing line by said engagement device;

b. providing said at least one line maneuvering mechanism with at least two line arms, each of said at least two line arms characterized by having a distal portion and a proximal portion;

connecting said at least one tensioned capturing line to said distal portion of each of said at least two line arms; and connecting said proximal portions to said at least one marine platform;

c. providing each of said at least two line arms with at least one anchoring holder for said at least one tensioned capturing line, said anchoring holder being either movable along said line arm or in a fixed position in said line arm, and, said anchoring holder being movable along said line arm, moving said at least one anchoring holder along said at least one line arm;

d. allowing development of a 'V'-shape in at least a portion of said at least one tensioned capturing line after capture of said at least one tensioned capturing line by said engagement device, by means of a member of a group consisting of: playing out a portion of said at least one tensioned capturing line, allowing at least two of said anchoring holders to approach each other, providing elasticity to said at least one tensioned capturing line and any combination thereof;

e. providing said at least one marine platform as at least one cradle;

f. providing said at least one marine platform open at a stern thereof;

g. providing said at least one marine platform with shape of said at least one said marine platform either allows water to pass through it or does not allow water to pass through it;

h. hauling said at least one vessel at least partly onto at least a portion of said at least one marine platform;

i. lifting, by means of at least one lifting mechanism, said at least one marine platform onto said at least one second marine platform, either such that said at least one marine platform is not supporting any vessel or such that said at least one marine platform is at least partially supporting said at least one vessel;

j. connecting said at least one marine platform to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and any combination thereof; and k. any combination thereof.

It is another object of the present invention to provide the method as disclosed above, additionally comprising step of providing at least one movable support stage for said at least one marine platform; and additionally comprising at least one of the following steps:

a. mounting at least a portion of said at least one captured vessel onto at least a portion of at least one said movable support stage;

b. hauling at least a portion of said at least one movable support stage onto at least a portion of said at least one marine platform;

c. providing at least one said movable support stage with at least one fin and said at least one marine platform with at least one groove with which said at least one fin is movable; and d. any combination thereof.

It is another object of the present invention to provide the method as disclosed above, additionally comprising steps of: providing a member of a group consisting of: said at least one marine platform, said at least one capturing mechanism and any combination thereof with at least one sensor; selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; and detecting, via said at least one sensor, at least one member selected from a group consisting of:

a. Identification that said at least one vessel is in a trapping zone, said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;

b. entry of said at least one engagement device of said at least one vessel into said trapping zone of said at least one capturing mechanism;
c. at least partial contact between said at least one tensioned capturing line and said at least one keel or stem line of a vessel;
d. lack of contact between said at least one tensioned capturing line and said at least one keel or stem line of a vessel;
e. completion of capturing of said engagement device;
f. completion of hauling of said at least one captured vessel;
g. at least one change in position of at least one portion of said at least one capturing mechanism;
h. and any combination thereof.

It is another object of the present invention to provide the method as disclosed above, additionally comprising at least partially automatically controlling recovery of said at least one vessel onto said at least one marine platform, comprising steps of:
a. providing a set of instructions, comprising:
  i. instructions which, when executed, are configured to control said at least one vessel maneuvering mechanism of said at least one vessel; said at least one vessel maneuvering mechanism is selected from a group consisting of: an engine of said at least one vessel, steering of said at least one vessel and any combination thereof;
  ii. instructions which, when executed, are configured to play out at least one tensioned capturing line; thereby said trapping zone is defined;
  iii. instructions which, when executed, are configured to raise said at least one tensioned capturing line upward, when at least a portion of said at least one vessel is identified as being in said trapping zone;
  iv. instructions which, when executed, are configured to identify, from a signal from said at least one sensor, contact between said at least one tensioned capturing line and said at least one vessel;
  v. instructions which, when executed, are configured to keep at least partial contact between said at least one tensioned capturing line and a keel or stem of said at least one vessel;
  vi. instructions which, when executed, are configured to play in said at least one tensioned capturing line in a sea, thereby blindly sweeping said at least one tensioned capturing line along a substantial portion of a keel-stem line while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and
  vii. instructions which, when executed, are configured to haul said at least one captured vessel to said at least one marine platform; and
b. executing said instructions.

It is another object of the present invention to provide the method as disclosed above, additionally comprising at least one of the following steps:
a. providing instructions which, when executed, are configured to reduce thrust of said at least one vessel after said at least one tensioned capturing line has been captured by said engagement device;
b. providing instructions which, when executed, are configured to lift said at least one marine platform, by means of a lifting mechanism, onto said at least one second marine platform; and
c. any combination thereof.

It is another object of the present invention to provide an engagement device either permanently or at least partially reversibly connectable to at least one vessel, configured to automatically capture a dynamically moving at least one tensioned capturing line said dynamically moving at least one tensioned capturing line being blindly sweepable along a substantial portion of a keel-stem line of said at least one vessel.

It is another object of the present invention to provide the engagement device as disclosed above, wherein said engagement device is connectable to said at least one vessel at a location selected from a group consisting of a keel of said at least one vessel, a prow of said at least one vessel, a stem of said at least one vessel, a bottom of said at least one vessel, a stern of said at least one vessel, and any combination thereof; said engagement device comprising at least one member of a group consisting of:
a. a rearward-facing hook;
b. a magnetic catch, further wherein said at least one tensioned capturing line is characterized by at least one magnetic portion; said at least one said magnetic portion is substantially in either (a) the center of said at least one tensioned capturing line; (b) at one end of said at least one tensioned capturing line; and any combination thereof;
c. a rearward-facing slot in a stem or keel of said at least one vessel, further wherein said at least one tensioned capturing line is characterized by at least one guide configured to catch in said slot and induce said at least one tensioned capturing line to enter said slot;
d. a rearward-facing latch; further wherein said rearward-facing latch is configured to be openable under pressure from outside the same and automatically closeable, pressure from inside the same physically preventing opening of said latch, such that escape of said at least one tensioned capturing line from said rearward-facing latch is obviated;
e. a rearward-facing shackle, further wherein said rearward-facing shackle is configured to be openable under pressure from outside the same and automatically closeable, pressure from inside the same physically preventing opening of said shackle, such that escape of said at least one tensioned capturing line from said rearward-facing shackle is obviated; and
f. any combination thereof.

It is another object of the present invention to provide the engagement device as disclosed above, additionally comprising at least one capturing mechanism characterized by:
a. said at least one tensioned capturing line, connected to at least one marine platform; and
b. at least one line maneuvering mechanism configured to displace said at least one tensioned capturing line in at least one direction selected from a group consisting of up, down, left, right, forward, backward, playable into said at least one marine platform, playable out of said at least one marine platform, playable into and out of the water and any combination thereof;
said at least one tensioned capturing line being capturable by said engagement device upon at least partial contact between the same and said at least one tensioned capturing line.

It is another object of the present invention to provide the engagement device as disclosed above, wherein a member of a group consisting of: said at least one marine platform, said at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is configured to detect at least one member selected from a group consisting of:
  a. identification that said at least one vessel is in said trapping zone;
  b. entry of said at least one engagement device of said at least one vessel into said trapping zone of said at least one capturing mechanism;
  c. at least partial contact between said at least one tensioned capturing line and said at least one keel or stem line of a vessel;
  d. lack of contact between said at least one tensioned capturing line and said at least one keel or stem line of a vessel;
  e. completion of capturing of said engagement device;
  f. completion of hauling of said at least one captured vessel;
  g. at least one change in position of at least one portion of said at least one capturing mechanism; and
  h. any combination thereof.

It is another object of the present invention to provide the engagement device as disclosed above, wherein at least one of the following is true:
  a. said at least one line maneuvering mechanism comprises at least two line arms, each of said line arms characterized by having a distal portion and a proximal portion; said at least one tensioned capturing line is connected to each of said distal portions of said at least two line arms; said proximal ends are connected to said at least one marine platform;
  b. each of said at least two line arms is further characterized by at least one anchoring holder for said at least one tensioned capturing line, said at least one anchoring holder being either movable along said at least one of said at least two line arms or at a fixed position along said at least one of said at least two line arms;
  c. said system is characterized by at least one mechanism configured to allow development of a 'V'-shape in at least a portion of said at least one tensioned capturing line after capture of said at least one tensioned capturing line by said engagement device, said mechanism selected from a group consisting of: a mechanism to play out at least a portion of said at least one tensioned capturing line, a mechanism to move at least two of said anchoring holders closer to each other, a mechanism to provide elasticity to said at least one tensioned capturing line and any combination thereof;
  d. said at least one marine platform is at least one cradle;
  e. said at least one marine platform is open at a stern thereof;
  f. shape of said at least one said marine platform either allows water to pass through it or does not allow water to pass through it;
  g. at least a portion of said at least one captured vessel is haulable onto said at least one marine platform;
  h. said at least one marine platform is liftable, by means of at least one lifting mechanism, onto at least one second marine platform, either such that said at least one marine platform is not supporting any vessel or such that said at least one marine platform is at least partially supporting said at least one vessel; and
  i. said at least one marine platform is connectable to said at least one second marine platform by at least one tow line, said at least one tow line is configured to at least one selected from a group consisting of (a) restrain unwanted movement of said at least one marine platform during hauling of said at least one captured vessel onto said at least one marine platform; (b) restrain unwanted movement of said at least one marine platform during releasing of said at least one vessel from said at least one marine platform; (c) restrain unwanted movement of said at least one marine platform during movement of said at least one vessel onto said at least one marine platform; (d) restrain the motion of said at least one marine platform relative to said at least one second marine platform; and
  j. any combination thereof.

It is another object of the present invention to provide the engagement device as disclosed above, wherein said at least one marine platform a additionally comprises at least one movable support stage; at least one of the following being true:
  a. at least a portion of said at least one captured vessel is mounted onto at least a portion of said at least one movable support stage;
  b. at least a portion of said at least one movable support stage is haulable onto at least a portion said at least one marine platform;
  c. at least one said movable support stage comprises at least one fin and said at least one marine platform comprises at least one groove with which said at least one fin is movable; and
  d. any combination thereof.

It is another object of the present invention to provide the engagement device as disclosed above, wherein said at least one marine platform additionally comprises at least one actuatable deployable lifting structure connected to said at least one marine platform; said at least one deployable lifting structure is connected at its bottom end to said at least one marine platform and at its top end to a lifting device (such as a crane); said at least one deployable lifting structure is characterized by at least two configurations; a stowed configuration which is substantially horizontal with regards to sides of said at least one marine platform such that allows safe hauling of a vessel onto said marine platform with no elements of said stowed lifting structure above said hauled vessel (clear sky); and an erect configuration which is substantially erect such that a center of gravity of said at least one marine platform, with or without a vessel on board, is substantially under the top end of said deployable lifting structure in its erect configuration; actuation of deployable lifting structure between stowed and erect configuration can be done during a launch and recovery procedure:
  a. said at least one deployable lifting structure is formed so as to substantially conform to the outer sides and front contour of said at least one marine platform when in said stowed configuration;
  b. Said deployable lifting structure comprises at least one frame line connected at its bottom end to said at least one marine platform:
  c. said at least one deployable lifting structure comprises at least two substantially opposite frame bars, said frame bars characterized by a distal end and a proximal end, a connection connecting together said distal ends of said frame bars, said proximal ends of said at least two frame bars hingedly connected to substantially opposite side positions of said at least one marine platform;

d. said at least one deployable lifting structure further comprises at least one guide mechanism, said guide mechanism selected from a group consisting of: a coupler and an interior of said deployable lifting structure; said at least one frame line passing through said at least one guide mechanism so said at least one frame line is pullable at said top end of said at least one deployable lifting structure, said pull on said top end of said at least one deployable lifting structure configured to raise said at least one deployable lifting structure from said stowed configuration to said erect configuration;

e. said at least one deployable lifting structure additionally comprises at least two limiters configured to limit a maximum angle of said at least one deployable lifting structure with respect to said at least one marine platform, said limiters configured such that a center of gravity of said at least one marine platform, with or without a vessel on board, is substantially under the top end of said deployable lifting structure in its erect configuration, said maximum angle limitable by prevention of movement of said limiter in at least one direction along said deployable lifting structure leading to a stable lifting arrangement; said movement preventable by a member of a group consisting of: at least one guide mechanism, a hole where a frame line enters the frame, a stopping mechanism and any combination thereof; and f. any combination thereof.

It is another object of the present invention to provide the engagement device as disclosed above, additionally comprising a set of instructions configured to be executed on a processor which, when executed, at least partially automatically control said recovery of said at least one vessel onto said at least one marine platform, said instructions comprising:

a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;

b. instructions which, when executed, are configured to play out at least one tensioned capturing line; thereby said trapping zone is defined;

c. instructions which, when executed, are configured to raise said at least one tensioned capturing line upward, when at least a portion of said at least one vessel is identified as being in said trapping zone;

d. instructions which, when executed, are configured to identify, from a signal from said at least one sensor, contact between said at least one tensioned capturing line and said at least one vessel;

e. instructions which, when executed, are configured to keep at least partial contact between said at least one tensioned capturing line and a keel or stem of said at least one vessel;

f. instructions which, when executed, are configured to play in said at least one tensioned capturing line in a sea, thereby blindly sweeping said at least one tensioned capturing line along a keel-stem line, while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and g. instructions which, when executed, are configured to haul said at least one captured vessel to said at least one marine platform.

It is another object of the present invention to provide the engagement device as disclosed above, additionally comprising at least one of the following:

a. instructions which, when executed, are configured to reduce thrust of said at least one vessel after said at least one tensioned capturing line has been captured by said engagement device;

b. instructions which, when executed, are configured to lift said at least one marine platform, by means of a lifting mechanism, onto at least one second marine platform; and c. any combination thereof.

It is another object of the present invention to provide a set of instructions configured to be executed on a processor which, when executed, at least partially automatically controls recovery of at least one vessel onto at least one marine platform, said instructions comprising:

a. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;

b. instructions which, when executed, are configured to play out at least one tensioned capturing line; thereby a trapping zone is defined; said trapping zone being a region such that, said at least one engagement device being in said trapping zone, movement of said at least one tensioned capturing line towards the keel or stem and then sweeping of said at least one tensioned capturing line while in contact with said keel or stem of said vessel towards said engagement device eventuates in contact between said at least one tensioned capturing line and said engagement device;

c. instructions which, when executed, are configured to raise said at least one tensioned capturing line upward, when said at least one vessel is identified as being in said trapping zone;

d. instructions which, when executed, are configured to identify, from a signal from said at least one sensor, contact between said at least one tensioned capturing line and said at least one vessel;

e. instructions which, when executed, are configured to keep at least partial contact between said at least one tensioned capturing line and a keel or stem of said at least one vessel;

f. instructions which, when executed, are configured to play in said at least one tensioned capturing line in a sea, thereby blindly sweeping said at least one tensioned capturing line along a keel-stem line, while maintaining said at least partial contact between said at least one tensioned capturing line and said keel or stem, so as to cause said at least one tensioned capturing line to contact at least one engagement device, said contact inducing capture of said at least one tensioned capturing line by said engagement device; and g. instructions which, when executed, are configured to haul said at least one captured vessel to said at least one marine platform.

It is another object of the present invention to provide the set of instructions as disclosed above, additionally comprising at least one of the following:

a. instructions which, when executed, are configured to reduce thrust of said at least one vessel after said at least one tensioned capturing line has been captured by said engagement device;
b. instructions which, when executed, are configured to lift said at least one marine platform, by means of a lifting mechanism, onto at least one second marine platform; and
c. any combination thereof.

It is another object of the present invention to provide the set of instructions as disclosed above, wherein a member of a group consisting of: said at least one marine platform, at least one capturing mechanism and any combination thereof is provided with at least one sensor; said at least one sensor is selected from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; said at least one sensor is in communication with said processor; said at least one sensor is configured to detect and to communicate with said processor at least one member selected from a group consisting of:
  a. identification that said at least one vessel is in said trapping zone;
  b. entry of said at least one engagement device of said at least one vessel into said trapping zone of said at least one capturing mechanism;
  c. at least partial contact between said at least one tensioned capturing line and said at least one keel or stem line of a vessel;
  d. lack of contact between said at least one tensioned capturing line and said at least one keel or stem line of a vessel;
  e. completion of capturing of said engagement device;
  f. completion of hauling of said at least one captured vessel;
  g. at least one change in position of at least one portion of said at least one capturing mechanism; and
  h. any combination thereof.

It is another object of the present invention to provide a method of at least partially automatically controlling recovery of at least one vessel onto at least one marine platform, comprising steps of:
  a. providing a set of instructions, comprising:
    i. instructions which, when executed, are configured to control at least one vessel maneuvering mechanism of said at least one vessel; said at least one vessel maneuvering mechanism is selected from a group consisting of: an engine of said at least one vessel, steering of said at least one vessel and any combination thereof;
    ii. instructions which, when executed, are configured to play out at least one tensioned capturing line; thereby a trapping zone is defined, said trapping zone being a region such that, said at least one engagement device being in said trapping zone, movement of said at least one tensioned capturing line towards the keel or stem and then sweeping of said at least one tensioned capturing line while in contact with said keel or stem of vessel towards said engagement device eventuates in contact between said at least one tensioned capturing line and said engagement device; and to keep in contact between said at least one tensioned capturing line and a keel or stem of said at least one vessel;
    iii. instructions which, when executed, are configured to raise said at least one tensioned capturing line upward, when said at least one vessel is identified as being in said trapping zone;
    iv. instructions which, when executed, are configured to identify, from a signal from said at least one sensor, contact between said at least one tensioned capturing line and said at least one vessel;
    v. instructions which, when executed, are configured to keep at least partial contact between said at least one tensioned capturing line and a keel or stem of said at least one vessel;
    vi. instructions which, when executed, are configured to play in said at least one tensioned capturing line in a sea, thereby blindly sweeping said at least one tensioned capturing line along a keel-stem line, while maintaining at least partial contact between said at least one tensioned capturing line and said keel or stem, so as to cause said at least one tensioned capturing line to contact at least one engagement device, said contact inducing capture of said at least one tensioned capturing line by said engagement device; and
    vii. instructions which, when executed, are configured to haul said at least one captured vessel to said at least one marine platform; and
  b. executing said instructions.

It is another object of the present invention to provide the method as disclosed above, additionally comprising steps of:
  a. providing instructions which, when executed, are configured to reduce thrust of said at least one vessel after said at least one tensioned capturing line has been captured by said engagement device;
  b. providing instructions which, when executed, are configured to lift said at least one marine platform, by means of a lifting mechanism, onto at least one second marine platform; and
  c. any combination thereof.

It is another object of the present invention to provide the method as disclosed above, additionally comprising steps of: providing a member of a group consisting of: said at least one marine platform, at least one capturing mechanism and any combination thereof with at least one sensor; selecting said at least one sensor from a group consisting of a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof; placing said at least one sensor is in communication with said processor; detecting, via said at least one sensor, at least one member selected from a group consisting of:
  a. identification that said at least one vessel is in said trapping zone;
  b. entry of said at least one engagement device of said at least one vessel into said trapping zone of said at least one capturing mechanism;
  c. at least partial contact between said at least one tensioned capturing line and said at least one keel or stem line of a vessel;
  d. lack of contact between said at least one tensioned capturing line and said at least one keel or stem line of a vessel;
  e. completion of capturing of said engagement device;
  f. completion of hauling of said at least one captured vessel;
  g. at least one change in position of at least one portion of said at least one capturing mechanism; and
  h. any combination thereof; and i. communicating at least one signal detected by said at least one sensor to said processor.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

FIG. 1 schematically illustrates the operating principle of the capturing mechanism of a launch and recovery system, in accordance with some embodiments of the present invention;

FIG. 3A is a side view of a vessel to be recovered;

FIG. 3B is a bottom view of the vessel of FIG. 3A;

FIG. 4A is a side view of a system for launch and recovery of a vessel, according to some embodiments of the present invention, implemented on a cradle;

FIG. 4B is a bottom view of the system for launch and recovery of a vessel of FIG. 3B, according to some embodiments of the present invention;

FIG. 5A illustrates the entering of the vessel into the trapping zone of the capturing mechanism of a system for launch and recovery of a vessel. FIG. 5B illustrates raising the tensioned capturing line 212 of the capturing mechanism to intercept the keel-stem line of the vessel. FIG. 5C illustrates the vessel captured at the bow and being towed. FIG. 5D is a top view of the vessel captured at the bow and being towed;

FIGS. 6A-6C depict the capture process of a vessel, in accordance with other embodiments of the present invention. FIG. 6A illustrates the approach of the vessel to the trapping zone of the capturing mechanism of a system for launch and recovery of a vessel. FIG. 6B illustrates the entering of the vessel into the trapping zone of the capturing mechanism of a system for launch and recovery of a vessel. FIG. 6C illustrates the vessel captured at the bow and being towed.

FIG. 7A illustrates a vessel approaching the trapping zone of a capturing mechanism of a system for launching and recovering a vessel (top view), according to some embodiments of the present invention;

FIG. 9 illustrates a recovered vessel resting on a marine platform of a system for launching and recovering a vessel, the marine platform being towed by a second marine platform, and hooked to a crane about to raise the marine platform onto the second marine platform, according to some embodiments of the present invention;

FIG. 10 illustrates a cradle for launching and recovering a vessel with its deployable lifting structure being raised, according to some embodiments of the present invention;

FIG. 12A illustrates a cradle for launching and recovering a vessel, with its deployable lifting structure in a stowed, horizontal, configuration, according to some embodiments of the present invention;

FIG. 12B illustrates a cradle for launching and recovering a vessel, with its deployable lifting structure in a fully raised, erect, configuration, according to some embodiments of the present invention;

In FIG. 14A the vessel is shown at an initial hauling stage. In FIG. 14B the vessel is shown at an intermediate hauling stage. In FIG. 14C the vessel is shown at a final hauling stage;

DETAILED DESCRIPTION OF THE INVENTION

Figure 2A:
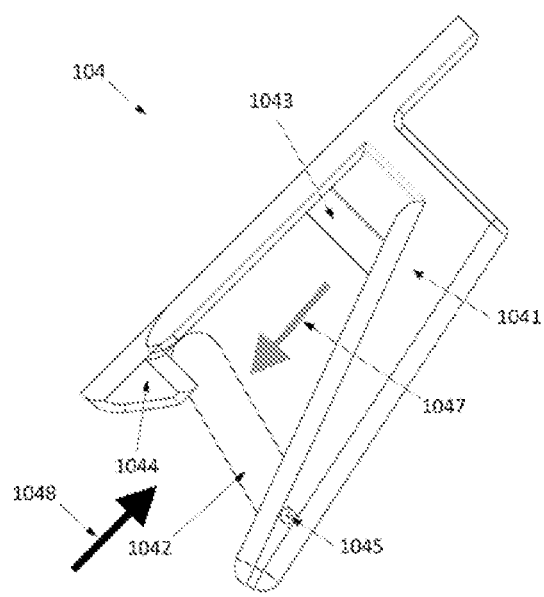
FIG. 2A-G illustrates three embodiments of engagement devices.

In the following detailed description, numerous specific details are set forth in order to provide a thorough understanding of the methods and systems of the present invention. However, it will be understood by those skilled in the art that the present methods and systems may be practiced without these specific details. In some instances, well-known methods, procedures, and components have not been described in detail so as not to obscure the present methods and systems.

Hereinafter, the term "sea" refers to any type of body of water, such as, but not limited to, an ocean, a sea, a lake, or a river. The body of water can be natural or man-made. Thus it should be understood that the present invention is not limited to being used "at sea".

Hereinafter, the term "vessel" refers to a small vessel requiring recovery.

Hereinafter, the term "second marine platform" refers to a large ship, a marine platform such as, but not limited to, an oil rig, a floating platform, a buoy, a pier (floating or fixed), or a bank of a river or a bank of a lake or sea, onto which a small vessel can be recovered.

Hereinafter, the terms "cradle" or "marine platform" refers to a recovery marine platform onto which the small vessel being recovered is loaded. Preferably, the cradle is a floating craft with at least a portion of the craft above the surface of the sea, rather than a submersible craft capable of operating at varying depths below the surface of the sea. The cradle can also have planing characteristics such that drag and lift forces keep it on the surface of the sea. The cradle is designed to facilitate recovery of a vessel from the sea. Preferably, the cradle will have a size of the same order of magnitude as the vessel being recovered. The cradle can be a marine platform, either with the general shape of a vessel's hull, such as the cradle disclosed hereinbelow, or any other shape, or it can be a conventional recovery device such as, but not limited to, a boat trailer.

The term "lift line" refers to the line integrated in the lifting mechanism; The term "capturing line" refers to the line captured by the hook;

The term "tow line" refers to the line attachable to the bow of the cradle and to the platform to prevent spinning;

The term "frame line" refers to the line which forms an integral part of the deployable lifting structure.

The term "lifting mechanism" refers to a system such as a crane or a davit or any other lifting mechanism that is carrying out the action of lifting another body.

The term "clear sky" refers to there being no part of a recovery system which extends significantly into or around the space where a recovered vessel is to be hauled. Most vessels have either an upper structure or other structure such as antennas that protrude above the level of the vessel's hull. The relative motion, especially relative roll and forward motion, between the recovery platform (marine platform) and the recovered vessel, defines a volume in which these structures may be located during the hauling stage of recovery. Clear sky means that this volume is significantly clear of obstacles that may cause damage to the recovered vessel during the hauling stage. Once the vessel is safely linked and coupled to the marine platform and relative motion between the marine platform and the vessel is significantly diminished, clear sky can be broken by raising a lifting structure, such as the deployable lifting structure disclosed hereinbelow, in order to raise the vessel onto a second marine platform.

Unless otherwise noted, the terms "a", "an" or "the" can refer to "at least one" or to "one or more". For non-limiting example, the term "a capturing line" can mean "at least one capturing line".

Unless explicitly stated, the methods and examples described herein are not constrained to a particular order or sequence. Additionally, some of the described methods and examples or elements thereof can occur or be performed at the same point in time. According to some embodiments of the present invention, a launch and recovery system is provided, which includes a capturing mechanism that can be connected to a marine platform.

It should be noted that recovering a vessel at sea is substantially more difficult than launching it to sea. Therefore, hereinafter most of the description details recovery of a vessel, although, typically, in accordance with the present invention, the same system used for recovery can be used for launching.

The system for launch and recovery of a vessel at sea comprises portions or subsystems that can work together to launch or recover the vessel. All will be described in more detail hereinbelow. An outline of the portions and their functions is given here.

The main portions, are an engagement device, a capturing mechanism, a deployable lifting structure, and at least one set of instructions, typically embodied in at least one computer program, which, when executed, enable control of various functions in the launch and recovery system. In some embodiments, the system also comprises a marine platform. In some embodiments, the system also comprises a movable support stage. In some variants, the system comprises both a marine platform and a movable support stage.

The capturing mechanism is attachable to the marine platform and the engagement device is attachable to a vessel to be recovered. The capturing mechanism comprises a tensioned capturing line. During recovery of the vessel, as described hereinbelow, the tensioned capturing line is captured by the engagement device, after which the vessel is drawn to, and preferably onto/into, the marine platform.

During recovery, the tensioned capturing line is placed below the surface of the sea and the vessel is maneuvered into a trapping zone, described hereinbelow, of the capturing mechanism. Once in the trapping zone, the tensioned capturing line is raised until there is contact between the tensioned capturing line and the keel or stem of the vessel anywhere along the keel or stem. At least one of the vessel and the capturing mechanism (preferably the vessel) is maneuvered so that the engagement device enters the trapping zone. Then the tensioned capturing line is swept along the keel and/or stem towards the capturing mechanism and the engagement device, while maintaining contact with the vessel's keel line, so as to engage the tensioned capturing line with the engagement device. Once the tensioned capturing line is engaged with the engagement device, the vessel can be hauled to, and preferably onto, the marine platform.

The engagement device is mounted on the stem/keel line of the vessel, preferably at the forward section. The engagement device can be a permanent part of the vessel's structure, it can be a permanently attached retrofit to the vessel, or it can be reversibly attached to the vessel.

The capturing mechanism is a subsystem with maneuverable parts. It comprises a deployable tensioned capturing line attached to two movable arms (the line arms). For a recovery, the movable arms and the tensioned capturing line are deployed and the tensioned capturing line is played out into the sea. When the vessel to be recovered is in an appropriate position relative to the tensioned capturing line and the capturing mechanism, the tensioned capturing line is moved upward until it at least partially contacts the keel/stem line. The tensioned capturing line is then played in, so that it engages with the engagement device. This creates a stable line of towing from the marine platform to the vessel. The capturing mechanism can then draw the vessel to and, in some embodiments, onto, the marine platform.

In some embodiments, the capturing mechanism is mounted on a movable support stage which can be drawn onto the marine platform. In some embodiments, capturing mechanism is mounted on a marine platform. In some variants of these embodiments, the capturing mechanism is mounted on a cradle, where the cradle is typically, but not necessarily, substantially boat-shaped, typically has an open stern to allow the vessel to be drawn on board, and typically has a size not dissimilar to that of the vessel to be recovered. Although the cradle can be shorter or longer than the vessel to be recovered. In some variants of the above embodiments, the cradle can be, for non-limiting example, a standard boat trailer or other means of restraining a vessel.

In some embodiments, typically those with a cradle, the recovered vessel can be raised onto a second, and typically larger, marine platform using a deployable lifting structure.

In preferred embodiments, the marine platform can be lifted onto/into a second marine platform via a lift line and a lifting mechanism such as crane or davit on the second marine platform. In some variants of embodiments with such a lift line, the marine platform comprises a deployable lifting structure connected to the marine platform and connectable to the distal end of the lift line. Before a captured vessel is hauled onto the marine platform, the deployable lifting structure is in an undeployed (stowed or lowered) position which allows the vessel to be safely hauled onto the marine platform since, with the deployable lifting structure in the undeployed position, nothing extends significantly above the level of the hull of the marine platform, nor does anything extend from the sides or rear of the hull inward (there is clear sky above the marine platform and around the vessel). This prevents collision between elements on the recovered vessel such as high antennas or upper-structures and the lifting structure of the marine platform during hauling of the vessel onto/into the marine platform. Once the vessel is in its recovery position on the marine platform, the vessel is coupled to the marine platform so that there will be virtually no relative motion between them. Thereafter, the deployable lifting structure, which is attached to the recovery platform, can safely be raised to its deployed position above the vessel and the marine platform and vessel can be lifted on board the second marine platform. Raising of the deployable lifting structure occurs automatically, Activating the lifting mechanism shortens the section of lift line between the two platforms. This raises the distal end of the lift line, thereby causing the deployable lifting structure to rise from its stowed, undeployed position to its raised, deployed position. Once the deployable lifting structure is fully deployed, continued raising of the distal end of the lift line raises the marine platform onto/into the second marine platform.

The deployable lifting structure can be activated independently to be moved from the deployed to the undeployed position or vice versa by other mechanical actuators such as, but not limited to, hydraulic, pneumatic and electric actuators. In this case as well, the deployable lifting structure is deployed only after the vessel is hauled into the cradle, positioning the lift line of the lifting mechanism above the center of gravity of the cradle and the recovered vessel, ready to be lifted to the second marine platform.

The deployable lifting structure is hingedly connected to the marine platform, such as the cradle disclosed herein. The deployable lifting structure is shaped such that, in an undeployed, stowed or horizontal, configuration, it follows the shape of the sides of the cradle so that there is clear sky above the vessel being recovered; in the stowed configuration, no part of the cradle or the deployable lifting structure extends significantly above the level of the top of the vessel's hull. The deployable lifting structure is connectable at its distal (top) end to a lift line which is deployed from a second marine platform. When the distal end of the lift line is pulled upwards to the second marine platform, it causes the deployable lifting structure to rotate about its hinges so that it transitions to an erect, deployed, configuration, thus ensuring that the cradle plus vessel can be safely lifted. Once the deployable lifting structure is in its erect configuration, continued pulling upwards of the lift line raises the cradle plus vessel (or the cradle alone) to the top of the second marine platform, where it can be safely stowed. It should be noted that the lifting structure can have a preload mechanism that keeps it in its horizontal position to ensure that it is not raised unless a sufficient pull force is provided by the lift line.

The recovery process can be under manual control. Preferably, however, it is at least partly controlled by a computer, via instructions on a processor. Any or all of the following can be controlled by the processor: (a) deployment, maneuvering and hauling in of the tensioned capturing line; (b) maneuvering of the vessel during the capturing process; (c) maneuvering of a support stage and/or a cradle; (d) hauling a vessel on board a cradle; and (e) raising the cradle (with or without a vessel on board) to and/or onto a second marine platform. Obviously, launching can also be controlled by the processor, with the processor causing any or all of lowering the cradle from the second marine platform, lowering a vessel from a marine platform or cradle into the sea, maneuvering the vessel and/or the capturing mechanism in the sea, and releasing the vessel from the processor's control.

The marine environment is characterized by stochastic waves, which can carry large amounts of energy, and which create a relative motion between the marine platform and the vessel to be recovered that is practically impossible to predict in real time. This relative motion is in the heart of the challenge of creating a coherent and safe capturing method/device that will successfully facilitate coupling between the lifting structure and the vessel to be recovered.

Furthermore, even when trying to achieve a safe recovery while the marine platform is in motion, severe instability can occur and many accidents have happened during launch and recovery operations throughout the world.

Some embodiments of the present invention are aimed at providing a device that allows an automatic, safe and coherent/consistent launch and recovery either while the recovery platform is standing still or while it is in motion at sea.

In a typical recovery procedure, the cradle is connected to the second marine platform by a towing line, the cradle being towed by the towing line. The towing line is preferably separate from and independent of both the tensioned capturing line and a lifting line. The vessel to be recovered is advanced, preferably using its own power, towards the trapping zone until the engagement device of the vessel (typically a hook), which is connected at the forward area of the keel stem line of the vessel with its opening facing the back of the vessel, is in the trapping zone. The vessel is then maneuvered, if necessary, preferably using its own power, to maintain the engagement device in the trapping zone. The capturing mechanism then captures the engagement device, as described hereinbelow, with the vessel outside the cradle. At this point, the vessel is reducing thrust power so that it becomes towed and not driven. At this point, the cradle is towed by the second marine platform and the vessel is towed by the cradle, while the vessel still remains outside the cradle.

Captured by the tensioned capturing line, the vessel is now hauled onto or into the cradle, so that when the vessel is sufficiently on or in the cradle, the two move as one body. After the vessel is fully on or in the cradle, a crane on the second marine platform starts a lifting operation. As described hereinbelow, this raises a deployable lifting structure from a horizontal position, at the edges of the cradle and to the sides of the vessel, to an erect position above the vessel and cradle, so that the lift line is substantially over the center of gravity of the cradle plus vessel. The crane then continues the lifting operation until the cradle and vessel have been fully recovered onto the second marine platform. During the lifting operation, tension is maintained on the towing line of the cradle to increase control and safety in the lifting process.

It should be noted that the engagement device opens from the sternward or rearward end, rather than from the usual bowward or forward end. In some embodiments, the engagement device can incorporate a quick release mechanism. In some embodiments, it can incorporate a friction reduction element such as a roller. In some variants of the above embodiments, it incorporates both a quick release mechanism and a friction reduction element.

It should also be noted that capture of the tensioned capturing line by a capturing mechanism is typically passive, not active, in that it is the contact between the capturing mechanism and the tensioned capturing line that induces the capture of the tensioned capturing line by the capturing mechanism. In preferred embodiments, no sensors are needed to determine that contact has occurred and to command that a capturing mechanism assume its capturing configuration with the tensioned capturing line held therein. Similarly, no human intervention is needed, either to induce contact between the capturing mechanism and the tensioned capturing line, or to induce the capturing mechanism to assume its capturing configuration. In preferred embodiments, it is the relative motions of the tensioned capturing line and the capturing mechanism that induces capture of the tensioned capturing line by the capturing mechanism. For non-limiting example, if the capturing mechanism is an engagement device opening from its sternward edge, the movement of the tensioned capturing line forward relative to the vessel, with the tensioned capturing line in at least partial contact with the keel of the vessel, induces the tensioned capturing line to slide into the open end of the engagement device. Thereafter, the tension in the tensioned capturing line will hold the tensioned capturing line in the engagement device. In preferred embodiments of an engagement device, for additional safety, the engagement device can comprise a latch so that, even if tension is momentarily lost, the tensioned capturing line will remain within the engagement device.

Reference is now made to the figures.

FIG. 1 schematically illustrates the operating principle of the capturing mechanism of a launch and recovery system, in accordance with some embodiments of the present invention.

Vessel 100 can be, for example a speedboat, an inflatable boat, a dinghy or the like. Vessels of greater dimensions are also covered by the scope of the present invention, as it is not limited to vessels of certain sizes.

Vessel 100 is equipped with an engagement device 104 located on the keel line of vessel 100. Non-limiting examples of an engagement device include a rearward-facing hook, as shown in FIG. 1, a rearward-facing slot in the stem or keel of the vessel, a latch, a magnetic catch, a bridle, a pendant, a latching hook, a ratchet, a shackle or any other conventional device that can passively capture a tensioned capturing line and thereafter provide a firm engagement with the tensioned capturing line.

In embodiments with a magnetic catch, the tensioned capturing line has at least one magnetic portion, with the magnetic portion can be in a central portion of the tensioned capturing line at one end of the tensioned capturing line, and any combination thereof.

In embodiments with a rearward-facing latch, the latch opens under pressure from its outside and is forced closed by pressure from its open interior, thus obviating escape of the tensioned capturing line from the latch.

In embodiments with a rearward-facing shackle, the preloaded shackle opens under pressure from its outside and closes once the line has entered. The shackle can only be opened by external pressure hence the line cannot escape.

Figure 2B:
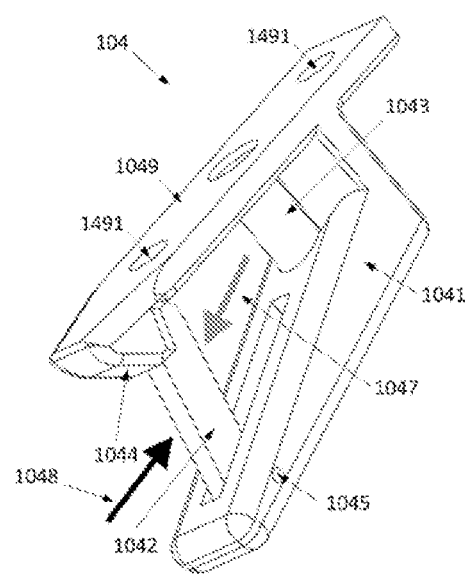
Figures 2C, 2D:
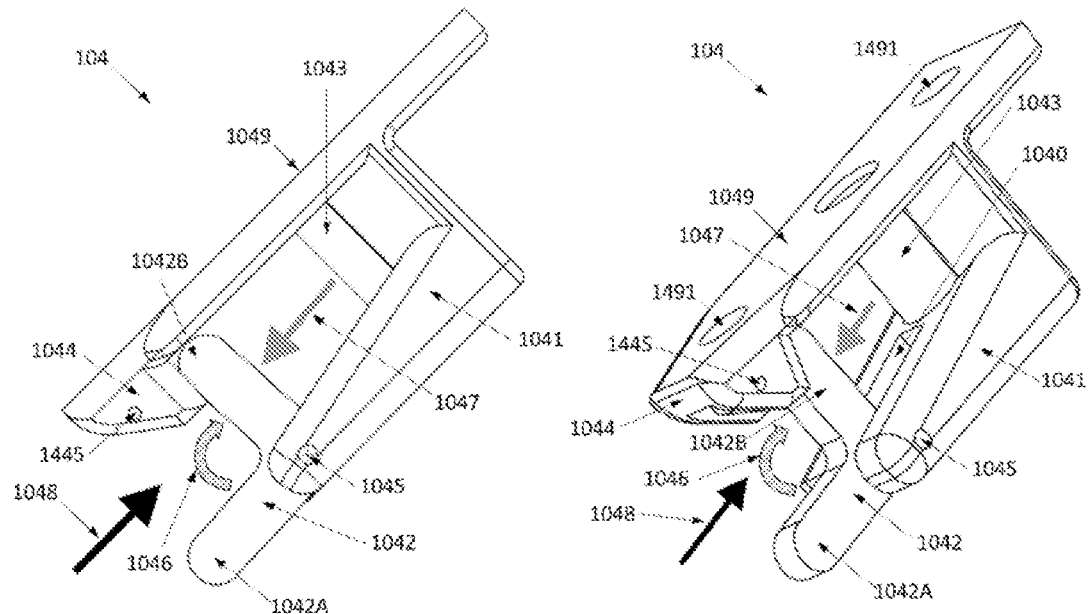
Figure 2E:
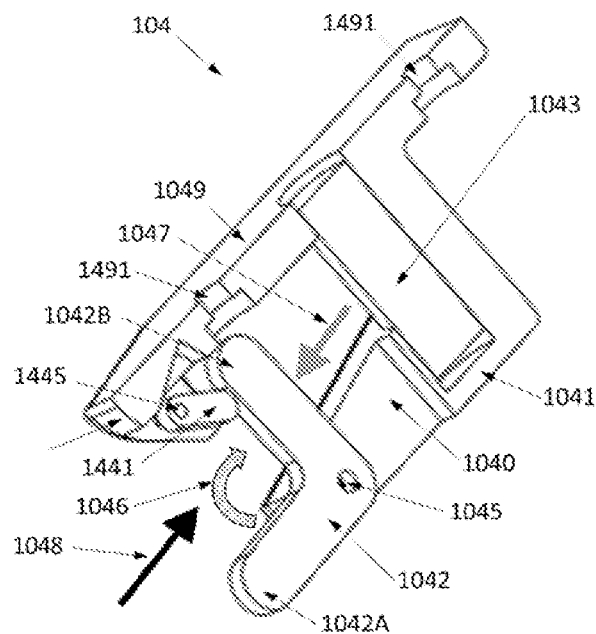
Figure 2F:
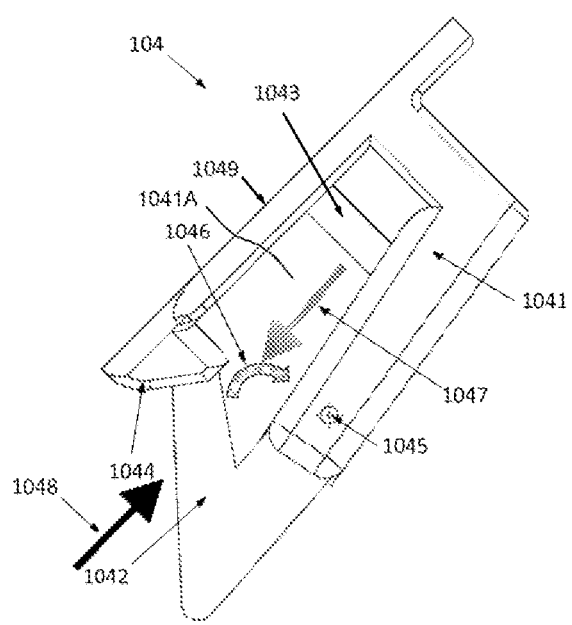
Figure 2G:
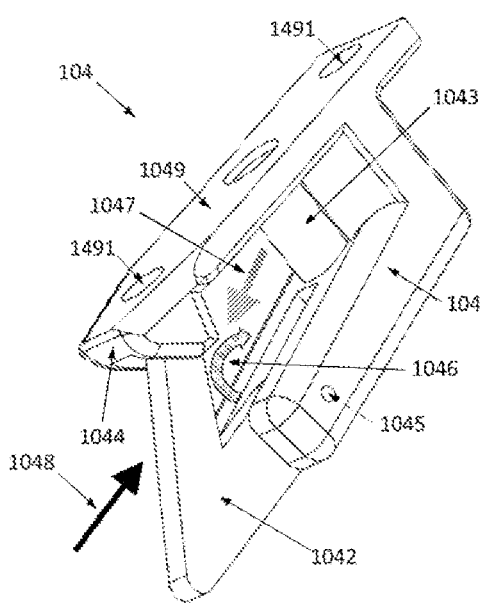

Embodiments of engagement devices 104 are schematically illustrated in FIG. 2A-G, with FIGS. 2A and 2B illustrating one embodiment, FIGS. 2C, 2D and 2E illustrating a second embodiment and FIGS. 2F and 2G illustrating a third embodiment. FIGS. 2A, 2C and 2F illustrate the engagement device 104 from the side, while FIGS. 2B, 2D, 2E and 2G illustrate a perspective view of the engagement device 104 from below, so that the underside 1049 (the side resting against the vessel 100, not shown) of the engagement device 104 is seen. FIG. 2E illustrates a perspective, section view of the second embodiment.

These engagement devices 104 comprise a catch with a fixed part 1044 and a movable part 1042, with the movable part 1042 hingedly connected 1045 to a rigid main portion 1041. The underside 1049, in these embodiments, has bolt holes 1491 for mounting the engagement device 104 to a vessel 100 (not shown). In some embodiments of the engagement device, such as those shown in FIG. 2A-G, the engagement device 104 also comprises a roller 1043 rotatable about its vertical axis to reduce friction between the tensioned capturing line (not shown) and the engagement device during, for example towing of the vessel. The general direction of motion of a tensioned capturing line entering the engagement device (an entering direction) is shown by the black arrow 1048, and the general direction of motion for a tensioned capturing line to exit (an exiting direction) from the engagement device (104) is shown by the grey arrow 1047.

FIG. 2A-B illustrates an embodiment where the movable part 1042 of the catch is a straight bar. In preferred embodiments, the bar 1042 is held in the closed position (shown) by a spring or a spring-like element (not shown). A force in an inward direction will induce the bar 1042 to rotate in a clockwise direction (patterned arrow 1046), thereby opening the catch and allowing a tensioned capturing line (not shown) to enter the open central portion of the engagement device 104. The spring or spring-like element holds the bar movable part 1042 against the fixed part 1044 of the catch, thereby holding the engagement device 104 in the closed position. A force in the exiting direction 1047 further pushes the bar movable part 1042 against the fixed part 1044 of the catch, thereby reinforcing the spring or spring-like element in holding the engagement device 104 in the closed position.

FIG. 2C-E illustrates an embodiment where the movable part 1042 of the catch is substantially L shaped (an "L movable part"), with the hinge in approximately the center of the L. In preferred embodiments, the L movable part 1042 is held by a spring or other spring-like element (not shown) in a position (shown) with an arm of the L, the arm 1042A, facing outwards and the other arm of the L, arm 1042B, substantially perpendicular to the rigid main portion 1041. A force on arm 1042B in an inward direction will induce the L movable part 1042 to rotate in a clockwise direction (patterned arrow 1046). Hingedly connected to the fixed part 1044 of the catch is a stopper 1441 (shown in the section view, FIG. 2E) which can rotate about the hinge 1045. The stopper 1441 is normally held in an extended position by a spring or spring-like element (not shown). The force in the inward direction will induce the L 1042 to rotate in a clockwise direction (patterned arrow 1046), thereby forcing the stopper 1441 to rotate in a counterclockwise direction, allowing the arm 1042A of the L to pass by the stopper 1441 and the fixed part of the catch 1044, allowing a tensioned capturing line (not shown) to enter the open central portion of the engagement device 104. Once arm 1042A of the L has passed the stopper 1441, the spring or spring-like element pushes the stopper 1441 back to its extended position, thereby closing the catch. A force in the exiting direction 1047 will further push the arm 1042A of the L against the stopper 1441 in the fixed part 1044 of the catch, thereby further holding the engagement device 104 in a closed position.

In some versions of the L embodiment of FIGS. 2C-E, the movable part of the catch (1042) will rotate clockwise by approximately 90° (patterned arrow 1046) when a tensioned capturing line enters the engagement device 104. It should be noted that, in this configuration, one arm of the L will lie substantially within a groove 1040 in the capturing device 104, while a portion of the other arm is held on its outer side by the stopper 1441 in the fixed part 1044 of the capturing device 104. In this configuration, contact between the tensioned capturing line 212 and the L movable part 1042 is on the inside of the L, thus forming a stronger catch.

As stated above, these engagement devices 104 comprise a catch with a fixed part 1044 and a movable part 1042, with the movable part 1042 hingedly connected 1045 to a rigid main portion 1041. FIG. 2F-G illustrates an embodiment where the movable part 1042 of the catch is substantially V shaped (a "V movable part"), with the hinge in approximately the center of the V. In preferred embodiments, the V movable part 1042 is held in a closed position (shown) by a spring or other spring-like element (not shown). Rigid main portion 1041 defines a gap or slot 1041A facing rearward from the front leg moveable part 1042. A force in an inward direction will induce the V movable part 1042 to rotate in a clockwise direction (patterned arrow 1046). Hingedly connected to the fixed part of the catch 1044 is a stopper 1441 (not shown; similar to that shown in FIG. 2E) which can rotate about the hinge 1045. The stopper 1441 is normally held in an extended position by a spring or spring-like element (not shown). The force in the inward direction will induce the L 1042 to rotate in a clockwise direction (patterned arrow 1046), thereby forcing the stopper 1441 to rotate in a counterclockwise direction, allowing the arm 1042A of the L to pass by the stopper 1441 and the fixed part of the catch 1044, allowing a tensioned capturing line (not shown) to enter the open central portion of the engagement device 104. Once arm 1042A of the L has passed the stopper 1441, the spring or spring-like element pushes the stopper 1441 back to its extended position, thereby closing the catch. A force in the exiting direction 1047 will further push the arm 1042A of the L against the stopper 1441 in the fixed part 1044 of the catch, thereby further holding the engagement device 104 in a closed position.

It should be noted that, in all the embodiments illustrated in FIG. 2A-G, opening of the engagement device 104 is purely mechanical. Pressure on the movable part 1042 by the tensioned capturing line in direction 1048 opens the device; pressure on the movable part 1042 by the tensioned capturing line in direction 1047 either ensures or helps ensure that the engagement device 104 is held in a closed position.

The engagement device (hook 104) can be located anywhere along the keel 102 or stem 106 of the vessel at a frontal position 112. In some embodiments, the engagement device may be located at or about the waterline of vessel 100. In other embodiments, the engagement device can be located below the waterline of vessel 100. In yet other embodiments, the engagement device can be located above the waterline of vessel 100. The position of the engagement device is configured to correspond to the anticipated position of a tensioned capturing line that is part of a capturing mechanism in such a way that a significant part of the keel line of the vessel to be recovered is swept by the tensioned capture line before it is captured by the engagement device, in accordance with some embodiments of the present invention, which is described hereinafter.

Figure 5A:
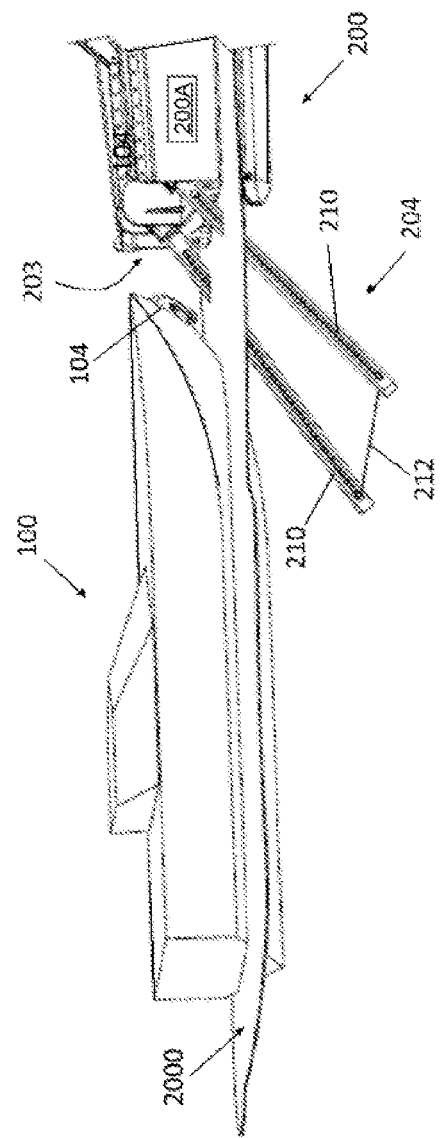
FIGS. 5A-5D depict the capture process of a vessel, in accordance with some embodiments of the present invention.

The tensioned capturing line (not shown, see, for example, FIG. 4B and FIG. 5A) is maintained in tension substantially all of the time after its initial deployment by and between two opposite arms (the line arms) (see, for example, FIG. 4B and FIG. 5A). During trapping of vessel 100, the tensioned capturing line is moved in the directions indicated by arrows 108, 110 and 114. At first, the tensioned capturing line is maintained at a predetermined depth. When vessel 100 enters a trapping zone which is defined by the position and dimensions of the capturing mechanism, the tensioned capturing line will be positioned such that it is beneath the keel of the vessel, substantially transverse to the keel of the vessel, and extending across the width of the vessel, with the distance between the distal ends of the line arms (the free length of the tensioned capturing line) being greater than the width of the vessel to enlarge the capturing zone and to increase the capture success rate.

Preferably, position and dimensions of the capturing mechanism are such that the trapping zone is long enough that the position of the tensioned capturing line relative to the hull of the vessel will induce a long and effective sweeping motion along the hull, and preferably along the keel-stem line of the hull. In preferred embodiments, the optimal position for the cable at the time of contact of the tensioned capturing line with the vessel is under the third quarter of the vessel, where the first quarter is the back of the vessel and the fourth quarter is the front of the vessel's bow.

When it is determined that the engagement device 104 of the vessel 100 is within the trapping zone, the tensioned capturing line is raised towards the keel, in the general direction indicated by arrow 108. In some embodiments of the present invention, this (arrow 108) is actually not a straight line but a curve.

When it is determined that the tensioned capturing line is in contact with the keel-stem line 102-106, the tensioned capturing line is blindly swept along the keel-stem line 102-106 towards the bow of the vessel, in the direction indicated by arrow 110. During this blind sweeping process, the tensioned capturing line is maintained in contact with the keel-stem line 102-106, until it is captured by engagement device 104. In preferred embodiments, the tensioned capturing line is well aft of the engagement device 104 at the time it is raised, so that the capturing line is swept along a significant portion of the vessel's hull during its passage along the keel-stem line. Contact between the tensioned capturing line and the keel-stem line of the vessel ensures that the tensioned capturing line will contact the engagement device 104. This increases the capture success rate and reduces the need for highly accurate homing and positioning of the vessel relative to the capturing mechanism.

Then, when the tensioned capturing line is secured within the engagement device 104, the tensioned capturing line is pulled in the general direction indicated by arrow 114, such that the vessel may be towed.

FIG. 3A is a schematic side view of vessel 100, with FIG. 3B showing a bottom view of vessel 100.

FIG. 4A is a schematic side view of a cradle 200 for launch and recovery of a vessel, according to some embodiments of the present invention, with FIG. 4B showing a bottom view of the cradle 200.

Cradle 200 generally comprises a closed or open hull 202 configured to have a rear opening 203 (more clearly shown in FIGS. 5 and 6) or lowered wall over which vessel 100 is to be hauled onto the cradle 200. Cradle 200 also includes a capturing mechanism 204 that includes two substantially opposite line arms 210 between which tensioned capturing line 212 is extended. The line arms 210 with the tensioned capturing line 212 are located outside the perimeter of the cradle's hull, overboard, so as to allow the distal ends of the line arms 210 and the tensioned capturing line 212 to be placed beneath the vessel that is to be recovered.

According to some embodiments of the present invention, tensioned capturing line 212 is maintained tensioned between line arms 210. Tensioned capturing line 212 is held between two points, the distal anchors 213, which can be substantially at the distal ends of the line arms 210, can be at other locations along the line arms, or can be movable along line arms 210. Line arms 210 can be movable out of and into the cradle, rotatably raised or lowered about axes 222 (see FIGS. 5A and 7A), their proximal ends can be raised and lowered along an axis substantially transverse to the proximal end of the line arms 210 and, in some embodiments, can be flexed; as long as the line arms 210 maintain tensioned capturing line 212 such that it is tensioned and so that it is movable along the capture line 108-110. Line arms 210 can be operated by one or more actuators (not shown in this figure). The movements of the line arms enable playing out of the tensioned capturing line 212, playing in of the tensioned capturing line 212, raising and lowering of the tensioned capturing line 212, moving the tensioned capturing line 212 forward and backward, and, in some embodiments, additionally allow the tensioned capturing line 212 to be moved to the left or right. Hull 202 of the cradle 200 can include a skeg 208 for enhanced stability. Cradle 200 further includes a deployable lifting structure 206 (whose structure and operation of is explained hereinafter).

It should be noted that the tensioned capturing line 212 can be anchored to the marine platform at other points in order to ensure that the tensioned capturing line 212 can be free to move as appropriate and does not interfere with other functions of the marine platform. A non-limiting example of a location for an anchor is near the proximal end of the line arm 210, where the line arm is connected to the marine platform.

FIGS. 5A-5D depict the capture process for a vessel, in accordance with some embodiments of the present invention.

FIG. 5A schematically illustrates the entering of vessel 100 into the trapping zone of the capturing mechanism 204. The surface of the water is illustrated in an exemplary fashion by surface 2000; the vessel 100 and the marine platform 200 are floating, with a portion of their hulls under water. The distal ends of the line arms 210 of the capturing mechanism are under water, as is the tensioned capturing line 212.

Vessel 100 can be navigated independently (e.g., by an onboard skipper or using a remote controller or automatically using sensors and an automatic pilot system) so that the engagement device 104 is brought to within the trapping zone. The trapping zone (209, FIG. 4B) is the area on the surface of the water underneath which the line arms 210 and tensioned capturing line 212 of the capturing mechanism may be positioned, whose length extends between the rear of the cradle and the furthermost position of the tensioned capturing line 212 when the line arms 210 of the capturing mechanism are deployed, and whose width is defined by the distance between the line arms 210. Preferably, according to some embodiments of the present invention, the cradle is towed. When the cradle is towed relative lateral movement between the cradle and the vessel is greatly reduced, which lends itself to a smoother performance of the recovery maneuver. The cradle can be towed by a ship (see, for example, FIG. 9) or other movable second marine platform, or by a winch located on a stationary platform or on shore. If cradle is not towed, it may be maneuvered by its own means such as thrusters and rudders.

Figure 5B:
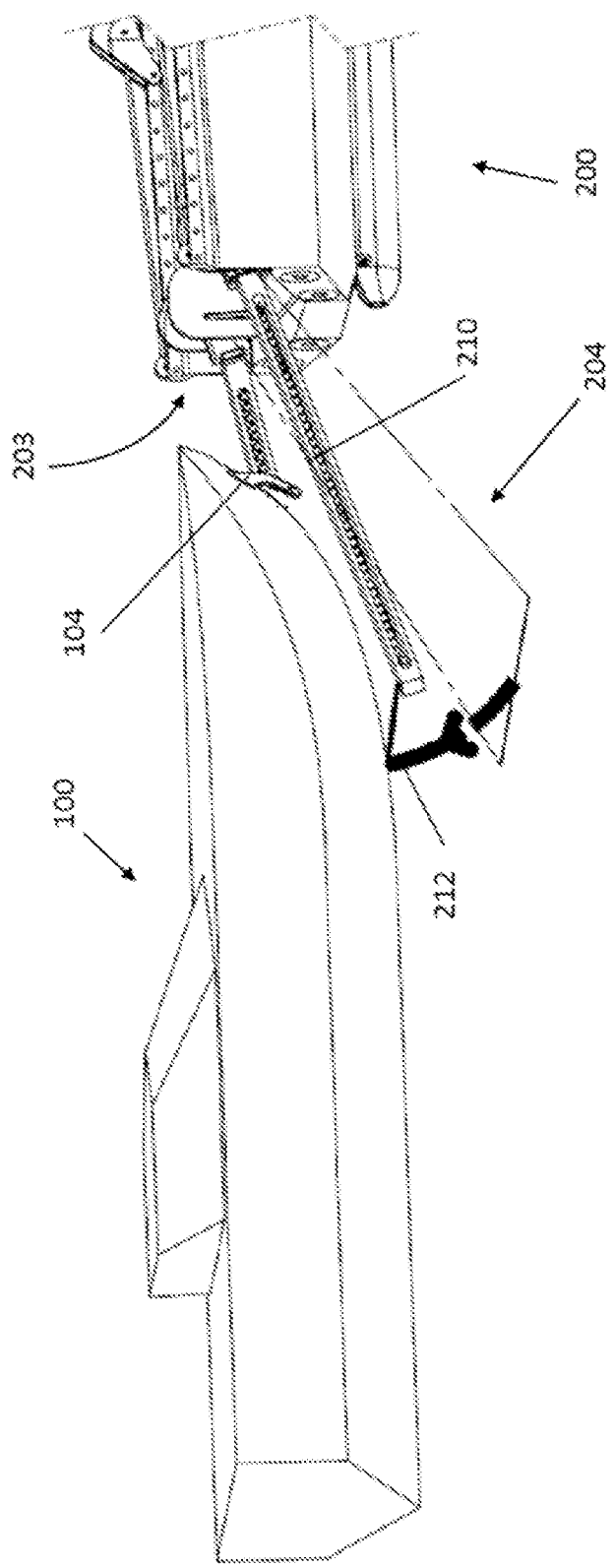

FIG. 5B schematically illustrates raising the tensioned capturing line 212 of the capturing mechanism to intercept the keel-stem line of the vessel.

Figure 5C:
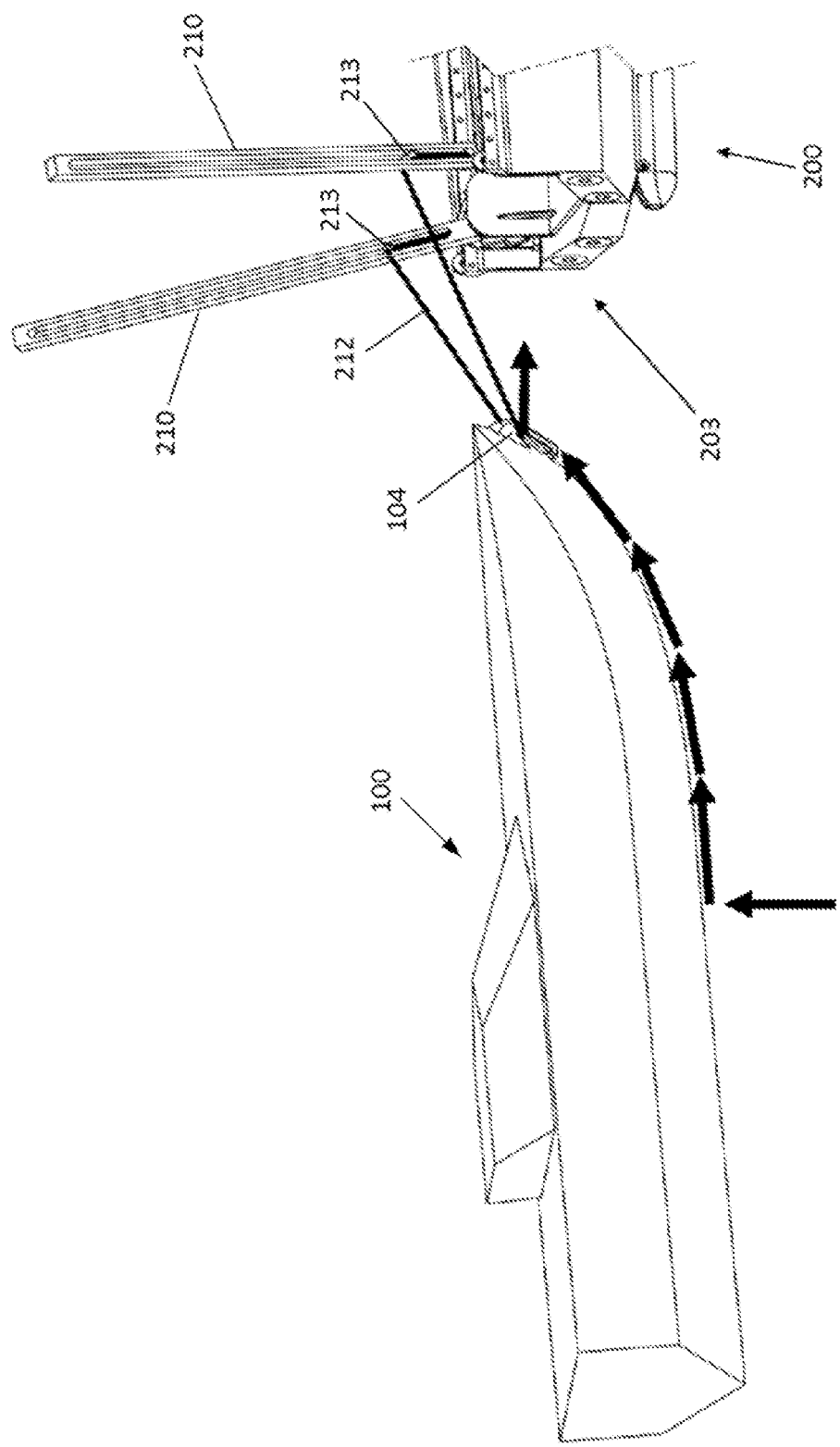

Upon determining that the engagement device 104 of vessel 100 is within the trapping zone, as shown in FIG. 5C, the line arms 210 with tensioned capturing line 212 of the capturing mechanism are raised until tensioned capturing line 212 engages with engagement device 104. As soon as the tensioned capturing line 212 is engaged with the engagement device 104, the tensioned capturing line 212 is allowed to take up a V shape so as to provide a stable towing link between the towed vessel and the towing marine platform. The V shape can be provided by reducing the distance between the two distal anchoring holders 213, by providing a sufficient slack to the tensioned capturing line 212 e.g, by playing out some of the tensioned capturing line 212, by providing elasticity to the tensioned capturing line 212, and by any combination thereof.

Figure 5D:
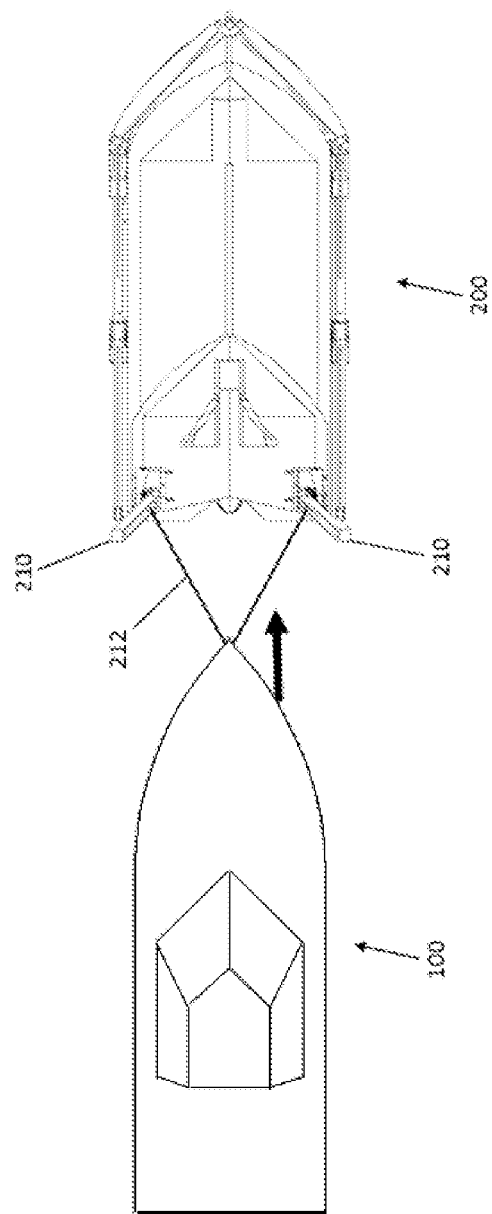

The vessel's engine is reduced to minimal throttle, thus lowering the speed of the vessel and lowering its center of gravity. Since the marine platform is now moving faster than the vessel, this allows tension to develop in tensioned capturing line 212, thereby making the capturing process of the vessel safer by making the vessel/marine platform system more stable and more controllable. This stage of the process ends with the vessel towed by the marine platform (FIG. 5D). If, as illustrated in FIG. 8, the marine platform is recoverable onto a second marine platform, the marine platform can be towed by the second marine platform.

The distal anchoring holders 213 can be operated, for example, via a transmission powered by the actuator. The distal anchoring holders 213 can stay at the distal ends of the line arms 210 as long as there is a V shape in the tensioned capturing line 212, which makes hauling of the vessel more stable, with the vessel and cradle having a low center of gravity, more controlled and therefore safer. In some cases the tensioned capturing line 212 can slide through the anchoring holders, such that the tensioned capturing line 212 can be pulled or released by an actuator that is located at some distance from the capturing mechanism itself.

FIG. 5D schematically illustrates a final stage of the capturing process, with the line arms 210 vertical and the vessel towed at the stern of the marine platform 200. The line arms 210 can continue to rotate further, until they are fully retracted and, preferably, lying inside marine platform 200.

FIGS. 6A-6C schematically illustrate the capturing process, according to other embodiments of the capturing mechanism 204. In the embodiments of FIGS. 6A-C, the line arms 210 are attached to the rear of the marine platform 200.

Each line arm comprises at least two frame rails substantially parallel to the main longitudinal axis of the line arm 210. The frame rails are typically of rectangular cross-section; although other cross-sections sections such as, but not limited to, semicircular cross section, can be used. Each line arm movably supports, on the frame rails, a vertical sliding rail 216 which is substantially perpendicular to the main longitudinal axis of the line arm 210, with each vertical sliding rail 216 controllably substantially horizontally translatable between the proximal and distal ends of its line arm 210. Each vertical sliding rail 216 supports a movable sliding connection element 218, with each movable sliding connection element 218 controllably translatable between the lower end and the upper end of its vertical sliding rail 216. Horizontal movement of the vertical sliding rails 216 and vertical movement of the sliding connection elements 218 can move the capturing line 212 in any desired direction, up, down, forward and backward and also in non-symmetrically. Each movable sliding connection element 218 is attached to an end of the capturing line 212. In some variants of this embodiment, the capturing line 212 can be controllably played in or out by at least one winch mechanism (not shown) in communication with at least one sliding connection element 218. In some other variants of this embodiments the line arms 210 may be movable relative to the cradle and may extend into the cradle.

To ensure capturing of the vessel, the capturing mechanism is configured to sweep a substantial portion of the hull of the vessel in the direction of the engagement device. In order to achieve this goal, the frames of the mechanism extend to length which is substantial relative to the length of the vessel thus allowing the capturing cable to be well behind the engagement device position before the sweeping process begins. The capturing cable is placed under the surface of the water in a depth greater than the maximal anticipated depth of the keel of the vessel. The first vertical motion of the capturing cable is sweeping the area searching for the vessel hull. This encounter may also happen while the vessel is in the air as a result of motion at sea. Once contact has been achieved somewhere along the hull, preferably in a substantial rear position to the engagement device, the mechanism keeps the capturing line in contact with the hull of the vessel while sweeping it (the capturing cable) across the hull till it is captured in the engagement device FIG. 6A schematically illustrates the bow portion of the vessel 100, the capturing mechanism 204 and the stern portion the marine platform 200 upon approach of a vessel 100 to the marine platform 200. In FIG. 6A, the engagement device 104 has not yet entered the capturing zone. The line arms 210 extend into the water (not shown), so that the capturing line 212 is beneath the surface of the water. The vertical sliding rails 216 are at substantially their distalmost position, and the movable sliding connection elements 218 are at substantially their lowest position, so the capturing line 212 is substantially as far as possible from the marine platform 200 and as low as possible in the water.

FIG. 6B schematically illustrates the bow portion of the vessel 100, the capturing mechanism 204 and the stern portion the marine platform 200 after the engagement device 104 has entered the capturing zone, but before it has captured the capturing line 212. The vessel 100 and the marine platform 200 are still free to move independently. The line arms 210 extend into the water (not shown), so that the capturing line 212 is beneath the surface of the water. The vertical sliding rails 216 are at substantially their distalmost position, and the movable sliding connection elements 218 are at substantially their lowest position, so the capturing line 212 is substantially as far as possible from the marine platform 200 and as low as possible in the water.

In order to perform the capture, the movable sliding connection elements 218 are jointly moved upward till the tensioned capturing line contacts the keel line of the vessel, than the vertical sliding rails 216 are jointly translated toward the proximal ends of the line arms 210, thus sweeping the keel line of the vessel until the tensioned capturing line encounters the engagement device.

FIG. 6C schematically illustrates the bow portion of the vessel 100, the capturing mechanism 204 and the stern portion the marine platform 200 after the engagement device 104 has captured the capturing line 212. The vertical sliding rails 216 are at substantially their proximalmost position, and the movable sliding connection elements 218 have been raised. The capturing line 212 has been played out so that the capturing line 212 forms a V, If needed to retain the vessel 100 securely at the stern of the recovery platform 200, at least one of the following can be done: the capturing line 212 can be played in, and the movable sliding connection elements 218 can be further raised.

FIG. 7A schematically illustrates a top view of a vessel approaching the trapping zone of a bow capture device of a cradle 200 for launching and recovering a vessel, according to some embodiments of the present invention.

Figure 7B:
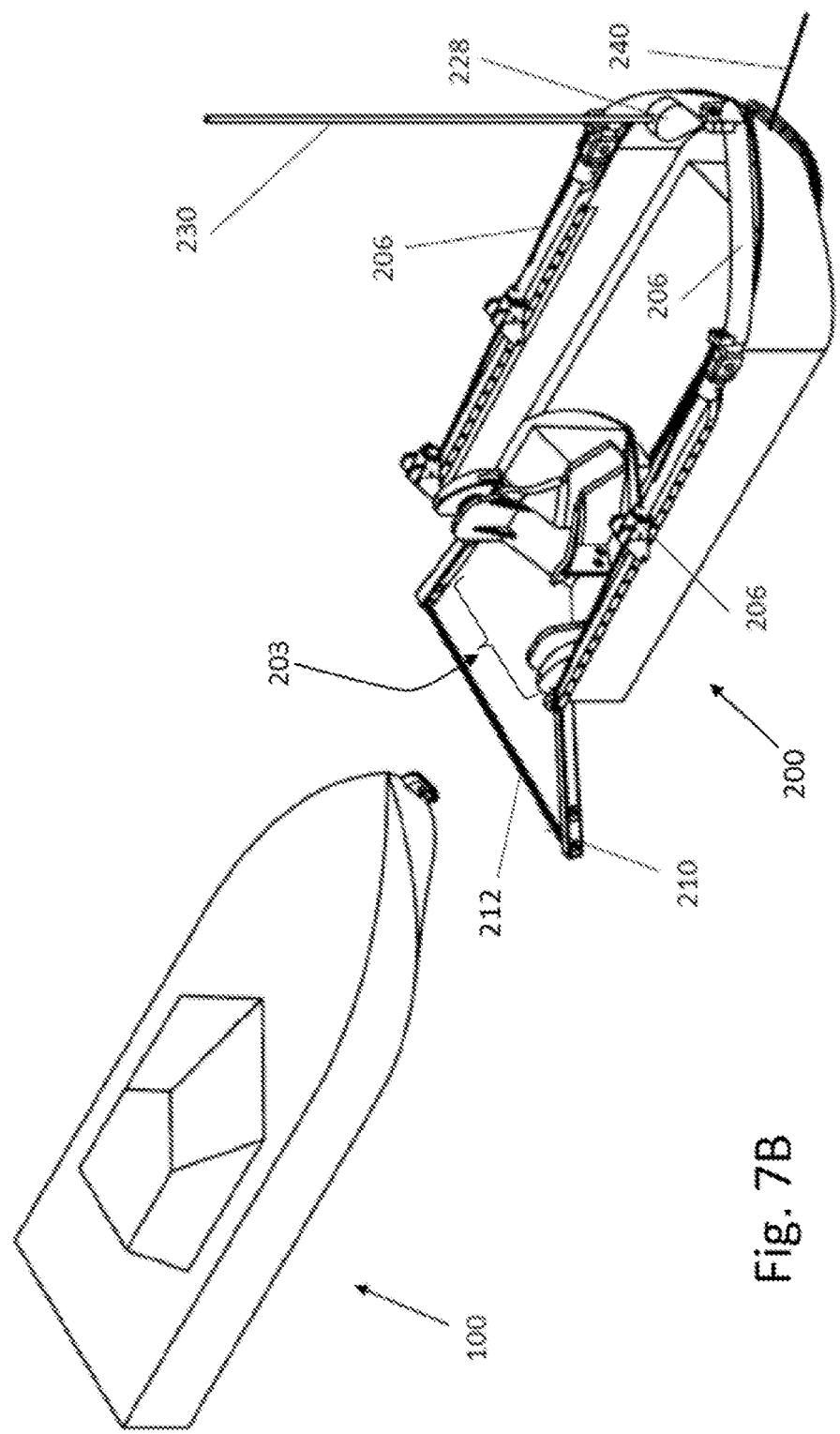
FIG. 7B illustrates a vessel approaching the trapping zone of the capturing mechanism of a system for launching and recovering a vessel (isometric view), according to some embodiments of the present invention.

FIG. 7B schematically illustrates an isometric view of a vessel approaching the trapping zone of a bow capture device of a cradle for launching and recovering a vessel, according to some embodiments of the present invention.

Figure 8A:
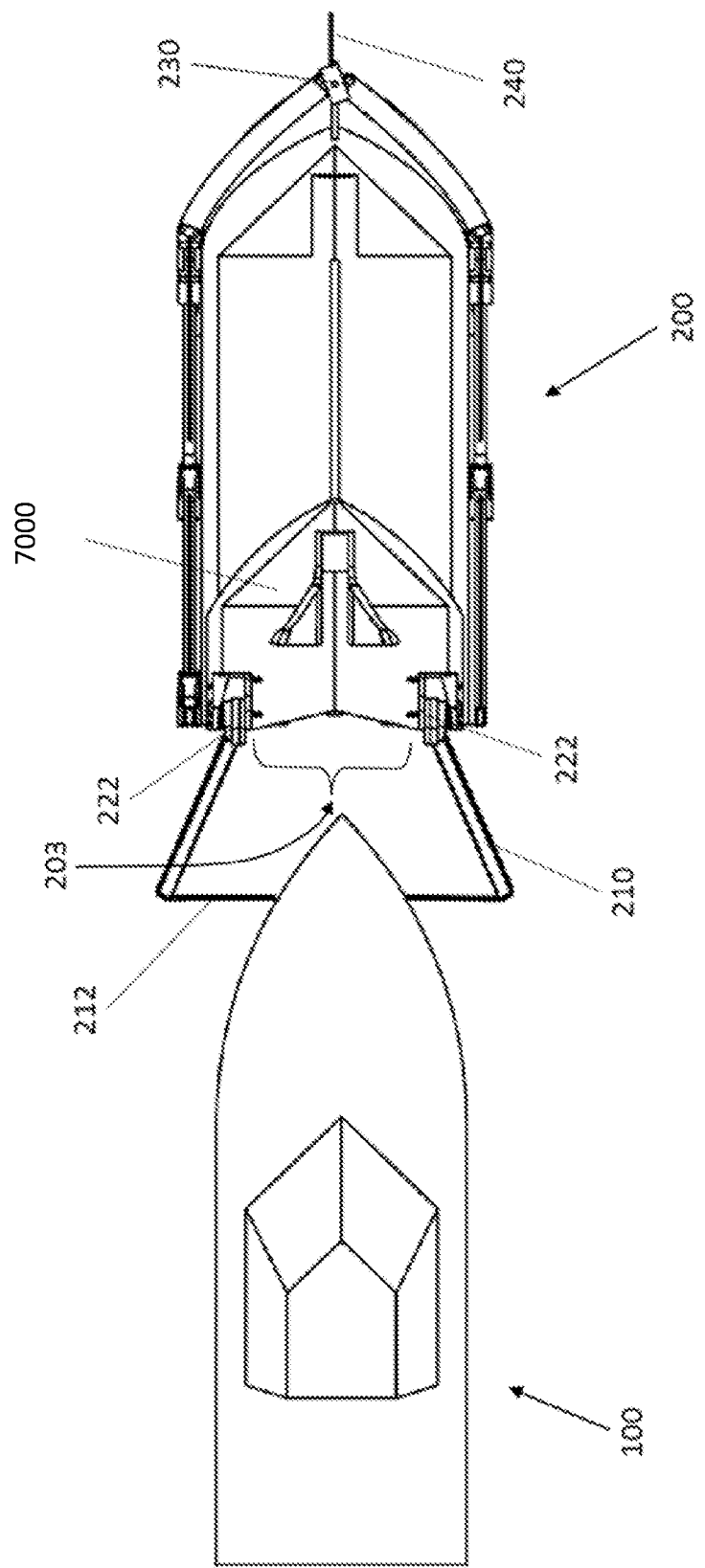
FIG. 8A illustrates a vessel inside the trapping zone of the capturing mechanism of a system for launching and recovering a vessel (top view), according to some embodiments of the present invention.

FIG. 8A schematically illustrates a top view of a vessel inside the trapping zone of a bow capture device of a cradle for launching and recovering a vessel, according to some embodiments of the present invention.

Figure 8B:
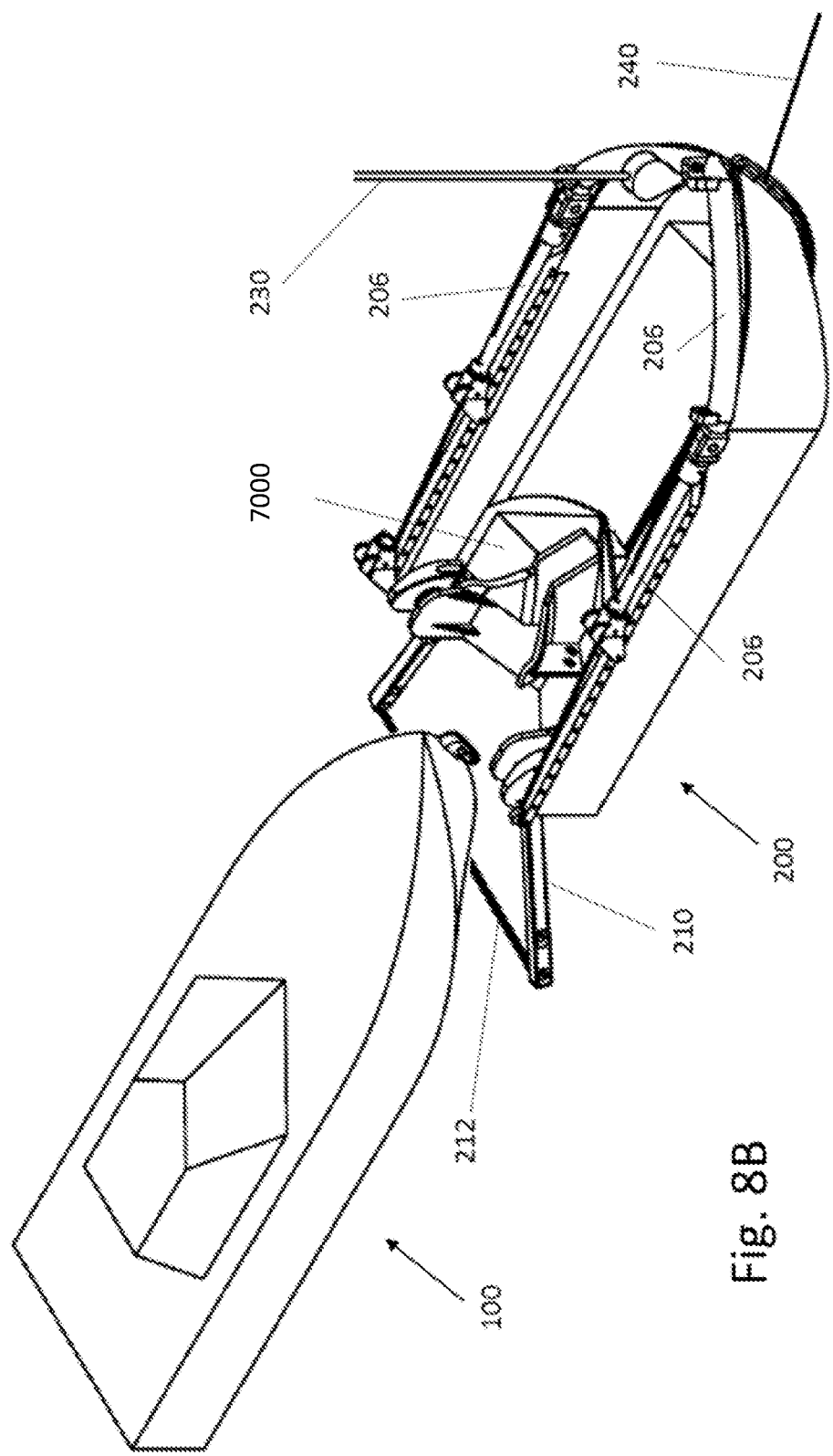
FIG. 8B illustrates a vessel inside the trapping zone of a capturing mechanism of a system for launching and recovering a vessel (isometric view), according to some embodiments of the present invention.

FIG. 8B schematically illustrates an isometric view of a vessel inside the trapping zone of a bow capture device of a cradle for launching and recovering a vessel, according to some embodiments of the present invention.

Tow line 240 is linked to the bow of marine platform/cradle 200 and connected to the second marine platform/towing ship (or other towing object). In some embodiments, the lift line 230 and the frame line 500 of the deployable lifting structure can be continuous, so that no linkage mechanism is needed. In some embodiments, lift line 230 is linked to a crane or hoist (not shown in this figure, see, for example, crane 610 in FIG. 9) located on the second marine platform, a ship or other large marine platform, onto which the cradle with the vessel onboard is to be recovered. Linkage between the lift line 230 and the frame line 500 of the deployable lifting structure 206 is at the top of the deployable lifting structure 206.

In order to allow the capturing mechanism to be moved inside the cradle 200, the cradle 200 may include a support stage 7000 on which the capturing mechanism 204 is mounted. The support stage 7000 may be moved along the cradle 200, during the last stage of the recovery to the cradle (or launch).

The bottom of cradle 200 may be designed to present substantially the same V shape angle (deadrise angle) as the bottom of the recovered vessel. The cradle is designed to float at a height configured to firmly press the hauled vessel onto the cradle (or the support stage), thus forcing the vessel and cradle to act as one body, preventing or greatly reducing relative motion between the cradle and the vessel.

The cradle can be shorter than the overall length of the vessel, as long as the longitudinal center of gravity of a cradle loaded with a vessel is within the length of the cradle, so that safe lifting can be performed using the deployable lifting structure.

FIG. 9 illustrates a recovered vessel resting on a cradle for launching and recovering a vessel, the cradle being towed by a second marine platform 400, and hooked to a crane 610 about to raise the cradle onto the second marine platform 400, according to some embodiments of the present invention. Tow line 240 is secured to the second marine platform at a predetermined point (preferably at a frontal portion of the second marine platform, and can be linked at all times to the cradle, while the lift line 230 of crane 610 is linked to the top of deployable lifting structure 206 at constant tension.

Both lines are linked to the cradle throughout the recovery process, to reduce yawing of the cradle (with or without the vessel on top of it) and to ensure that the cradle (with or without the vessel) maintains a predetermined course some distance away from the second marine platform's side. A desired distance between the cradle and the second marine platform can be maintained, for example, by a set of rudders or thrusters, either fixed or controllable, on the cradle or by a structure of some form that keeps the cradle at a safe distance from the second marine platform.

FIG. 10 illustrates a cradle for launching and recovering a vessel, with its deployable lifting structure being raised, according to some embodiments of the present invention. It is noted that until the completion of hauling of the vessel 100 onto cradle 200, deployable lifting structure 206 is maintained in its stowed configuration, to allow the vessel to be the more safely hauled, since, with the deployable lifting structure 206 stowed, 'clear sky' is maintained above the cradle and the vessel. The frame of the deployable lifting structure 206 is shaped so as to substantially conform to the contour of the rim of the cradle's side and front walls, so that the frame rests over the rim (thus substantially horizontal) when in the stowed configuration. In some embodiments of the present invention the deployable lifting structure 206 may also be shaped such that it extends outward beyond the rim of the cradle's walls. In less-preferred embodiments of the present invention, the deployable lifting structure 206 may also be shaped such that it protrudes into the space defined by the rim of the cradle's walls, but that would have its drawbacks as it can take up space in or over the interior of the cradle and would require planning a larger cradle in order to have room to accommodate both the vessel and the deployable lifting structure 206 within the cradle walls.

Deployable lifting structure 206 can include two substantially opposite frame bars 512 pivotally connected by hinges 506, to substantially opposite positions at the sides of the cradle, and a V-shaped (or U-shaped or straight shaped) structure 514. Each of the ends of V- or U- or straight-shaped structure 514 is connected, via a hinge 508, to one of the frame bars 512. In the embodiment shown, the hinges 506 are forward of the longitudinal center of gravity of the cradle, and preferably forward of the expected longitudinal center of gravity of the cradle with a vessel aboard.

The frame bars 512 can be connected, as shown herein, to the cradles' side wall, or they can stand free of the cradle's walls, being attached to, for non-limiting example, the bottom of the cradle.

The ends of frame line 500 are each secured to a rear position 516 on either of the cradle 200, aft of the longitudinal center of gravity of the cradle, and preferably aft of the expected longitudinal center of gravity of the cradle with a vessel aboard. The frame line 500 is coupled to deployable lifting structure 206 in at least at three positions: two substantially opposite loops 502 located on either sides of the frame (about the ends of V-shaped bar 514) and at the top of the frame, at the center of V-shaped bar 514. The frame line 500 is allowed to move within the loops, and is linked to lift line 230 (or, in some embodiments, is an integral part of lift line 230), so that, when the crane starts pulling lift line 230, deployable lifting structure 206 starts to rise up. Limiters 518 can be placed on frame line 500 so as to limit the movement of the deployable lifting structure 206 such that it stops the deployable lifting structure 206 from moving beyond a predetermined angle with respect to the cradle. Therefore, the lifting point is positioned substantially above the center of gravity of the cradle or of a cradle containing a vessel. In its deployed position, the deployable lifting structure and the marine platform is a stable structure based on the tensioned lift line on one side of the deployable lifting structure and the limiters which define the deployed position.

The frame line can be coupled to the deployable lifting structure 206 via couplers or by being incorporated at least partially inside the deployable lifting structure's frame bars. Couplers can be loop-like, tube-like or any other conventional means of guiding the frame line so that it at least partially follows the contours of the deployable lifting structure.

Limiters can be provided on the frame line so as to stop the deployable lifting structure from moving beyond a predetermined position above the marine platform. In some embodiments, the limiters comprise transverse extensions to the frame line. In embodiments such as those with a transverse extension, raising of the frame can terminate when further movement of a limiter is prevented by contact of the limiter with: a coupler, a hole where a frame line enters the frame, a stopping mechanism, and any combination thereof.

Figure 11:
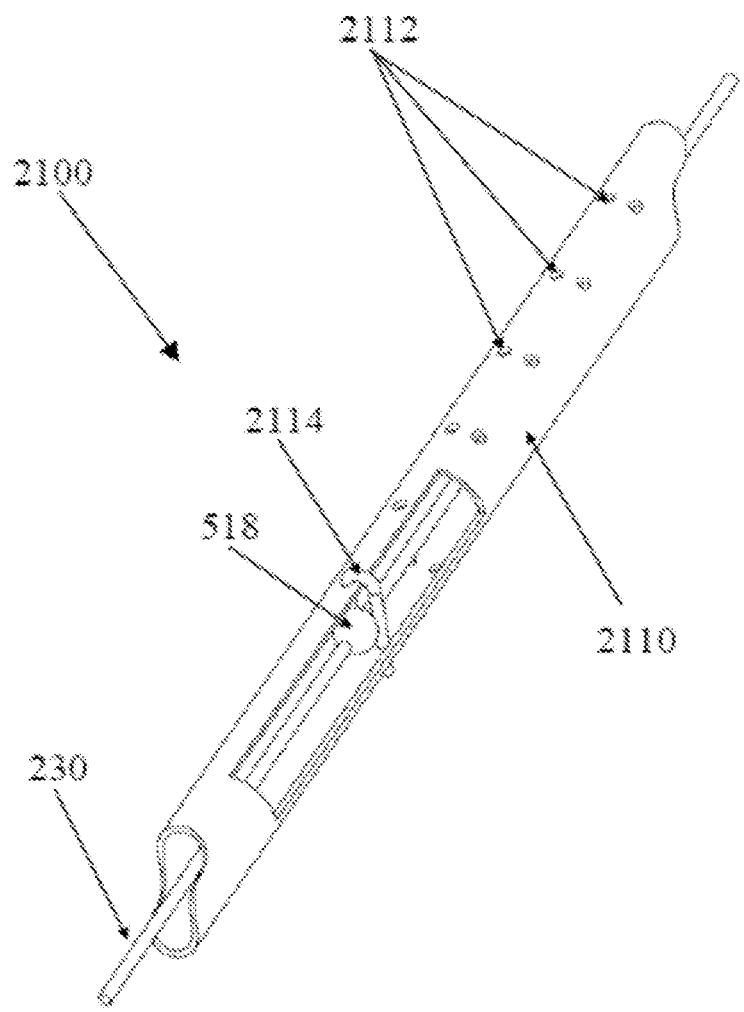
FIG. 11 illustrates an embodiment of a stopping mechanism, with a frame line passing there through and a limiter attached to the frame line.

FIG. 11 illustrates an embodiment of a stopping mechanism 2100. In this embodiment, the stopping mechanism 2100 comprises sleeve 2110 with holes 2112. In this embodiment, the stopping mechanism can comprise a coupler, or it can form part of one of the frame bars. The holes 2112 in the sleeve 2110 are shaped and sized such that a stopper 2114, in this embodiment, a U-shaped stopper, can pass therethrough. The stopper 2114 is shaped and sized such that the frame line 230 can pass freely therethrough, but the limiter 518 cannot pass therethrough so that, when a limiter 518 contacts a stopper 2114, further movement of the frame line 230 is prevented. This embodiment of the stopping mechanism 2100 illustrates an adjustable stopping mechanism, in that the distance the frame line 230 travels and, therefore, the maximum angle between the deployable lifting structure and the cradle is determined by the longitudinal position of the pair of holes 2112 the stopper 2114 is inserted in. Using a pair of holes at the proximal end of the sleeve 2110, as shown, leads to the smallest possible angle for the deployable lifting frame in its erect configuration; using a pair of holes at the distal (opposite) end of the sleeve 2110 leads to the largest possible angle for the deployable lifting frame in its erect configuration. It should be noted that, in the embodiment shown, there are more than 2 holes around the circumference of the sleeve 2110 at each longitudinal position where holes exist. This allows flexibility in use—an operator can insert the stopper 2114 from multiple directions, reducing limitations on the angle at which he needs to approach the deployable lifting structure in order to insert a stopper 2114.

Deployable lifting structure 206 combines a structural frame assembly (comprising 514 and 512) with frame lines 500. The frame assembly and frame lines 500 are connected to the marine platform (in the illustrated case, the cradle) at points 506 and 516 respectively. Points 506 and 516 are configured such that the center of gravity of the entire lifted weight (in the illustrated case, the cradle with the vessel on board) lies in between them. When frame line 500 is pulled by lifting line 230 of the crane, it slides through to couplers 502 causing the frame to rise until the lifting line 230 is located substantially above the center of gravity. The limiters 518 are designed such that when the limiters are mechanically blocked by the couplers 502 the structure is fixed in a lifting geometry. At this stage, the load of the weight is carried by the frame lines 500, the limiters and the frame assembly, which are under tension.

It should be noted that, in some embodiments, the entire configuration of this assembly is assembled in a reversed orientation, with the frame assembly connected at the aft points 516, aft of the center of gravity, and the frame lines 500 at the forward points 506, forward of the center of gravity.

In preferred embodiments, in the erect configuration of the deployable lifting structure 206, the top of the deployable lifting structure 206 is above the longitudinal center of gravity of a cradle (or other marine platform) 200 with a vessel 100 on board. In other words, in the erect position, the longitudinal position of the top of the deployable lifting structure 206, and therefore the longitudinal position of the lift line 230, is substantially the same as the longitudinal position of the center of gravity of the cradle (or other marine platform) 200 with a vessel 100 on board.

In preferred embodiments, in the erect configuration of the deployable lifting structure 206, the top of the deployable lifting structure 206 is above the transverse center of gravity of a cradle (or other marine platform) 200 with a vessel 100 on board. Typically, the transverse center of gravity of the cradle (or other marine platform) 200 with a vessel 100 on board will be substantially along the keel or stem of the vessel.

FIG. 12A illustrates a cradle 200 for launching and recovering a vessel with its deployable lifting structure 206 in a stowed configuration, according to some embodiments of the present invention.

FIG. 12B illustrates a cradle 200 for launching and recovering a vessel s with its deployable lifting structure 206 in its erect configuration, according to some embodiments of the present invention.

In some embodiments of the present invention, the positions 516 of the connection of frame line 500 to the cradle, the positions of hinges 506 and the position 518 of the limiters are configured such that the anticipated center of gravity of the cradle 200 with a vessel on top of it lies substantially under the top of the erected deployable lifting structure 206.

Figure 13A:
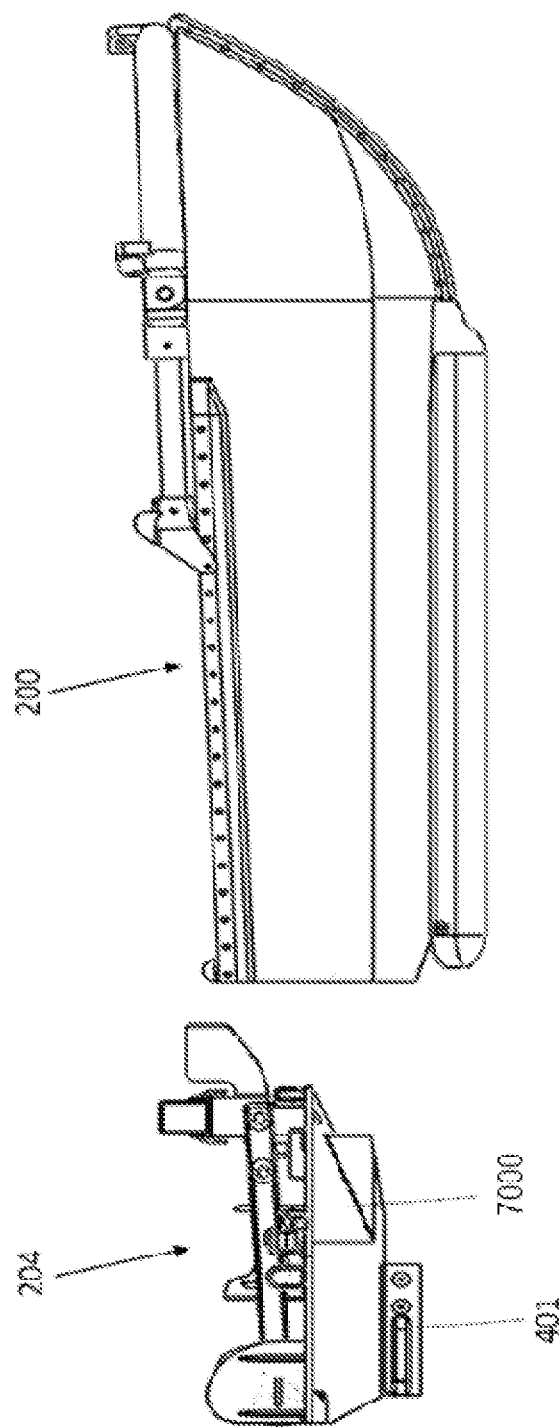
FIG. 13A is a side view of a system for launch and recovery of a vessel, according to some embodiments of the present invention, with the capturing mechanism on a movable support stage which is separate from the cradle.

FIG. 13A is a side view of a system for launch and recovery of a marine vessel, according to some embodiments of the present invention, with a movable support stage 7000 on which capturing mechanism 204 is mounted (separated). The support stage 7000 can be designed to move inside of the cradle along a predetermined track. The predetermined track can comprise a bottom protruding slider 401 extending from the base of the support stage 7000, and a matching groove on the cradle. The bottom protruding slider 401 can be inserted the groove and can move along that groove.

Figure 13B:
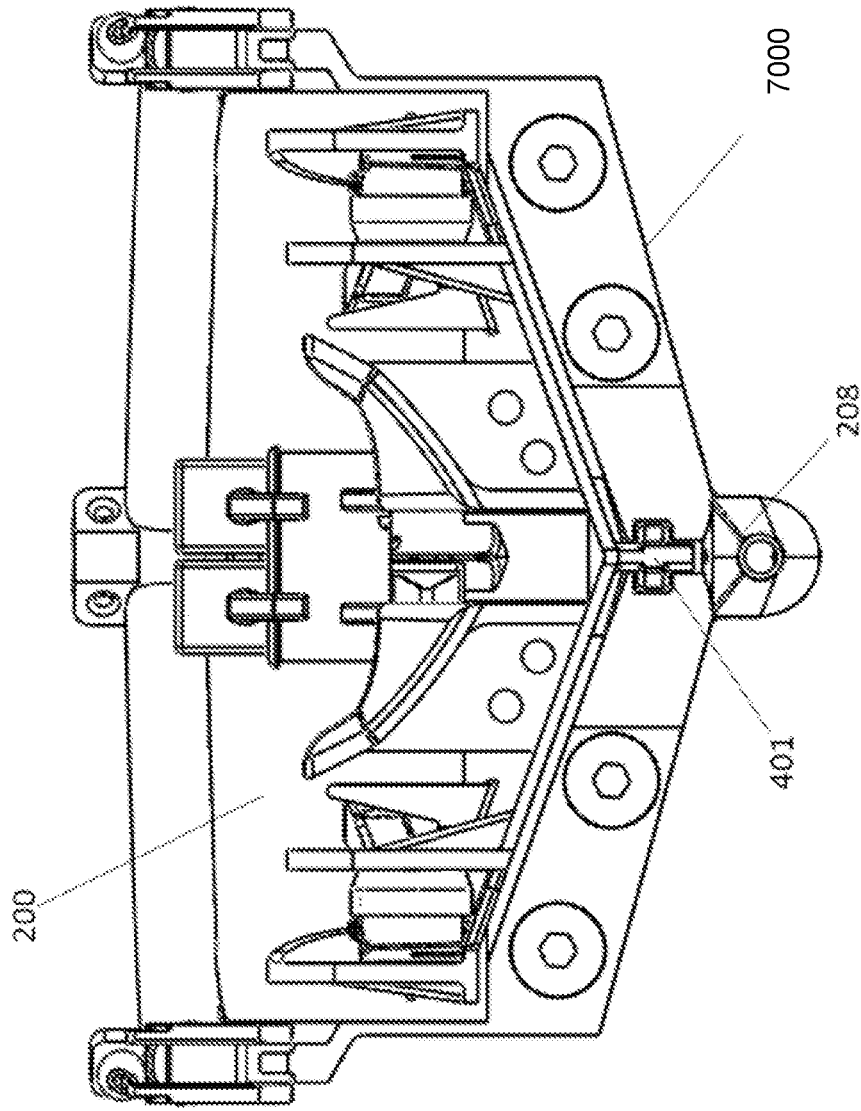
FIG. 13B is a rear view of a system for launch and recovery of a vessel, according to some embodiments of the present invention.

FIG. 13B shows a rear view of a system for launch and recovery of a vessel, according to some embodiments of the present invention, with the movable support stage 7000.

Figure 13C:
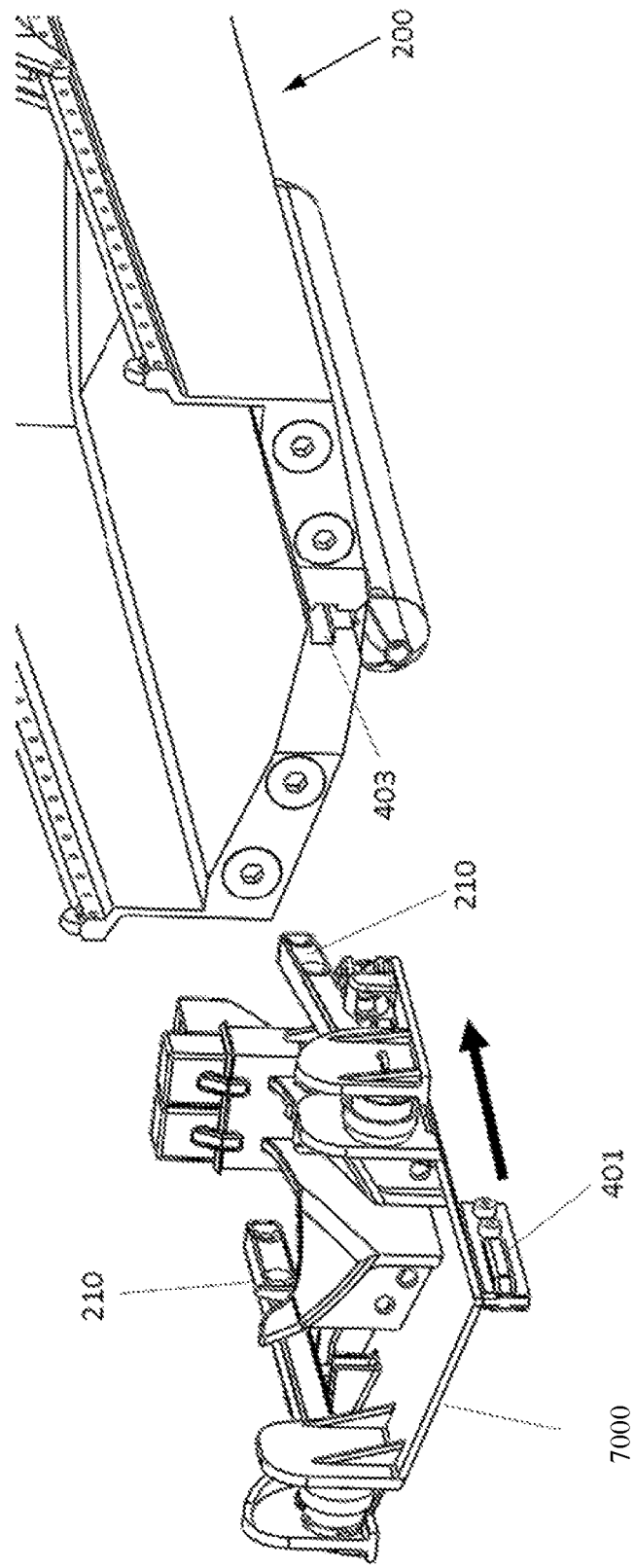
FIG. 13C is an isometric view of a system for launch and recovery of a vessel, according to some embodiments of the present invention, with the capturing mechanism on a movable support stage which is separate from the cradle.

FIG. 13C is an isometric view of a system for launch and recovery of a vessel, according to some embodiments of the present invention, with a movable support stage 7000 (separated). Matching groove 403 is shown at the bottom of cradle 200. When slider 401 is inserted into groove 403, movable support stage 7000 can move inside cradle 200 along the groove (which extends across the bottom of the cradle, substantially parallel to the keel line of the cradle.

Figure 14A:
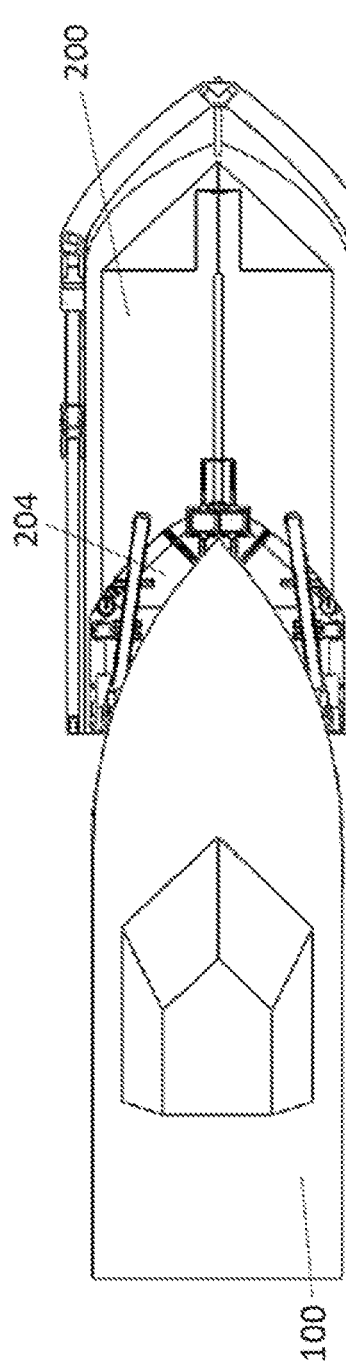
FIG. 14A-14C illustrates hauling of a vessel onto a marine platform, according to some embodiments of the present invention.
Figure 14B:
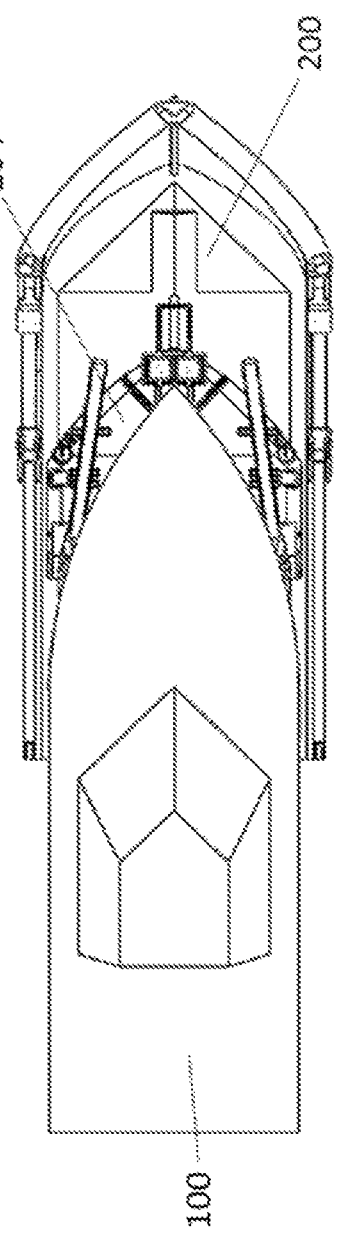
Figure 14C:
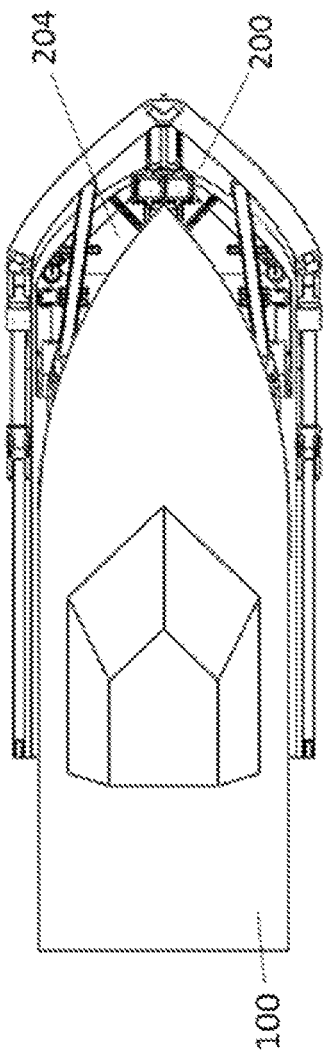

FIG. 14A-14C illustrate hauling a vessel onto a marine platform, according to some embodiments of the present invention. In FIG. 14A the vessel is shown at an initial hauling stage. In FIG. 14B the vessel is shown at an intermediate hauling stage. In FIG. 14C the vessel is shown at a final hauling stage.

A launch operation is quite similar to the recovery operation, except that it is carried out in reverse. In some embodiments, launching of the vessel off the cradle does not require the use of the capturing mechanism, while in other embodiments the capturing mechanism can be employed.

The operation of the launch and recovery system can be fully automatic, partially automatic or fully manual.

Figure 15:
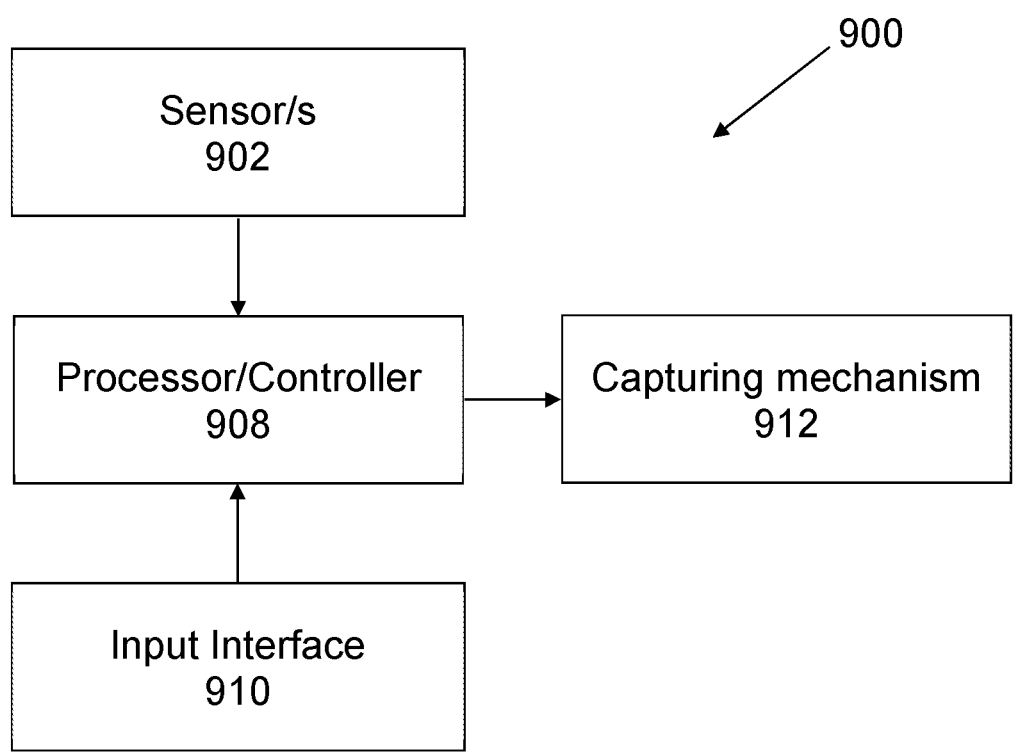
FIG. 15 illustrates a method for automated recovery of a vessel, according to some embodiments of the present invention.

A schematic illustration of a fully automatic launch and recovery system, according to some embodiments of the present invention, is shown in FIG. 15.

System 900 includes a sensor or sensors 902 to detect various events, such as, for example, identification that at least one vessel is in the trapping zone, entry of the engagement device of the vessel into the trapping zone of the capturing mechanism, lack of contact between the tensioned capturing line 212 and the keel or stem line of the vessel, at least partial contact between at least one tensioned capturing line 212 and at least one keel or stem line of the vessel, engagement of the tensioned capturing line 212 with the engagement device, completion of capturing by the engagement device, completion of hauling of the vessel, changes in the state of the capturing mechanism, changes in the position of said capturing mechanism, and other events. For example, a tension sensor, a pressure sensor, an optical sensor, a proximity sensor, a force sensor, a position sensor, a speed sensor, an acceleration sensor, an acoustic sensor, a vibration sensor, a tilt sensor, a strain gauge, and any combination thereof can be used.

The data from the at least one sensor is processed by processor/controller 908 (hereinafter, the term "processor" is used to refer either to a processor or to a controller) which executes an algorithm for recovery or launch of a vessel, and the processor issues operational commands and/or data to the capturing mechanism to operate it in a manner that would facilitate successful recovery or launch of the vessel. If desired a sensor 200A may be located on the marine platform 200 as seen in FIG. 5A.

In some embodiments of the invention the processor is configured, upon detection of the engagement device of the vessel within the trapping zone, to activate the capturing mechanism until the tensioned capturing line 212 is engaged with the engagement device. The processor can also be configured, upon detection of the tensioned capturing line 212 engaged with the engagement device, to authorize or cause reduction of thrust in the vessel. The processor can also be configured, upon detection of completion of capturing process, to cause hauling of the vessel onto the marine platform. Further, the processor can be configured, upon detection of completion of the hauling process, to cause commencement of lifting of the vessel and marine platform to the second marine platform.

Input interface 910 can be included to allow a user to enter data and/or commands.

Figure 16:
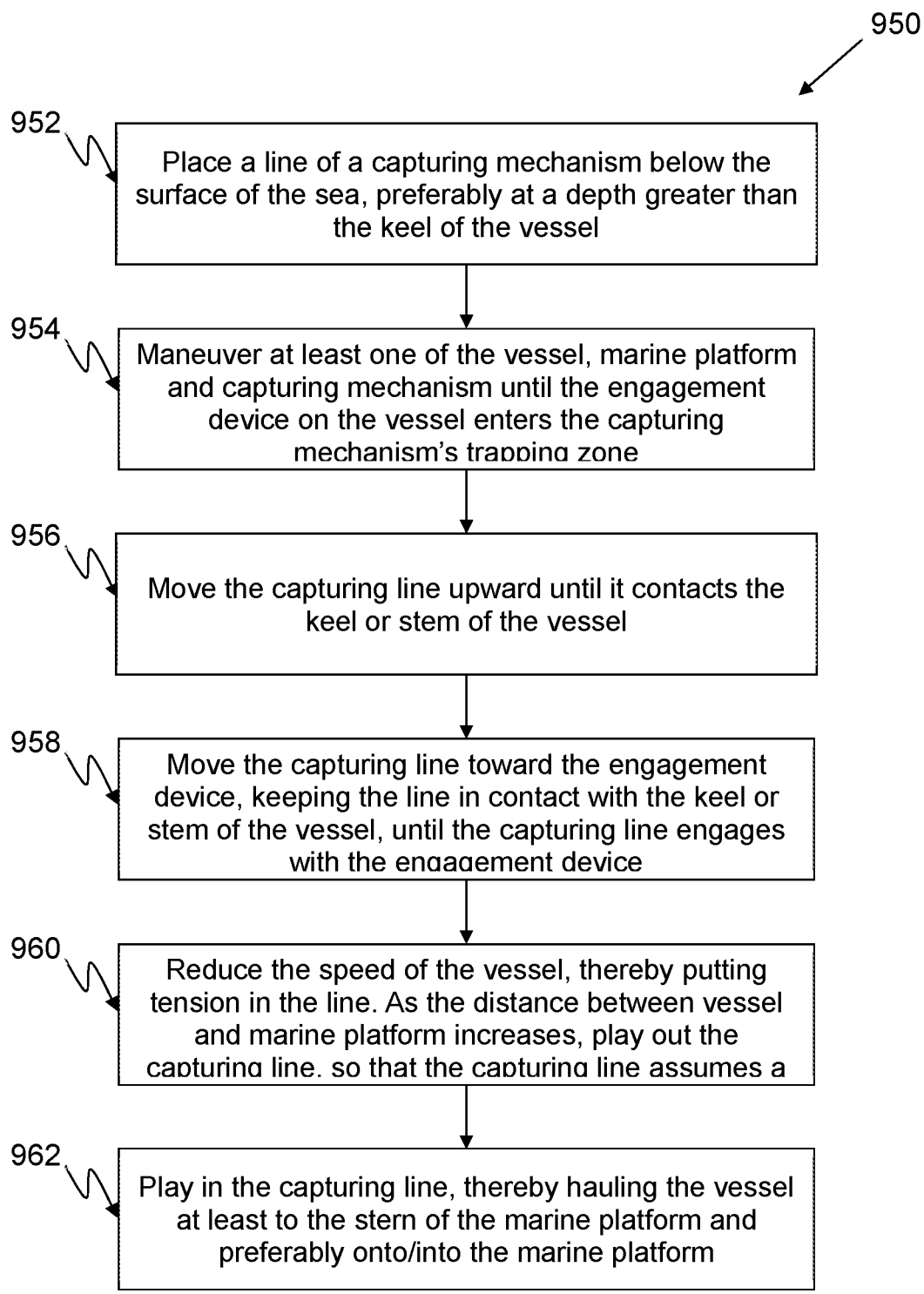
FIG. 16 illustrates a method for recovery of a vessel to a marine platform, according to some embodiments of the present invention.

FIG. 16 illustrates a method 950 for recovery of a marine vessel to a marine platform, according to some embodiments of the present invention. In this method 950, a tensioned capturing line 212 of a capturing mechanism is placed 952 below the surface of the sea. If necessary, at least one of the vessel, marine platform and capturing mechanism is maneuvered 954 until the engagement device of the vessel enters the capturing mechanism's trapping zone, so that the tensioned capturing line 212 is beneath the keel or stem of the vessel. Once the vessel 100 is in the trapping zone, the tensioned capturing line 212 is raised 956 until it contacts the keel or stem of the vessel. The tensioned capturing line 212 is moved toward the engagement device, while maintaining it in contact with the keel or stem, until the tensioned capturing line 212 is engaged with the engagement device. Preferably, once the tensioned capturing line 212 has engaged with the engagement device, the speed of the vessel is reduced to put tension in the tensioned capturing line 212, thereby inducing the tensioned capturing line 212 to assume a "V" shape. In preferred embodiments, the tensioned capturing line 212 is then drawn in, drawing the vessel to the stern of the cradle. In preferred variants of these embodiments, the vessel is drawn onto the cradle, either with or without the aid of a movable support stage 7000. The marine platform and vessel can then be lifted onto the second marine platform using a lifting device, such as a crane, hoist or davit which may be installed on the second marine platform, as illustrated in FIG. 17.

Figure 17:
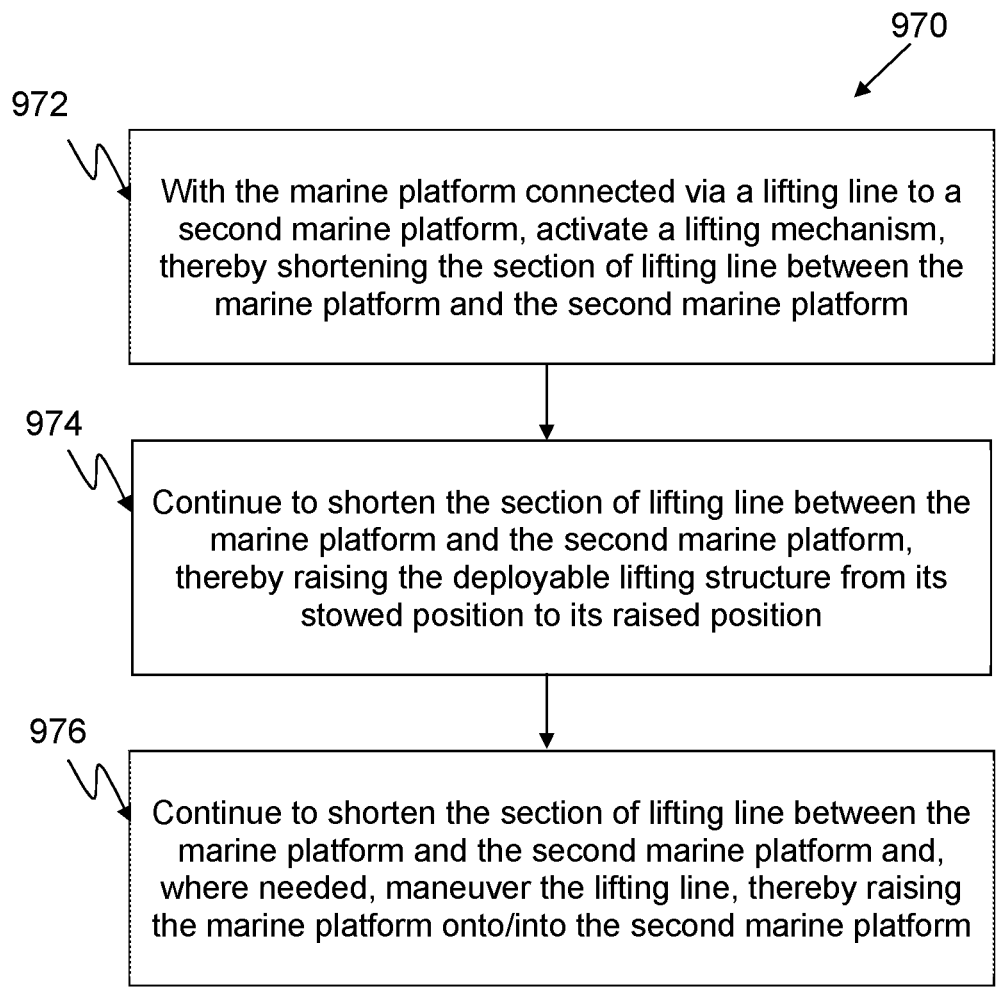
FIG. 17 illustrates a method for recovery of a marine platform to a second marine platform, according to some embodiments of the present invention.

FIG. 17 illustrates a method 970 for recovery of a marine platform, with or without a vessel on board, to a second marine platform, according to some embodiments of the present invention. In this method 970, the marine platform is connected to a lift line attached to a hoist, crane, davit or other lifting device on a second marine platform. In order to recover the marine platform to the second marine platform, the lifting device is activated 972, causing the section of lift line between the lifting device and the marine platform to be shortened ("shortening the lifting line"). This induces the deployable lifting structure to rise from its stowed position to its erect position 974. With the deployable lifting structure in its erect position, further shortening of the lift line will raise the marine platform 974 until it is at a height at which it can be safely stowed onboard the second marine platform. If necessary, the lifting device or an auxiliary maneuvering device can maneuver the marine platform horizontally so as to place it in a safe stowing position on board the second marine platform.

Portions of the system utilizing automatic control can be embodied as hardware, software or a combination of both. For manual control, when required, a set of instructions to be executed by a user or a manual for the user can be used. The manual can be either embodied by means of a hard copy (such as a printed book) or as a computer-readable "soft copy". Preferably, the instructions to be executed are displayed on an "as needed" basis.

The automatic control system or systems can be embodied as a computer program product saved on one or more non-transitory computer readable or media, in the form of computer readable program code. The instructions can be in the form of an installed application or in the form of an installation package, or can be downloaded from a remote storage medium such as, but not limited to, the Internet, a remote server, or the cloud.

The instructions can cause a processor to execute method steps in accordance with the examples above, such as, but not limited to, the embodiment shown in FIGS. 13 and 14.

A non-transitory computer readable storage medium can be, for example, an electronic, optical, magnetic, electro-magnetic, infrared, or semiconductor system, apparatus, or device, or any combination thereof.

Computer program code can be written in any suitable programming language. The program code can execute on a single computer system, or on a plurality of computer systems.

An example embodiment of a program embodying a method of recovering a vessel onto a cradle comprises the following steps:
A. Controlling the speed and direction of a vessel, so as to steer the vessel into a trapping zone of a capturing mechanism.
B. Initiating the capturing process by starting to raise the tensioned capturing line 212 upward towards the vessel when the system identifies, by means of data from at least one sensor, that the vessel is in the trapping zone and terminating the capturing process when at least one sensor has identified that capture has occurred between the tensioned capturing line 212 and the engagement device of the vessel. The sensor(s) identifying that the vessel is in the trapping zone can be the same as the contact sensor(s), or different sensors can be used.
C. Reducing the speed of the vessel so that it remains in the trapping zone. The vessel can also be steered to retain it in the trapping zone.
D. Maneuvering the portion of the tensioned capturing line 212 which is in the sea, while maintaining contact between the tensioned capturing line 212 and the keel or stem of the vessel, so as to cause the tensioned capturing line 212 to contact the engagement device. It should be noted that capture of the tensioned capturing line 212 by the engagement device is passive, in that the contact induces capture of the tensioned capturing line 212 by the engagement device.
E. Reducing the speed of the vessel, thereby increasing tension on the tensioned capturing line 212.
F. Lengthening the portion of the tensioned capturing line 212 or moving the line arms of the capturing mechanism so as to allow the tensioned capturing line 212 to form a V shape.
G. Drawing the vessel to the cradle.

It should be noted that, in some embodiments, there is no second marine platform so that recovery is complete when the vessel has been drawn to or onto/into the marine platform.

It should be noted that an automatic control system can additionally comprise instructions to lift the marine platform plus vessel onto a second marine platform.

In some embodiments, steering of the vessel and/or control of the speed of the vessel is done manually.

Features of various embodiments disclosed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method of controlling a movement of a vessel during the process of launch and recovery of the vessel to a marine platform after a capture of said vessel by a capturing mechanism connectable to the marine platform, wherein the capturing mechanism comprises a tensioned capturing line connected at both sides to sliding movable connection elements and configured to capture the vessel by making a contact between the tensioned capturing line and an engagement device placed on a bow of the vessel; the method comprising the steps of:
   a. moving the tensioned capturing line via the sliding moveable connection elements along longitudinal and vertical directions of the marine platform to manipulate position of the bow of the vessel; and,
   b. manipulating the vessel relative to a stern of the marine platform and relative to surface of the water to allow safe recovery and/or launch of the vessel.

2. The method of claim 1, wherein controlling the movement of the vessel comprises identifying at least one of: position of the vessel relative to the stern of the marine platform, tension of a towing line, speed of a towing line, length of a towing line, state of waves, and position of the vessel relative to the stern of the marine platform and/or relative to surface of water.

3. The method of claim 1, further comprising the step of hauling the vessel onto the marine platform.

4. The method of claim 2, wherein the identifying at least one of: position of the vessel relative to the stern of the marine platform, tension of the towing line, speed of the towing line, length of the towing line, state of waves, and position of the vessel relative to the stern of the marine platform and/or relative to the surface of water comprises using at least one sensor selected from the group consisting of a tension sensor, a pressure sensor, an optical sensor, a proximity sensor, a force sensor, a position sensor, a speed sensor, an acceleration sensor, an acoustic sensor, a vibration sensor, a tilt sensor, and a strain gauge.

5. The method of claim 1, further comprising the step of adjusting at least one of: length of a towing line, tension of a towing line, and hauling of the vessel based on position of the vessel relative to the stern of the marine platform and/or relative to surface of water.

6. The method of claim 1, further comprising the step of allowing the tensioned capturing line to take up a V shape to thereby provide a stable towing line connected to the bow of the vessel, wherein the step of allowing the tensioned capturing line to take up a V shape to thereby provide a stable towing line connected to the bow of the vessel precedes step a.

* * * * *